US012679117B2

(12) United States Patent
Motai et al.

(10) Patent No.: US 12,679,117 B2
(45) Date of Patent: Jul. 14, 2026

(54) TAPE PRINTING APPARATUS AND CONTROL METHOD OF TAPE PRINTING APPARATUS

(71) Applicant: SEIKO EPSON CORPORATION, Tokyo (JP)

(72) Inventors: Kenji Motai, Matsumoto (JP); Taishi Sasaki, Matsumoto (JP); Keisuke Taruya, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 217 days.

(21) Appl. No.: 18/605,055

(22) Filed: Mar. 14, 2024

(65) Prior Publication Data

US 2024/0308249 A1 Sep. 19, 2024

(30) Foreign Application Priority Data

Mar. 15, 2023 (JP) ................................ 2023-040508
Mar. 15, 2023 (JP) ................................ 2023-040510

(51) Int. Cl.
*B41J 11/00* (2006.01)
*B41J 3/407* (2006.01)
(Continued)

(52) U.S. Cl.
CPC ......... *B41J 11/0095* (2013.01); *B41J 3/4075* (2013.01); *B41J 11/008* (2013.01);
(Continued)

(58) Field of Classification Search
CPC ...... B41J 11/009; B41J 11/008; B41J 3/4075; B41J 11/04; B41J 11/703; B41J 15/042;
(Continued)

(56) References Cited

U.S. PATENT DOCUMENTS 9,457,925 B1 * 10/2016 Harashina ................. B65C 9/40
2013/0120489 A1 * 5/2013 Ito ........................ B41J 2/16585 428/32.1

(Continued)

FOREIGN PATENT DOCUMENTS

JP H05-116393 A 5/1993
JP H08-230266 A 9/1996

(Continued)

*Primary Examiner* — Kristal Feggins
(74) *Attorney, Agent, or Firm* — Oliff PLC

(57) ABSTRACT

A tape printing apparatus includes a feeding mechanism that feeds, a label tape in which a plurality of labels are disposed at equal intervals on a mount tape and a detection hole is provided at a position corresponding to each of the labels, a printing head that performs printing on the labels of the label tape, a sensor that detects the detection holes, a measurement feeding pitch, which is a distance between the detection hole of a first label and the detection hole of a second label, is measured based on a detection result of the sensor, and a feeding amount of the label tape after the detection hole of the second label is detected is corrected based on the measured measurement feeding pitch and a standard feeding pitch that is a distance between the detection holes in a specification of the label tape.

7 Claims, 43 Drawing Sheets

(51) Int. Cl.
*B41J 11/04* (2006.01)
*B41J 11/70* (2006.01)
*B41J 15/04* (2006.01)

(52) U.S. Cl.
CPC .............. *B41J 11/009* (2013.01); *B41J 11/04* (2013.01); *B41J 11/703* (2013.01); *B41J 15/042* (2013.01); *B41J 15/044* (2013.01)

(58) Field of Classification Search
CPC ........ B41J 15/044; B41J 15/00; B41J 15/046; B41J 15/04
See application file for complete search history.

(56) References Cited

U.S. PATENT DOCUMENTS

| | | | | |
|---|---|---|---|---|
| 2014/0037359 | A1* | 2/2014 | Nakajima | B41J 11/70 400/621 |
| 2014/0227017 | A1 | 8/2014 | Kanda et al. | |
| 2016/0297217 | A1 | 10/2016 | Sasaki | |

FOREIGN PATENT DOCUMENTS

| | | | |
|---|---|---|---|
| JP | 2009-234021 | A | 10/2009 |
| JP | 2014-156029 | A | 8/2014 |
| JP | 2014-184558 | A | 10/2014 |

* cited by examiner

TAPE PRINTING APPARATUS AND CONTROL METHOD OF TAPE PRINTING APPARATUS

The present application is based on, and claims priority from JP Application Serial Number 2023-040508, filed Mar. 15, 2023 and JP Application Serial Number 2023-040510, filed Mar. 15, 2023, the disclosures of which are hereby incorporated by reference herein in their entirety.

BACKGROUND

1. Technical Field

The present disclosure relates to a tape printing apparatus and a control method of a tape printing apparatus.

2. Related Art

In the related art, as disclosed in JP-A-2014-184558, a tape printing apparatus that performs printing on a label while feeding a label tape on which a plurality of labels are disposed on a mount tape is known. This type of label tape has a detected portion provided at a position corresponding to each label. By detecting the detected portion and controlling a printing timing, the tape printing apparatus can perform the printing at a desired position on the label.

In addition, a tape printing apparatus disclosed in JP-A-2014-156029 includes a sensor that is provided in a second direction opposite to a first direction with respect to a printing head to detect a detected portion, but a tape printing apparatus including a sensor provided in a first direction with respect to a printing head, that is, downstream of the printing head in a tape feeding direction is also known. Hereinafter, the tape printing apparatus including the sensor provided downstream of the printing head will be referred to as a “downstream sensor type printing apparatus”.

In the tape printing apparatus in the related art, due to a variation in a diameter of a platen roller that feeds the label tape, a change in a diameter of a tape roll when the label tape is fed out from the tape roll, or the like, a feeding amount of the label tape in a predetermined time may differ from a theoretical feeding amount. In such a case, in the tape printing apparatus in the related art, a printing position on the label is shifted.

In addition, in the downstream sensor type printing apparatus in the related art, when a distance between the detected portion and a printing start position of the label is shorter than a sensor-head distance, which is a distance between a detection position of the sensor and the printing position by the printing head, on the label tape, it is necessary to perform the following control. That is, it is necessary for the downstream sensor type printing apparatus to perform cueing of the label by feeding the label tape in the second direction until the printing start position of the label is located at the printing position by the printing head after the detected portion is detected by the sensor. In this way, since the downstream sensor type printing apparatus in the related art should temporarily feed the label tape in the second direction and perform the cueing of the label when the distance between the detected portion and the printing start position of the label is shorter than the sensor-head distance, a printing process time is long.

SUMMARY

According to an aspect of the present disclosure, provided is a tape printing apparatus including: a feeding mechanism that feeds, in a first direction, a label tape in which a plurality of labels are disposed at equal intervals on a mount tape and a detected portion is provided at a position corresponding to each of the labels; a printing head that performs printing on the labels of the label tape fed by the feeding mechanism; a sensor that detects the detected portions in a period in which the label tape is fed by the feeding mechanism; a readout section that reads out a standard feeding pitch, which is a distance between the detected portions in a specification of the label tape, from a storage section; and a feeding control section that controls the feeding mechanism, in which when printing is performed on the plurality of labels, the feeding control section measures a measurement feeding pitch, which is a distance between the detected portion of a first label that is any one of the plurality of labels and the detected portion of a second label to be printed after the first label, based on a detection result of the sensor, and corrects a feeding amount of the label tape after the detected portion of the second label is detected, based on the measured measurement feeding pitch and the standard feeding pitch.

According to another aspect of the present disclosure, provided is a control method of a tape printing apparatus including: a feeding mechanism that feeds, in a first direction, a label tape in which a plurality of labels are disposed at equal intervals on a mount tape and a detected portion is provided at a position corresponding to each of the labels; a printing head that performs printing on the labels of the label tape fed by the feeding mechanism; a sensor that detects the detected portions in a period in which the label tape is fed by the feeding mechanism; and a readout section that reads out a standard feeding pitch, which is a distance between the detected portions in a specification of the label tape, from a storage section, the control method including: causing the tape printing apparatus to, when printing is performed on the plurality of labels, measure a measurement feeding pitch, which is a distance between the detected portion of a first label that is any one of the plurality of labels and the detected portion of a second label to be printed after the first label, based on a detection result of the sensor, and correct a feeding amount of the label tape after the detected portion of the second label is detected, based on the measured measurement feeding pitch and the standard feeding pitch.

According to still another aspect of the present disclosure, provided is a tape printing apparatus including: a feeding mechanism that feeds, in a first direction, a label tape in which a plurality of labels are disposed at equal intervals on a mount tape in a length direction of the mount tape and a detected portion is provided between the labels; a printing head that performs printing on the labels of the label tape fed by the feeding mechanism; a sensor that has a detection position located in the first direction with respect to a printing position by the printing head and detects the detected portion in a period in which the label tape is fed by the feeding mechanism; and a printing control section that controls the feeding mechanism and the printing head, in which when printing is performed on the plurality of labels, the printing control section performs cueing for locating, at the printing position, a printing start position of an n-th label, which is the label disposed at an n-th position, n being an integer of $n \geq 2$, from a beginning of the label tape among the labels disposed on the label tape, based on detection of the detected portion provided in the first direction with respect to an $(n-1)$-th label.

According to still another aspect of the present disclosure, provided is a control method of a tape printing apparatus including: a feeding mechanism that feeds, in a first direction, a label tape in which a plurality of labels are disposed at equal intervals on a mount tape in a length direction of the mount tape and a detected portion is provided between the labels; a printing head that performs printing on the labels of the label tape fed by the feeding mechanism; and a sensor that has a detection position located in the first direction with respect to a printing position by the printing head and detects the detected portion in a period in which the label tape is fed by the feeding mechanism, the control method including: causing the tape printing apparatus to, when printing is performed on the plurality of labels, perform cueing for locating, at the printing position, a printing start position of an n-th label, which is the label disposed at an n-th position, n being an integer of n≥2, from a beginning of the label tape among the labels disposed on the label tape, based on detection of the detected portion provided in the first direction with respect to an (n−1)-th label.

DESCRIPTION OF EMBODIMENTS

Hereinafter, a tape printing apparatus and a control method of a tape printing apparatus will be described with reference to the accompanying drawings. It should be noted that the description will be made by using directions based on an XYZ orthogonal coordinate system in a part of drawings. However, these directions are merely for convenience of description and do not limit the following embodiment in any way.

Figure 1:
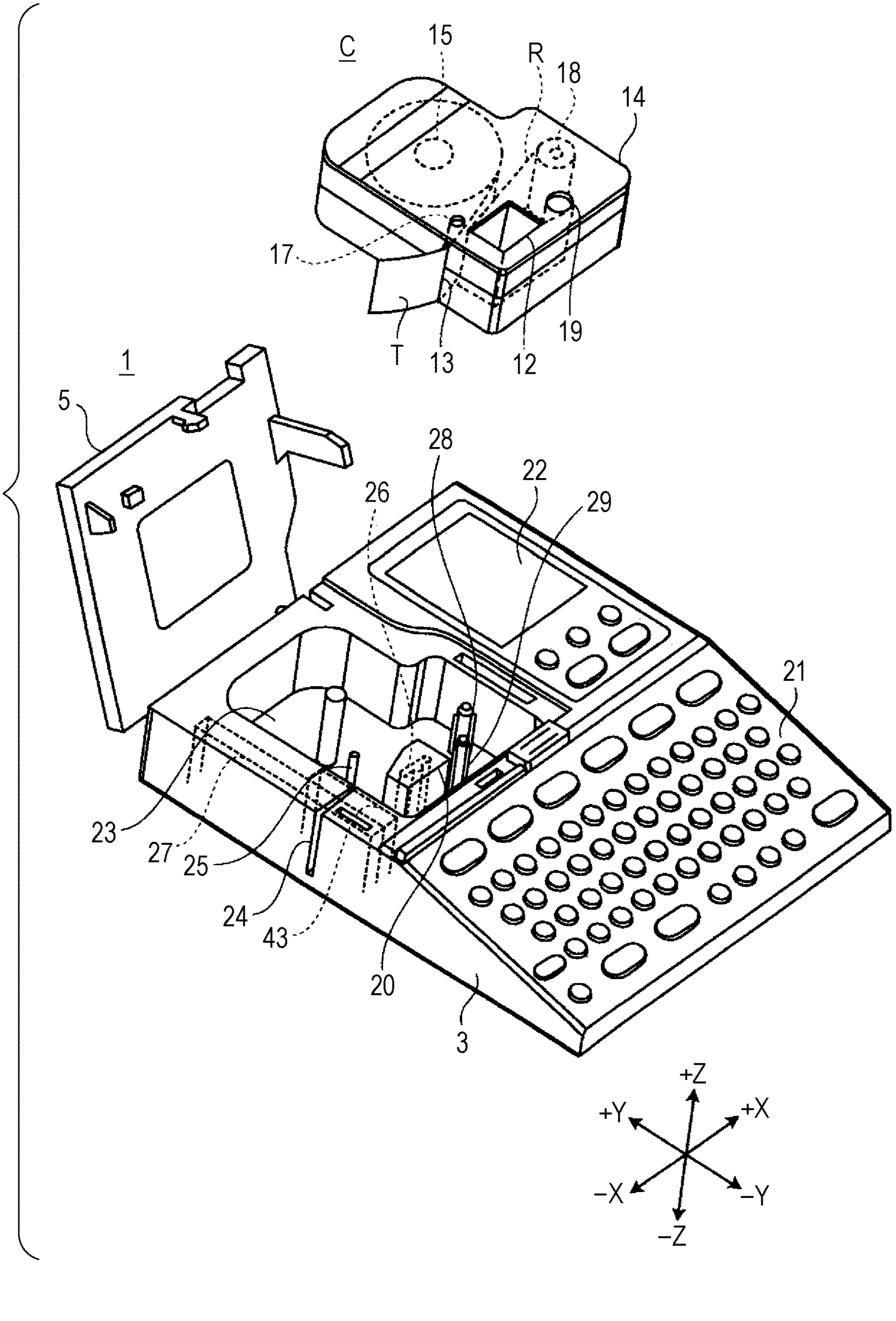
FIG. 1 is an external view of a tape printing apparatus and a tape cartridge.
Figure 2:
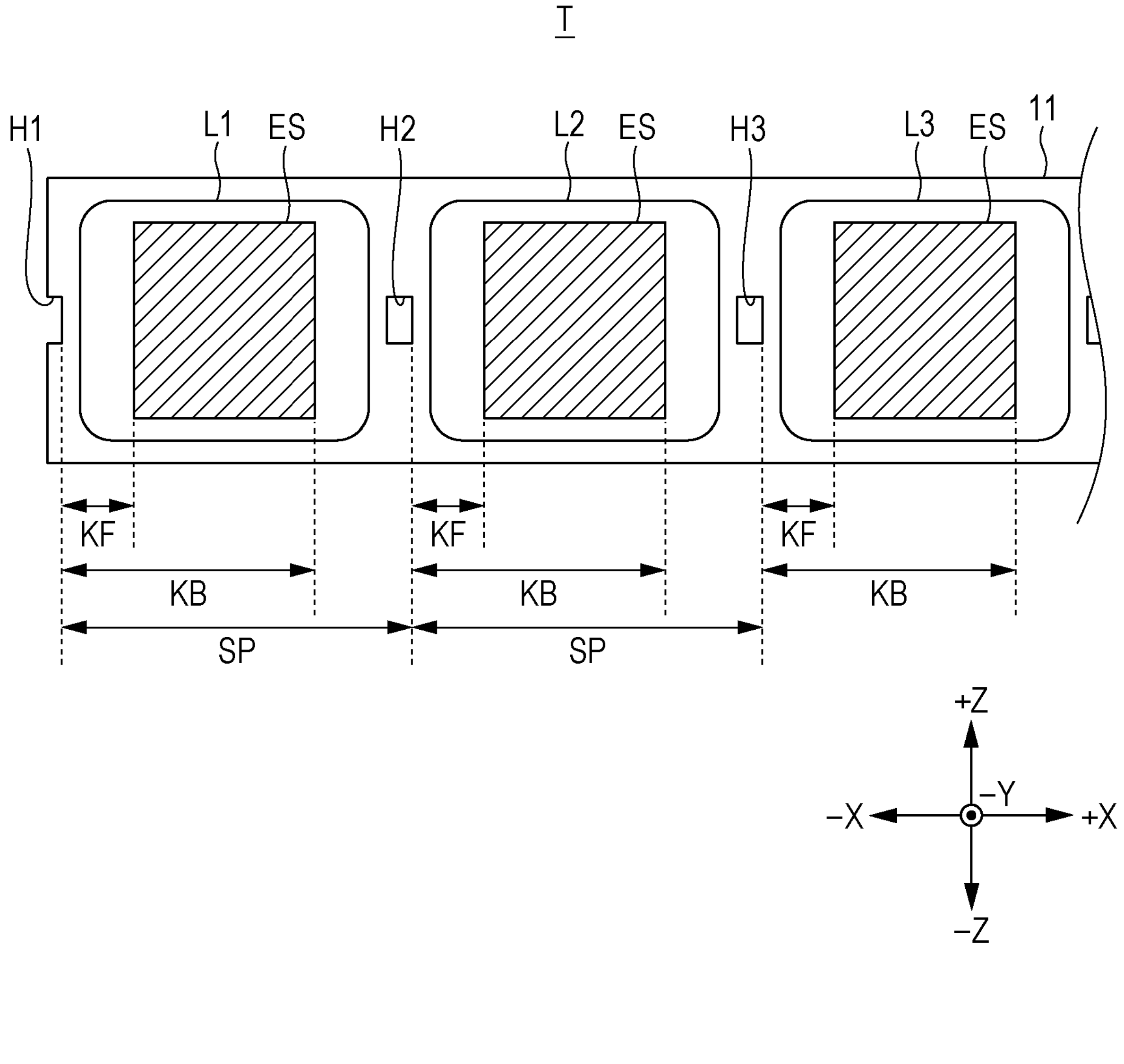
FIG. 2 is a diagram illustrating an example of a label tape.

FIG. 1 is an external view of a tape printing apparatus 1 and a tape cartridge C. The tape printing apparatus 1 is an apparatus that performs printing on a long tape. As illustrated in FIG. 2, the tape printing apparatus 1 according to the present embodiment uses, as the tape, a label tape T in which a plurality of labels L are disposed at equal intervals on a mount tape 11.

The tape printing apparatus 1 includes an apparatus case 3 and a mounting section cover 5. An operation key group 21, a display 22, a cartridge mounting section 23, and a tape ejection port 24 are provided on a surface of the apparatus case 3 in a +Z direction.

The operation key group 21 receives various operations of a user, such as an editing operation of a printed image printed on the label L of the label tape T. The display 22 displays various information, such as an editing screen of the printed image. The tape printing apparatus 1 generates printed data based on the editing operation of the printed image by the user, and performs a printing process based on the generated printed data.

The cartridge mounting section 23 is a recess portion that is open in the +Z direction. The tape cartridge C is detachably mounted on the cartridge mounting section 23. The tape cartridge C includes, in the case, a tape core 15 around which the label tape T is wound, an ink ribbon R, a platen roller 17, a feeding-out core 18, and a winding core 19, and a cartridge case 14 that accommodates these components.

The label tape T is wound around the tape core 15. The ink ribbon R is wound around the feeding-out core 18. The ink ribbon R fed out from the feeding-out core 18 is wound around the winding core 19. A head insertion hole 12 is provided through the cartridge case 14 in a Z axis direction. Further, a tape sending-out port 13 extending in the Z axis direction is provided on a surface of the cartridge case 14 in a −X direction. The label tape T fed out from the tape core 15 is sent out of the cartridge case 14 from the tape sending-out port 13.

Figure 4:
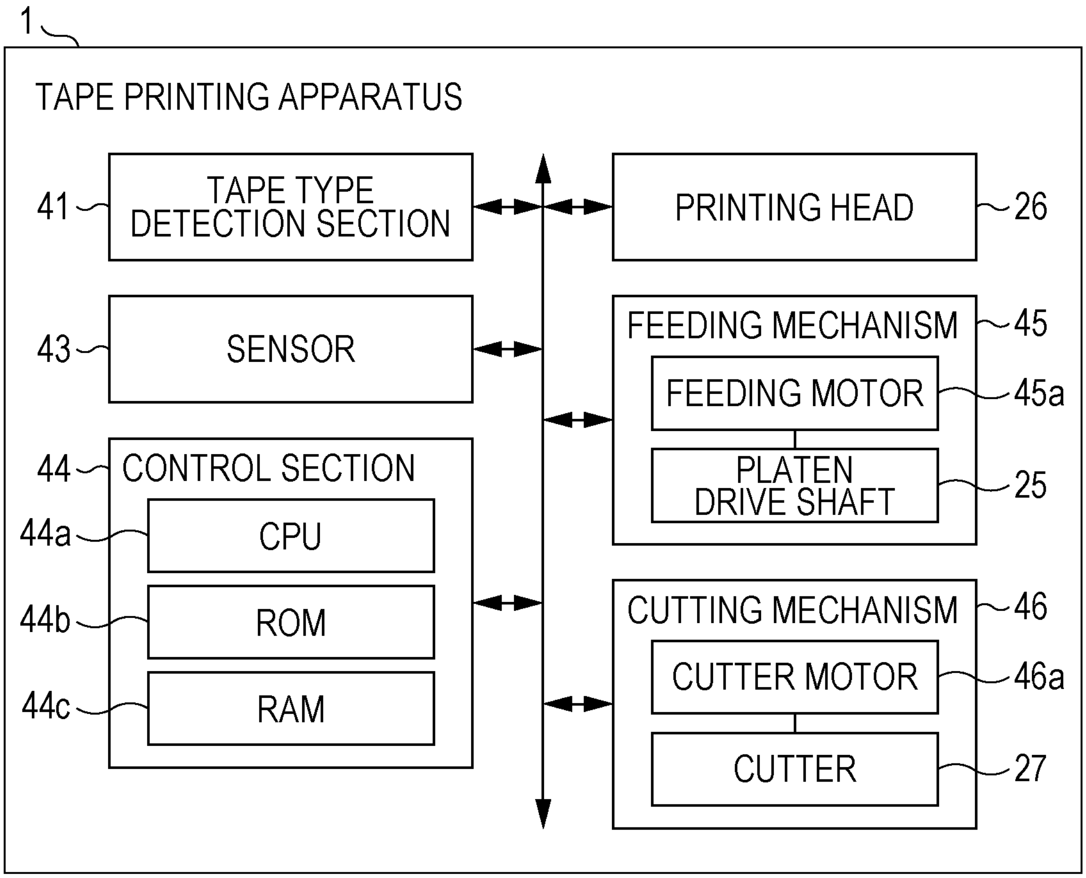
FIG. 4 is a block diagram illustrating a hardware configuration of the tape printing apparatus.

The cartridge mounting section 23 is provided with a printing head 26, a head cover 20, and a tape type detection section 41 illustrated in FIG. 4. The printing head 26 performs the printing on the label tape T. The head cover 20 partially covers the printing head 26. The tape type detection section 41 will be described below.

From a bottom surface of the cartridge mounting section 23, the platen drive shaft 25, a feeding-out shaft 28, and a winding shaft 29 protrude in the +Z direction. When the tape cartridge C is mounted on the cartridge mounting section 23, the platen drive shaft 25, the feeding-out shaft 28, and the winding shaft 29 engage with the platen roller 17, the feeding-out core 18, and the winding core 19, respectively.

In addition, when the tape cartridge C is mounted on the cartridge mounting section 23, the printing head 26 and the head cover 20 are inserted into the head insertion hole 12. Subsequently, when the mounting section cover 5 is closed, the printing head 26 is moved toward the platen roller 17 by a head movement mechanism (not illustrated). As a result, the label tape T and the ink ribbon R are interposed between the printing head 26 and the platen roller 17.

In this state, when a feeding motor **45*a* provided in the tape printing apparatus 1 illustrated in FIG. 4 rotates in a first rotation direction, the platen roller 17 and the winding core 19 rotate so that the label tape T is sent out of the cartridge case 14 from the tape sending-out port 13 and the ink ribbon R is wound around the winding core 19. It should be noted that the label tape T in this case is fed in the −X direction toward the tape ejection port 24. The −X direction is an example of a "first direction". In addition, when the feeding motor 45*a* rotates in a second rotation direction opposite to the first rotation direction, the platen roller 17 and the feeding-out core 18 rotate so that the label tape T is pulled back into the cartridge case 14 and the ink ribbon R is wound back around the feeding-out core 18**. It should be noted that the label tape T in this case is fed in the +X direction. The +X direction is an example of a "second direction".

FIG. 2 is a diagram illustrating an example of the label tape T. As illustrated in FIG. 2, the label tape T has a plurality of labels L disposed at equal intervals on the mount tape 11. The plurality of labels L have the same shape and the same size, and are disposed along a length direction of the label tape T. As described above, when the tape cartridge C is mounted on the cartridge mounting section 23, the length direction of the label tape T fed out from the tape cartridge C is an X axis direction. Hereinafter, the label tape T will be described using a direction when the tape cartridge C is mounted on the cartridge mounting section 23.

In FIG. 2, the plurality of labels L are provided in order of L1, L2, and L3 in the +X direction. A surface of the label L disposed on the label tape T in a +Y direction is an adhesive surface, and is attached to the mount tape 11 in a −Y direction via the adhesive surface. A detection hole H is provided in the label tape T between the labels L in the X axis direction. The detection hole H is an example of a "detected portion". The detection hole H is obtained by cutting out the mount tape 11 in a rectangular shape, and is provided in the −X direction of the corresponding label L at substantially the center of the mount tape 11 in the Z axis direction. In FIG. 2, the detection holes H are provided in order of H1, H2, and H3 in the +X direction.

In FIG. 2, a shaded portion on the label L indicates a printing target area ES. The printing target area ES means an area in which the printing is performed by the printing head 26. The printing target area ES is a rectangular area surrounding the printed image printed on the label L. Specifically, when the minimum coordinate of the printed image in the X axis direction is "X_min", the maximum coordinate in the X axis direction is "X_max", the minimum coordinate in the Z axis direction is "Z_min", and the maximum coordinate in the Z axis direction is "Z_max", the printing target area ES has a rectangular range having (X_min, Z_min), (X_min, Z_max), (X_max, Z_min), and (X_max, Z_max) as the vertices.

It should be noted that, in the following description, a distance from an end portion of the detection hole H in the +X direction to an end portion of the printing target area ES in the −X direction will be referred to as a "first distance KF". The end portion of the printing target area ES in the −X direction is an example of a "printing start position". In addition, in the following description, a distance from the end portion of the detection hole H in the +X direction to an end portion of the printing target area ES in the +X direction will be referred to as a "third distance KB". In addition, in the following description, a distance between the detection holes H of the label tape T in the specification will be referred to as a "standard feeding pitch SP".

The description is returned to FIG. 1. The printing head 26 is provided at a position facing the platen roller 17 in a state in which the tape cartridge C is mounted on the cartridge mounting section 23. The printing head 26 is driven to generate heat in accordance with the printed data. As a result, the ink of the ink ribbon R is transferred to the label L of the label tape T, and the printed image based on the printed data is printed on the label L.

Figure 3:
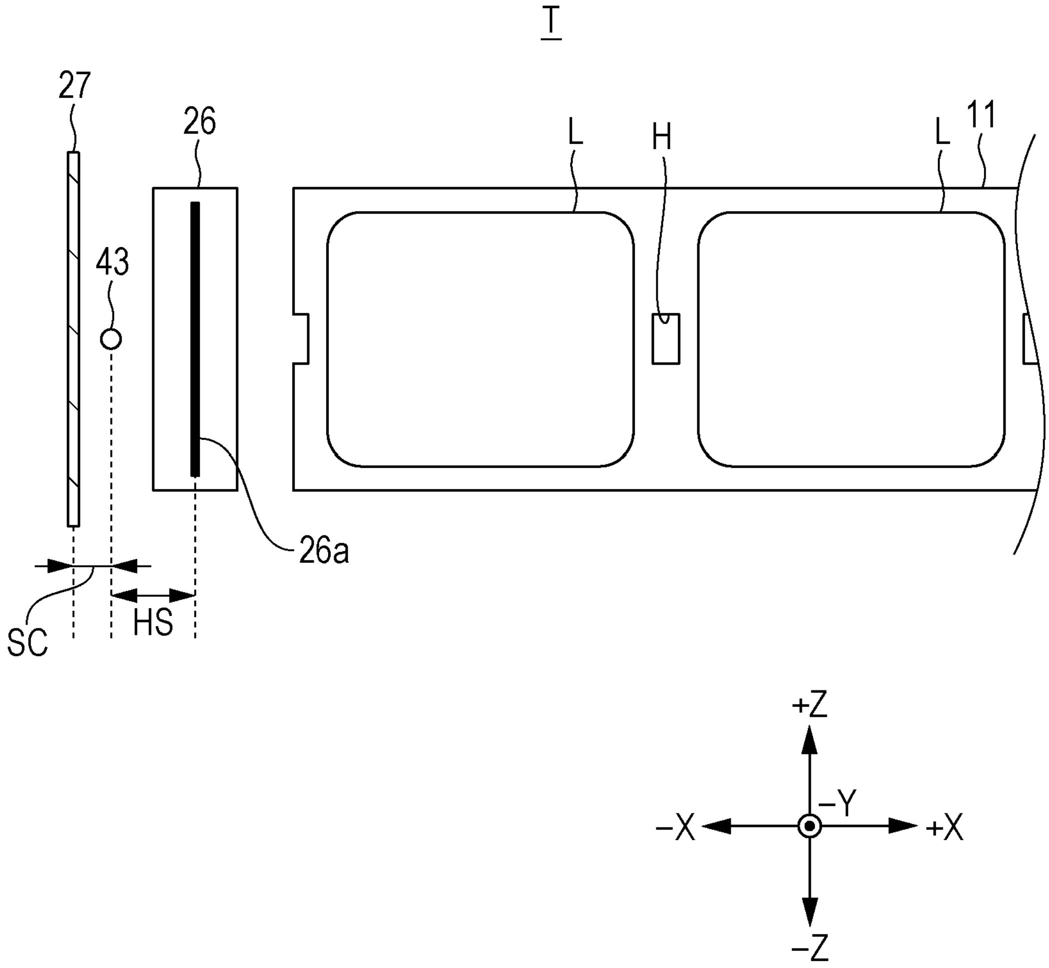
FIG. 3 is a diagram illustrating a disposition of a printing head, a sensor, and a cutter.

The label tape T in which the printing is performed on the label L is ejected from the tape ejection port 24. As illustrated in FIG. 3, a sensor 43 and a cutter 27 are provided between the cartridge mounting section 23 and the tape ejection port 24. The sensor 43 detects the detection hole H of the label tape T. The cutter 27 cuts the label tape T in a tape width direction, that is, in the Z axis direction. Accordingly, a printed portion of the label tape T is cut away.

In addition, in the following description, when the printing is performed on the plurality of labels L, the plurality of labels L are referred to as a "first label L1" and the like in accordance with the order of the disposition on the label tape T. For example, the first label L1 means the label L disposed at a beginning of the label tape T, and the second label L2 means the label L disposed second from the beginning of the label tape T. Similarly, the detection holes H will be referred to as a "first detection hole H1" and the like in accordance with the order of the disposition on the label tape T. That is, an n-th detection hole Hn is the detection hole H provided between an (n−1)-th label L(n−1) and an n-th label Ln.

FIG. 3 is a diagram illustrating the disposition of the printing head 26, the sensor 43, and the cutter 27. As illustrated in FIG. 3, the sensor 43 is provided in the −X direction of the printing head 26 and in the +X direction of the cutter 27. In addition, the sensor 43 is provided in the Z axis direction at a position corresponding to the detection hole H of the label tape T fed in the −X direction. In addition, a cutting position of the cutter 27 is located in the −X direction with respect to a detection position of the sensor 43.

It should be noted that, in the following description, a distance between the detection position of the sensor 43 and the printing position by the printing head 26 in the X axis direction will be referred to as a "second distance HS". More specifically, the second distance HS means a distance between the sensor 43 and a heat generating element group 26*a* provided in the printing head 26 in the X axis direction. The heat generating element group 26*a* includes a plurality of heat generating elements arranged in the Z axis direction. In addition, in the following description, a distance between the cutting position of the cutter 27 and the detection position of the sensor 43 in the X axis direction will be referred to as a "sensor-cutter distance SC".

With reference to FIG. 4, a hardware configuration of the tape printing apparatus 1 will be described. The tape printing apparatus 1 includes the tape type detection section 41, the sensor 43, a control section 44, the printing head 26, a feeding mechanism 45, and a cutting mechanism 46.

The tape type detection section 41 detects a type of the label tape T. The tape type detection section 41 detects the type of the label tape T, for example, by optically reading a code image (not illustrated) provided on an outer surface of the tape cartridge C mounted on the cartridge mounting section 23. In this case, the code image is an image obtained by encoding tape type information indicating the type of the label tape T, and is, for example, a two-dimensional code or a barcode.

It should be noted that the tape type detection section 41 may detect the type of the label tape T by acquiring the tape type information from a circuit substrate having a memory element or a radio frequency identification (RFID) tag (none illustrated) provided in the tape cartridge C. In this case, the tape type information is stored in the memory element or the RFID tag.

The sensor 43 detects the detection hole H in a period in which the label tape T is fed by the feeding mechanism 45. The sensor 43 is composed of, for example, a transmissive photo interrupter, and includes a light emission element and a light reception element facing each other. In the present embodiment, the sensor 43 detects a timing at which the end portion of the detection hole H on the +X side has passed between the light emission element and the light reception element.

The control section 44 includes a central processing unit (CPU) 44*a*, a read only memory (ROM) 44*b*, and a random access memory (RAM) 44*c*.

The CPU 44*a* performs various types of control by deploying and executing control programs, such as firmware stored in the ROM 44*b*, in the RAM 44*c*. It should be noted that the control section 44 may use a hardware circuit, such as an ASIC, as a processor instead of the CPU 44*a*. The processor may be configured such that one or more CPUs and the hardware circuit, such as the ASIC, operate in cooperation with each other.

It should be noted that the ROM 44*b* stores a correspondence table in which the type of the label tape T and the standard feeding pitch SP are associated with each other. The ROM 44*b* is an example of a "storage section".

The printing head 26 includes the heat generating element group 26*a* illustrated in FIG. 3, and performs the printing by thermally transferring the ink from the ink ribbon R to the label tape T.

The feeding mechanism 45 includes the feeding motor 45*a* and the platen drive shaft 25. The feeding motor 45*a* is a drive source that drives the platen drive shaft 25. When the feeding motor 45*a* rotates forward, the platen roller 17 rotates in the first rotation direction via the platen drive shaft 25, and the label tape T is fed in the −X direction. In addition, when the feeding motor 45*a* rotates backward, the platen roller 17 rotates in a direction opposite to the first rotation direction via the platen drive shaft 25, and the label tape T is fed in the +X direction. It should be noted that, in the present embodiment, the feeding motor 45*a* is a stepping motor. The CPU 44*a* measures a measurement feeding pitch described below based on the number of steps for rotating the feeding motor 45*a*.

The cutting mechanism 46 includes a cutter motor 46*a* and the cutter 27. The cutter motor 46*a* is a drive source that drives the cutter 27. When the cutter motor 46*a* is driven, the cutter 27 operates to cut the label tape T in the Z axis direction.

Figure 5:
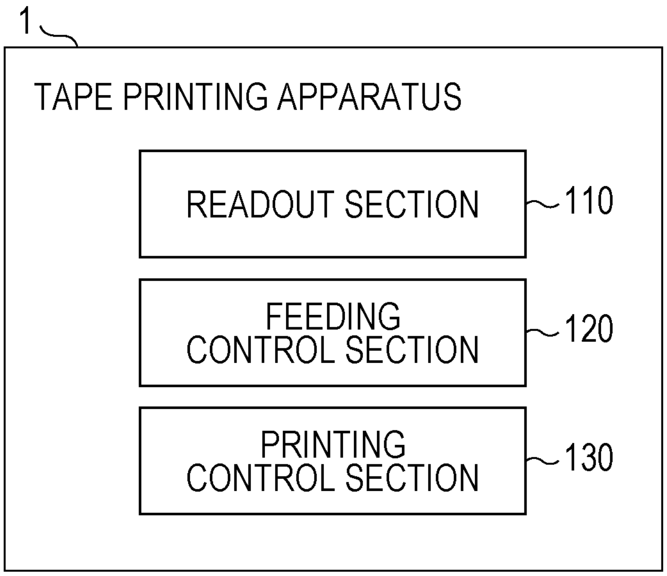
FIG. 5 is a block diagram illustrating a functional configuration of the tape printing apparatus.

With reference to FIG. 5, a functional configuration of the tape printing apparatus 1 will be described. The tape printing apparatus 1 includes a readout section 110, a feeding control section 120, and a printing control section 130. All of these functions are functions realized by the CPU 44*a* executing the firmware stored in the ROM 44*b*.

The readout section 110 reads out the standard feeding pitch SP, which is the distance between the detection holes H of the label tape T in the specification, from the ROM 44*b* based on the tape type information detected by the tape type detection section 41 illustrated in FIG. 4. More specifically, the readout section 110 reads out the standard feeding pitch SP corresponding to the type of the label tape T indicated by the detected tape type information from the correspondence table stored in the ROM 44*b*.

Figure 12:
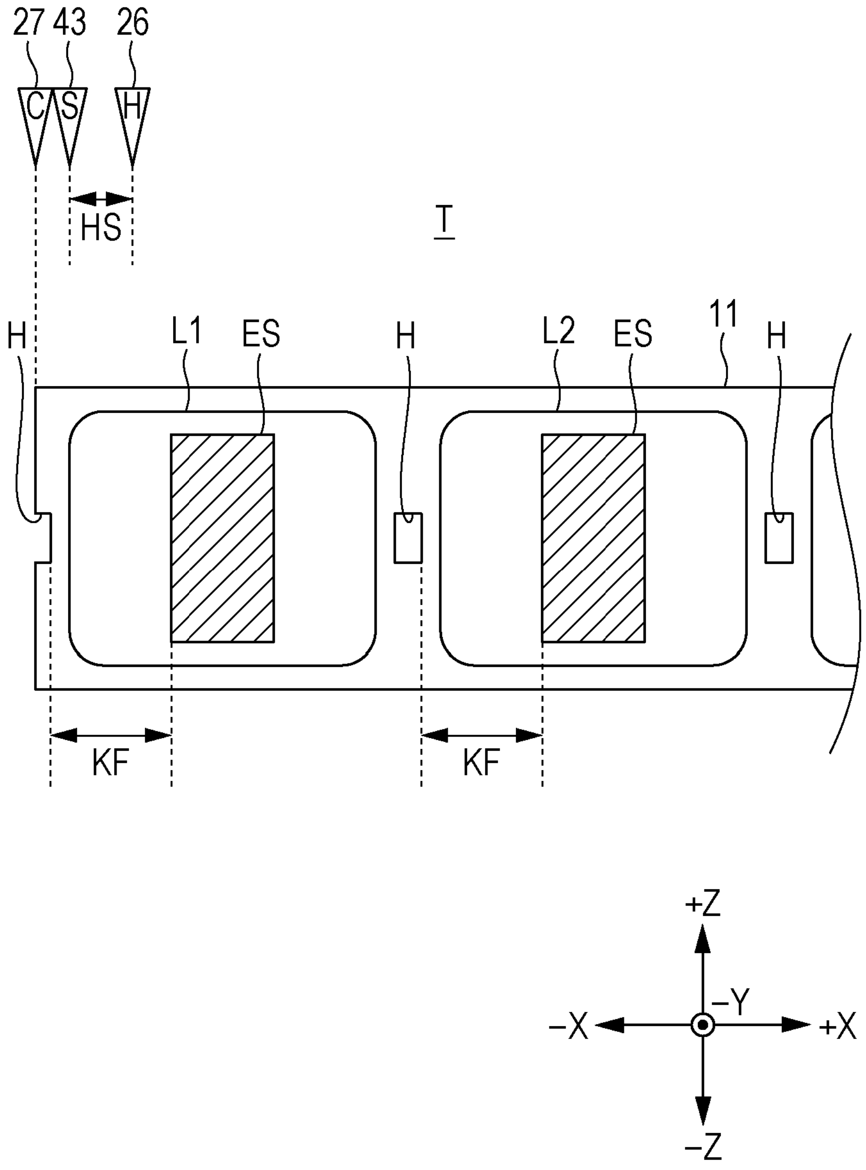
FIG. 12 is a diagram illustrating a position of the label tape when the first printing process is started.

When the printing is performed on the plurality of labels L, the feeding control section 120 measures the measurement feeding pitch, which is the distance between the detection hole H of the first label L1 that is any one of the plurality of labels L and the detection hole H of the second label L2 to be printed after the first label L1 illustrated in FIG. 12, based on a detection result of the sensor 43. The measurement feeding pitch is measured by counting the number of steps for rotating the feeding motor 45*a* after the detection hole H of the first label L1 is detected until the detection hole H of the second label L2 is detected. Hereinafter, the count of the number of steps of the feeding motor 45*a* for measuring the measurement feeding pitch will be referred to as a "correction count".

In addition, the feeding control section 120 corrects a feeding amount of the label tape T after the detection hole H of the second label L2 is detected, based on the measured measurement feeding pitch and the standard feeding pitch SP read out from the ROM 44*b*.

The control of the feeding control section 120 will be described in more detail. The feeding control section 120 performs calculation control of calculating a feeding correction value based on the measurement feeding pitch and the standard feeding pitch SP. The calculated feeding correction value is stored in, for example, the RAM 44*c*. In addition, the feeding control section 120 uses the calculated feeding correction value to perform correction control of correcting the feeding amount of the label tape T in at least a part of a period after the detection hole H of the second label L2 is detected until the printing of the second label L2 or a third label L3 is started. Then, the feeding control section 120 repeats the calculation control and the correction control for each label L.

More specifically, when the first distance KF illustrated in FIG. 2 is longer than the second distance HS illustrated in FIG. 3, in the correction control, the feeding control section 120 corrects the feeding amount of the label tape T in a period after the detection hole H of the second label L2 is detected until the printing of the second label L2 is started. As described above, the first distance KF is the distance between the detection hole H of the label tape T and the printing start position of the label L. The second distance HS is the distance between the sensor 43 and the printing head 26. On the other hand, when the first distance KF is equal to or shorter than the second distance HS, in the correction control, the feeding control section 120 corrects the feeding amount of the label tape T in a period in which the printing is not performed in a period after the detection hole H of the second label L2 is detected until the printing of the third label L3 is started. Details will be described below with specific examples.

When the printing is performed on the plurality of labels L, the printing control section 130 controls the printing head 26 to perform the printing in the same printing target area ES on each label L illustrated in FIG. 2. That is, when the printing is performed on the plurality of labels L, the printing control section 130 does not perform the printing control such that the printing target area ES differs for each label L.

In addition, when the printing is performed on the plurality of labels L, the printing control section 130 performs cueing for locating the printing start position of the n-th label Ln, n being an integer of n≥2, at the printing position by the printing head 26, based on the detection of the detection hole H provided in the −X direction with respect to the (n−1)-th label L(n−1). As described above, the n-th label Ln is the label L disposed at the n-th position from the beginning of the label tape T among the labels L disposed on the label tape T. In the present embodiment, the printing control section 130 performs the cueing of the n-th label Ln based on the detection of an (n−1)-th detection hole H(n−1).

In addition, when the printing is performed on three or more sheets of the labels L, the printing control section 130 performs, for each label L, the cueing on second and subsequent labels L from the beginning of the label tape T. That is, the printing control section 130 performs the cueing for each label L, for example, performs the cueing of the second label L2 based on the detection of the first detection hole H1 and performs the cueing of the third label L3 based on the detection of a second detection hole H2.

In addition, the printing control section 130 performs the cueing of the n-th label Ln by feeding the label tape T by a second distance D2 obtained by subtracting the second distance HS, which is described below and illustrated in FIG. 35, from a distance obtained by adding up the first distance KF of the n-th label Ln and the standard feeding pitch SP, from a point in time when the sensor 43 detects the (n−1)-th detection hole H(n−1). The first distance KF of the n-th label Ln is a distance between the n-th detection hole Hn and the printing start position of the n-th label Ln.

In addition, when the first distance KF of the first label L1 is shorter than the second distance HS, the printing control section 130 performs the cueing of the first label L1 by feeding the label tape T in the +X direction.

A flow of a process of the tape printing apparatus 1 will be described with reference to flowcharts of FIGS. 6 to 11. The process of the tape printing apparatus 1 illustrated in these flowcharts is an example of a "control method of a tape printing apparatus".

Figure 6:
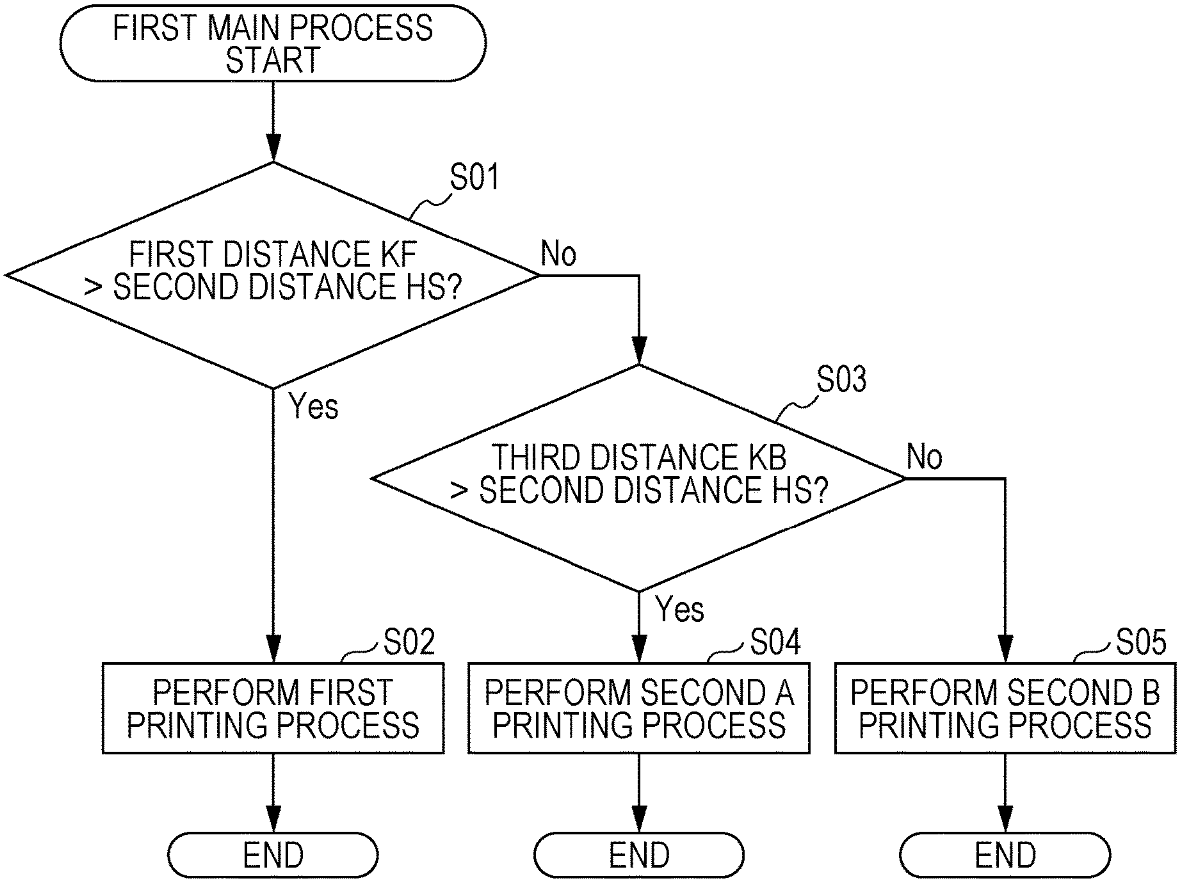
FIG. 6 is a flowchart illustrating a first main process.

First, a first main process of the tape printing apparatus 1 will be described with reference to the flowchart of FIG. 6. The first main process is a process executed by using a printing instruction as a trigger. The tape printing apparatus 1 generates the printed data in response to the printing instruction. The process illustrated in FIGS. 6 to 11 is executed based on this printed data.

In step S01, the tape printing apparatus 1 discriminates whether or not the first distance KF is longer than the second distance HS. The first distance KF is a distance calculated based on the printed data. When the tape printing apparatus 1 discriminates that the first distance KF is longer than the second distance HS, the tape printing apparatus 1 proceeds to step S02. In addition, when the tape printing apparatus 1 discriminates that the first distance KF is not longer than the second distance HS, that is, the first distance KF is equal to or shorter than the second distance HS, the tape printing apparatus 1 proceeds to step S03.

Figure 7:
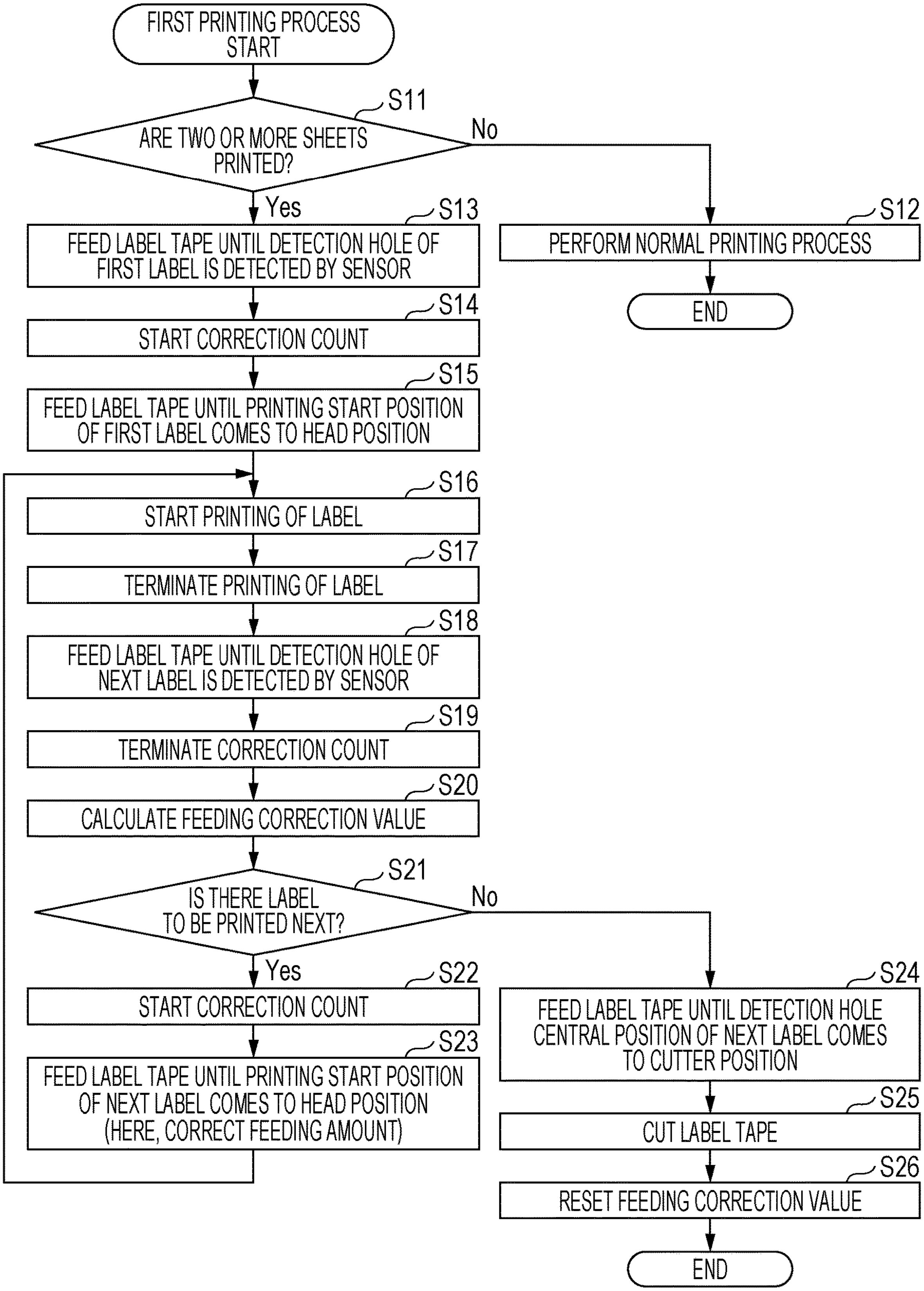
FIG. 7 is a flowchart illustrating a first printing process.

In step S02, the tape printing apparatus 1 performs a first printing process illustrated in FIG. 7.

In step S03, the tape printing apparatus 1 discriminates whether or not the third distance KB illustrated in FIG. 2 is longer than the second distance HS. The third distance KB is a distance between the detection hole H of the label tape T and a printing termination position of the label L, and is a distance calculated based on the printed data. When the tape printing apparatus 1 discriminates that the third distance KB is longer than the second distance HS, the tape printing apparatus 1 proceeds to step S04. In addition, when the tape printing apparatus 1 discriminates that the third distance KB is not longer than the second distance HS, that is, the third distance KB is equal to or shorter than the second distance HS, the tape printing apparatus 1 proceeds to step S05.

Figure 8:
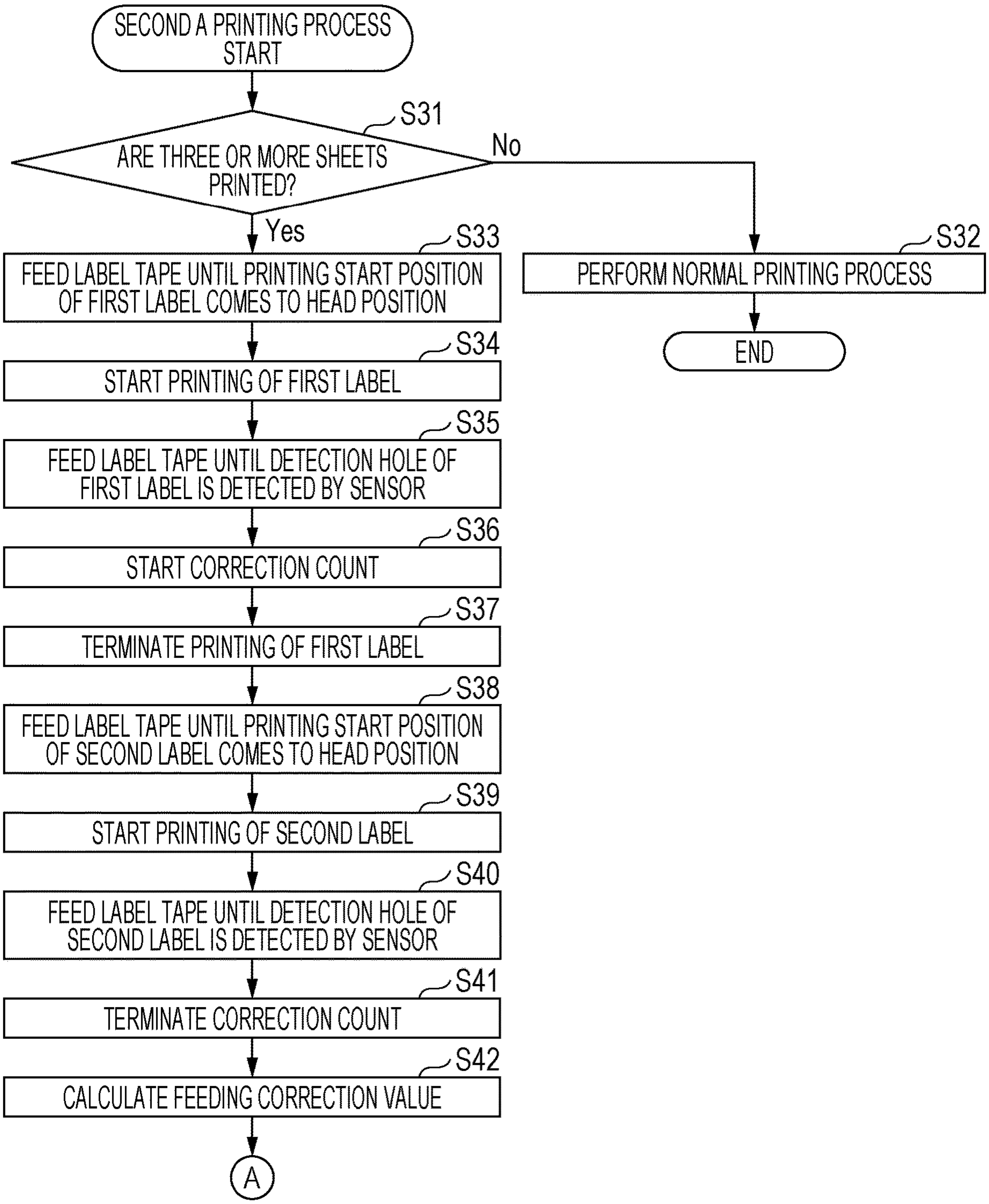
FIG. 8 is a flowchart illustrating a second A printing process.
Figure 9:
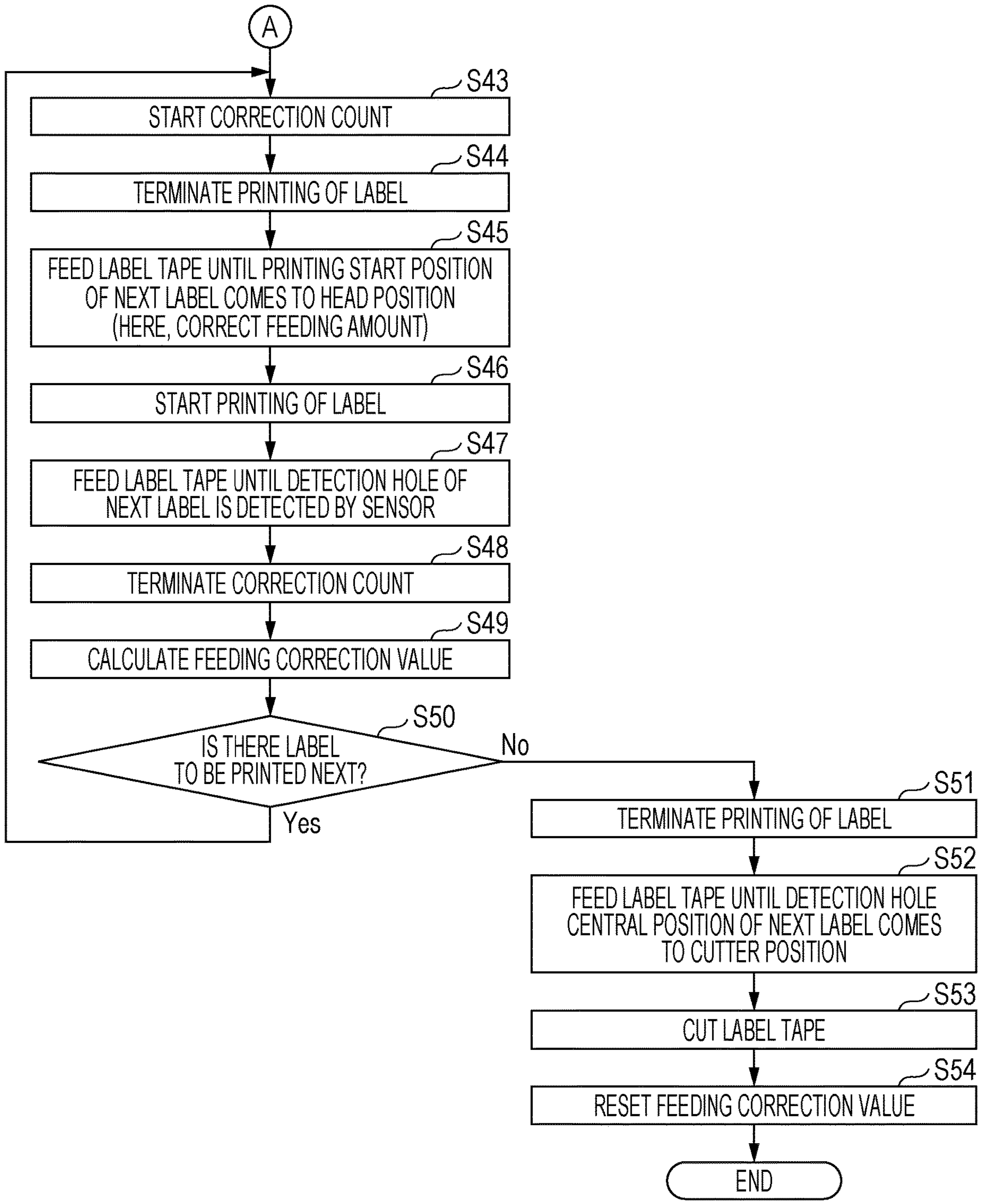
FIG. 9 is a flowchart following FIG. 8.

In step S04, the tape printing apparatus 1 performs a second A printing process, as illustrated in FIGS. 8 and 9.

Figure 10:
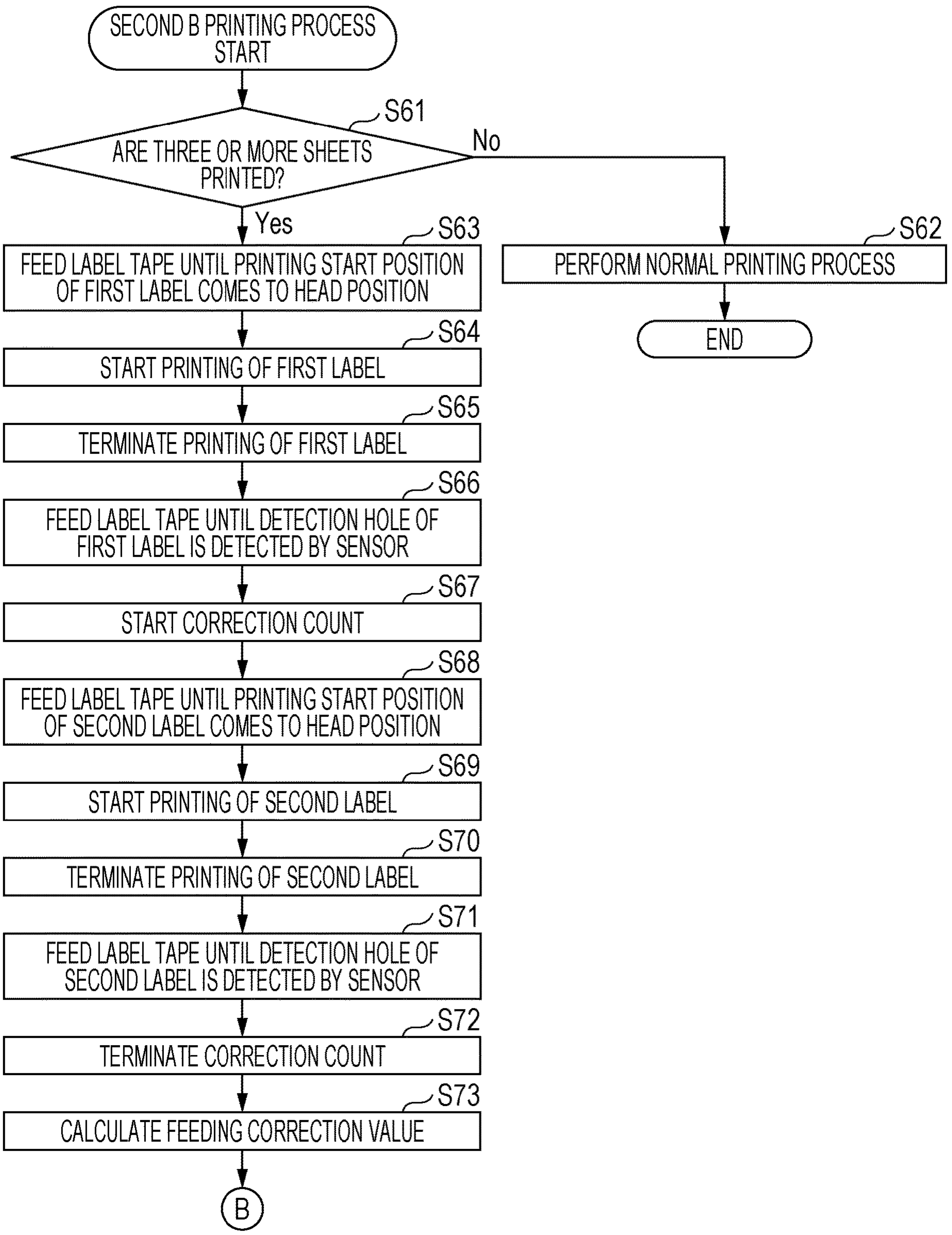
FIG. 10 is a flowchart illustrating a second B printing process.
Figure 11:
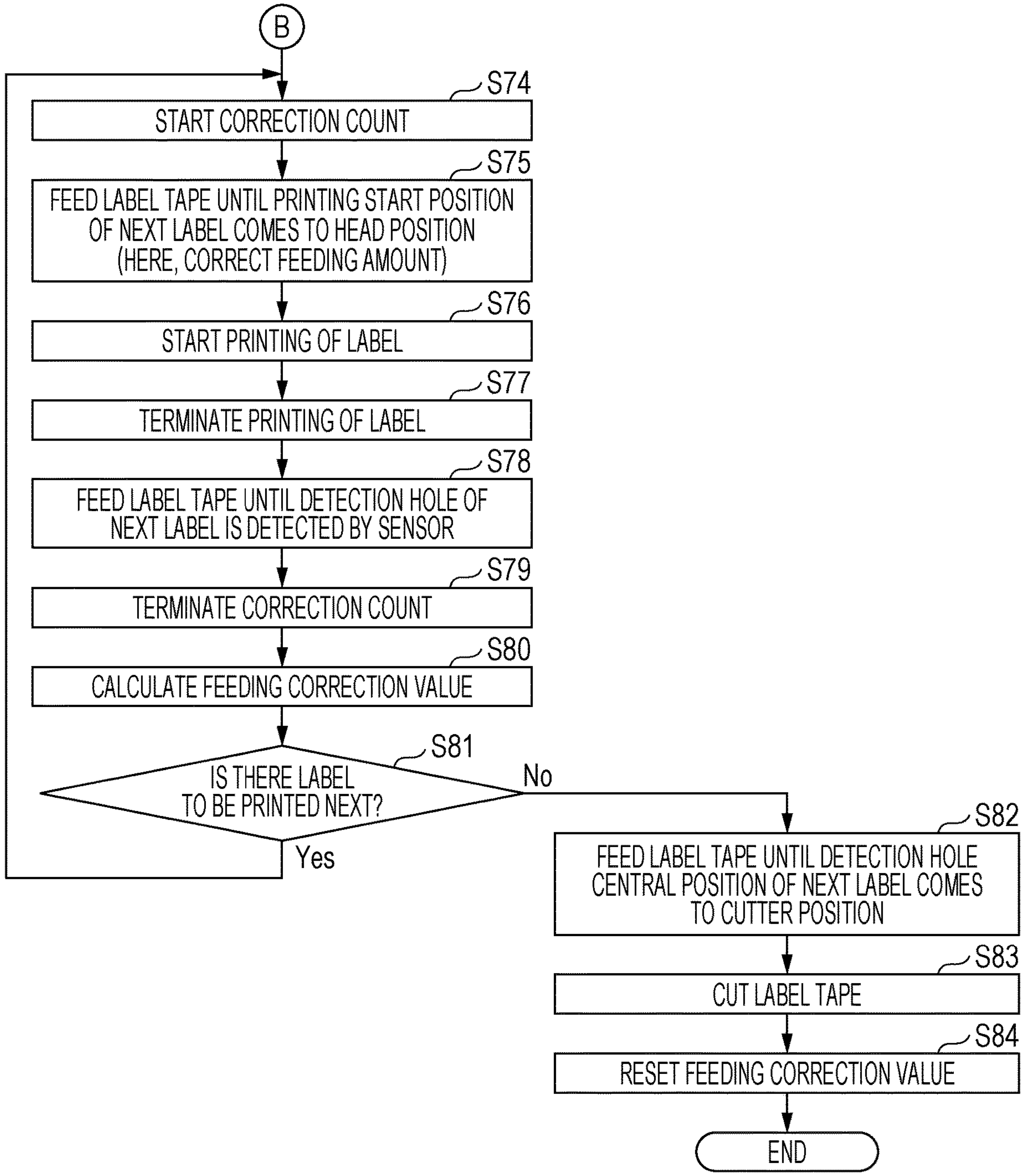
FIG. 11 is a flowchart following FIG. 10.

In step S05, the tape printing apparatus 1 performs a second B printing process illustrated in FIGS. 10 and 11.

Although the details will be described below, when the first printing process is performed, the tape printing apparatus 1 corrects the feeding amount of the label tape T in a period after the detection hole H of the second label L2 is detected until the printing of the second label L2 is started, based on the measurement result of the measurement feeding pitch of the first label L1. In addition, when the second A printing process is performed, the tape printing apparatus 1 corrects the feeding amount of the label tape T in a period after the printing of the second label L2 is terminated until the printing of the third label L3 is started, based on the measurement result of the measurement feeding pitch of the first label L1. In addition, when the second B printing process is performed, the tape printing apparatus 1 corrects the feeding amount of the label tape T in a period after the detection hole H of the second label L2 is detected until the printing of the third label L3 is started, based on the measurement result of the measurement feeding pitch of the first label L1.

It should be noted that, in the following description, the second A printing process and the second B printing process will be collectively referred to as a "second printing process". In the first printing process, the feeding amount of the label tape T in a period after the detection hole H of the second label L2 is detected until the printing of the second label L2 is started is corrected. On the other hand, in the second printing process, the feeding amount of the label tape T in a period in which the printing is not performed in a period after the detection hole H of the second label L2 is detected until the printing of the third label L3 is started is corrected.

The first printing process of the tape printing apparatus 1 will be described with reference to the flowchart of FIG. 7. The first printing process will be described with reference to FIGS. 12 to 16. It should be noted that, in the drawings of FIG. 12 and subsequent drawings, a downward triangular mark including a character "C" indicates a position of the cutter 27 in the X axis direction. A downward triangular mark including a character "S" indicates a position of the sensor 43 in the X axis direction. In addition, a downward triangular mark including a character "H" indicates a position of the printing head 26 in the X axis direction. Hereinafter, the position of the cutter 27 in the X axis direction will be referred to as a "cutter position", and the position of the printing head 26 in the X axis direction will be referred to as a "head position".

The first printing process is a process performed when it is discriminated that the first distance KF is longer than the second distance HS, as illustrated in FIG. 12. FIG. 12 is a diagram illustrating a position of the label tape T when the first printing process is started. When the first printing process is started, a central position of the detection hole H in the X axis direction is located at the cutter position. Hereinafter, the central position of the detection hole H in the X axis direction will be referred to as a "detection hole central position".

In step S11, the tape printing apparatus 1 discriminates whether or not to print two or more sheets, based on the printed data. When the tape printing apparatus 1 discriminates to print two or more sheets, the tape printing apparatus 1 proceeds to step S13. In addition, when the tape printing apparatus 1 discriminates not to print two or more sheets, that is, to print only one sheet, the tape printing apparatus 1 proceeds to step S12.

In step S12, the tape printing apparatus 1 performs a normal printing process. Here, the normal printing process means a printing process that does not perform the correction control of correcting the feeding amount of the label tape T. After step S12, the tape printing apparatus 1 terminates the first printing process.

Figure 13:
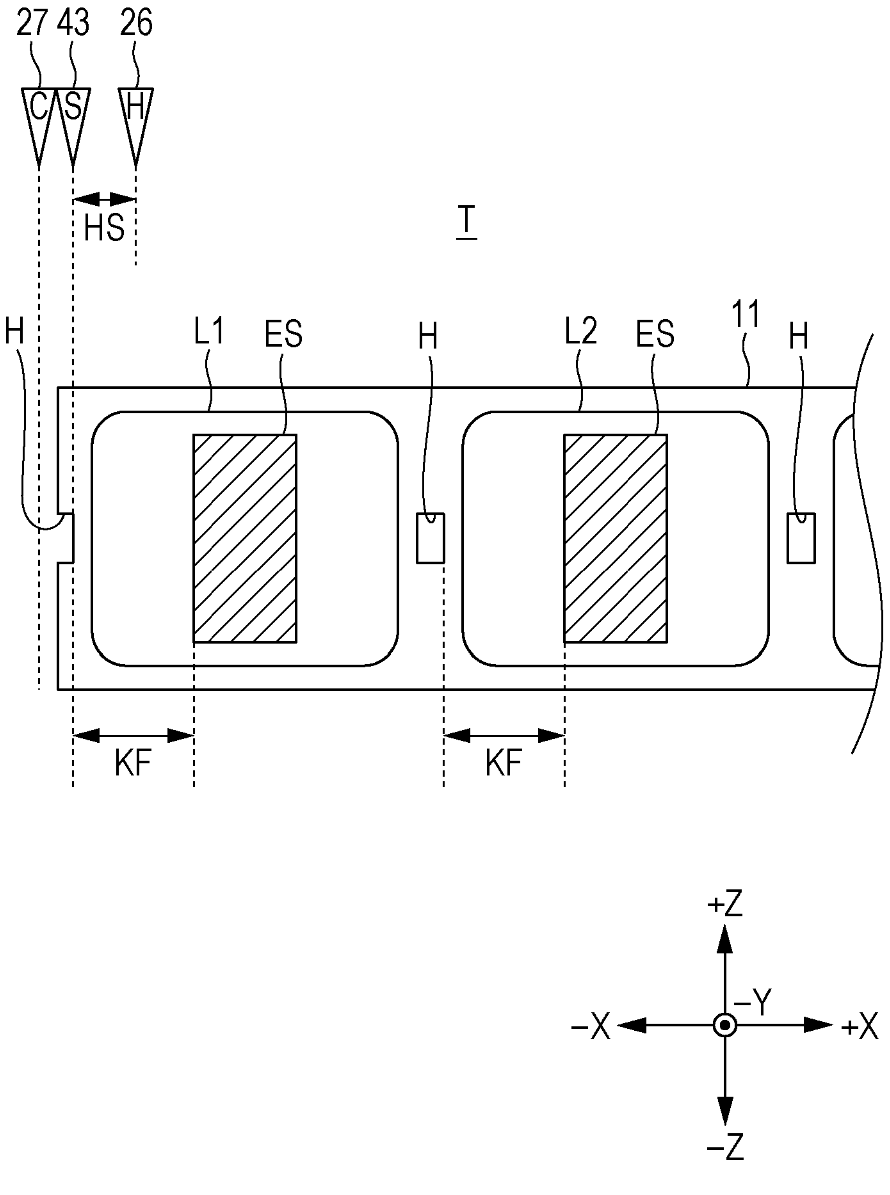
FIG. 13 is a diagram illustrating a position of the label tape when correction count of a first label is started in the first printing process.

In step S13, the tape printing apparatus 1 feeds the label tape T until the detection hole H of the first label L1 is detected by the sensor 43, as illustrated in FIG. 13. In the example of FIG. 13, the tape printing apparatus 1 detects the detection hole H of the first label L1 by feeding the label tape T in the +X direction. It should be noted that, in the following description, simply "feeding the label tape T" means feeding the label tape T in the −X direction.

In step S14, the tape printing apparatus 1 starts the correction count, as illustrated in FIG. 13.

In step S15, the tape printing apparatus 1 feeds the label tape T until the printing start position of the first label L1 comes to the head position.

In step S16, the tape printing apparatus 1 starts the printing of the label L.

In step S17, the tape printing apparatus 1 terminates the printing of the label L.

Figure 14:
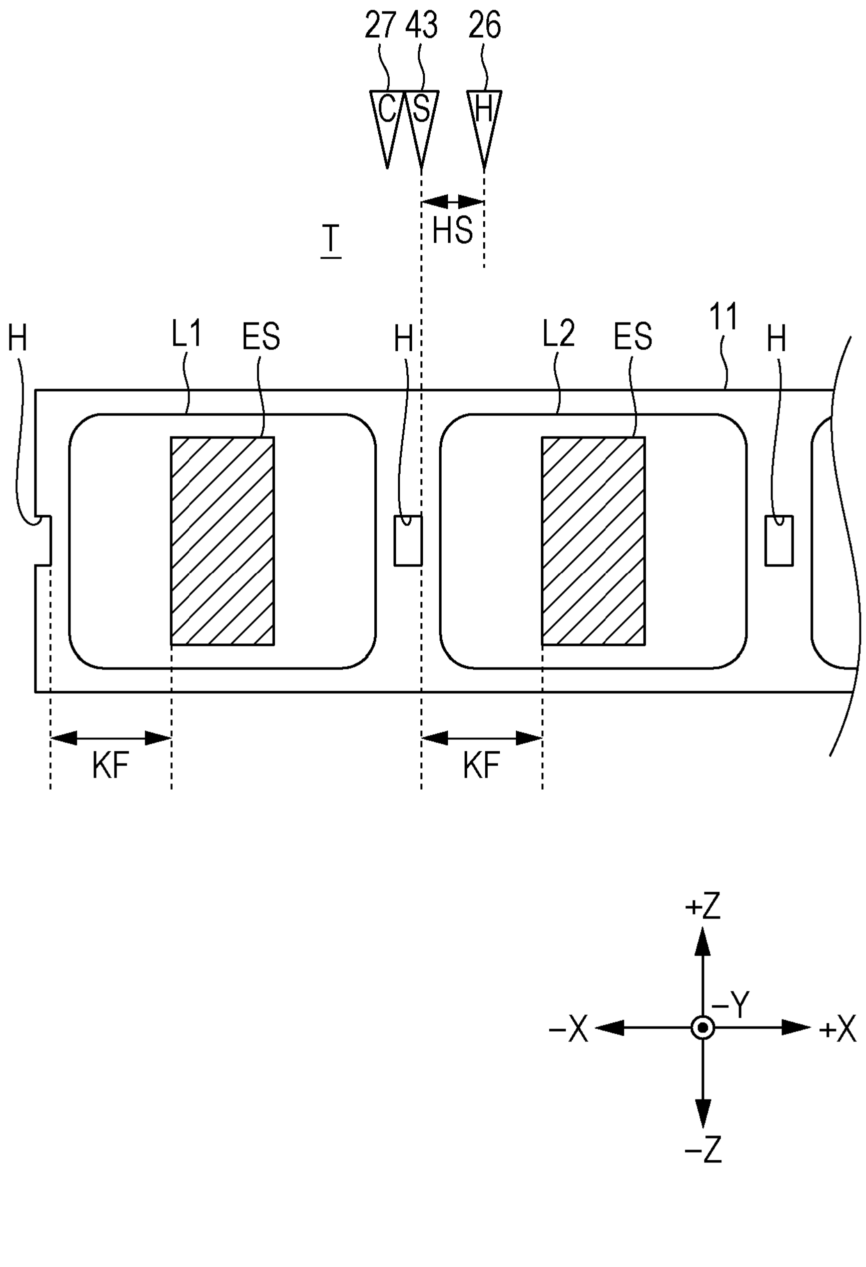
FIG. 14 is a diagram illustrating a position of the label tape when correction count of a second label is started in the first printing process.

In step S18, the tape printing apparatus 1 feeds the label tape T until the detection hole H of the next label L is detected by the sensor 43, as illustrated in FIG. 14. In FIG. 14, the tape printing apparatus 1 feeds the label tape T until the detection hole H of the second label L2 is detected.

In step S19, the tape printing apparatus 1 terminates the correction count, as illustrated in FIG. 14.

In step S20, the tape printing apparatus 1 calculates the feeding correction value. The tape printing apparatus 1 calculates the feeding correction value based on the following calculation expression indicated by [Math. 1]. In [Math. 1], "CC" indicates the feeding correction value. "CP" indicates the measurement feeding pitch that is the distance between the detection holes H calculated from the correction count. "DLP" indicates the standard feeding pitch SP read out by the readout section 110.

$$CC = (CP[\text{mm}]/DLP[\text{mm}]) - 1 \quad \text{[Math. 1]}$$

In step S21, the tape printing apparatus 1 discriminates whether or not there is the label L to be printed next, based on the printed data. When the tape printing apparatus 1 discriminates that there is the label L to be printed next, the tape printing apparatus 1 proceeds to step S22. When the tape printing apparatus 1 discriminates that there is no label L to be printed next, that is, discriminates that the printing of all the labels L is terminated, the tape printing apparatus 1 proceeds to step S24.

In step S22, the tape printing apparatus 1 starts the correction count, as illustrated in FIG. 14.

Figure 15:
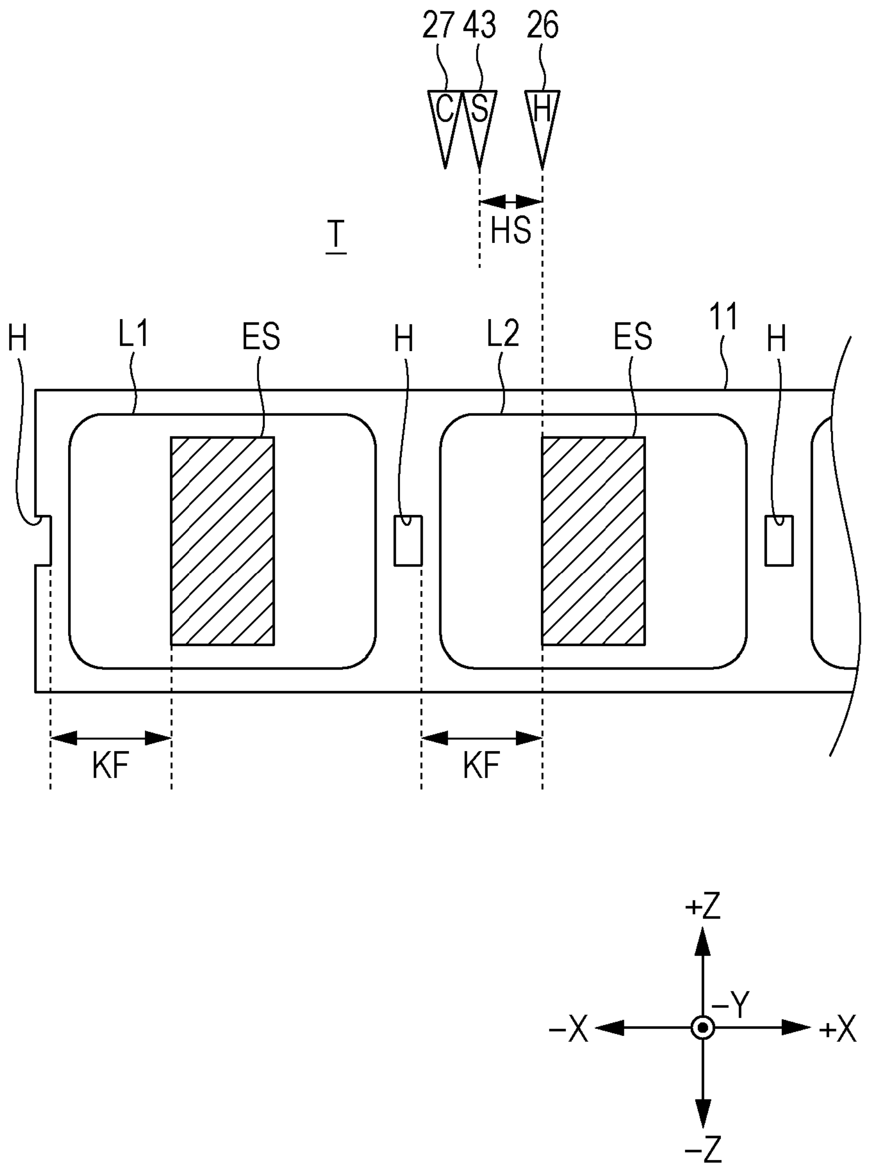
FIG. 15 is a diagram illustrating a position of the label tape when printing of the second label is started in the first printing process.

In step S23, the tape printing apparatus 1 feeds the label tape T until the printing start position of the next label L comes to the head position, as illustrated in FIG. 15. In FIG. 15, the tape printing apparatus 1 feeds the label tape T until the printing start position of the second label L2 comes to the head position. In this case, the tape printing apparatus 1 starts the printing of the second label L2 after feeding the label tape T by a length indicated by [Math. 2] from the position of the label tape T when the sensor 43 detects the detection hole H of the second label L2 illustrated in FIG. 14. In [Math. 2], "KF" indicates a theoretical first distance KF. In addition, "HS" indicates a theoretical second distance HS. In addition, "CC" indicates the feeding correction value calculated using [Math. 1]. As described above, the tape printing apparatus 1 feeds the label tape T by a length obtained by subtracting the second distance HS from the first distance KF in the normal printing process, but the tape printing apparatus 1 corrects the feeding amount of the label tape T by feeding the label tape T by the length indicated by [Math. 2] in the first printing process.

$$(KF[\text{mm}] - HS[\text{mm}]) + (KF[\text{mm}] - HS[\text{mm}]) \times CC \quad \text{[Math. 2]}$$

After step S23, the tape printing apparatus 1 returns to step S16.

Figure 16:
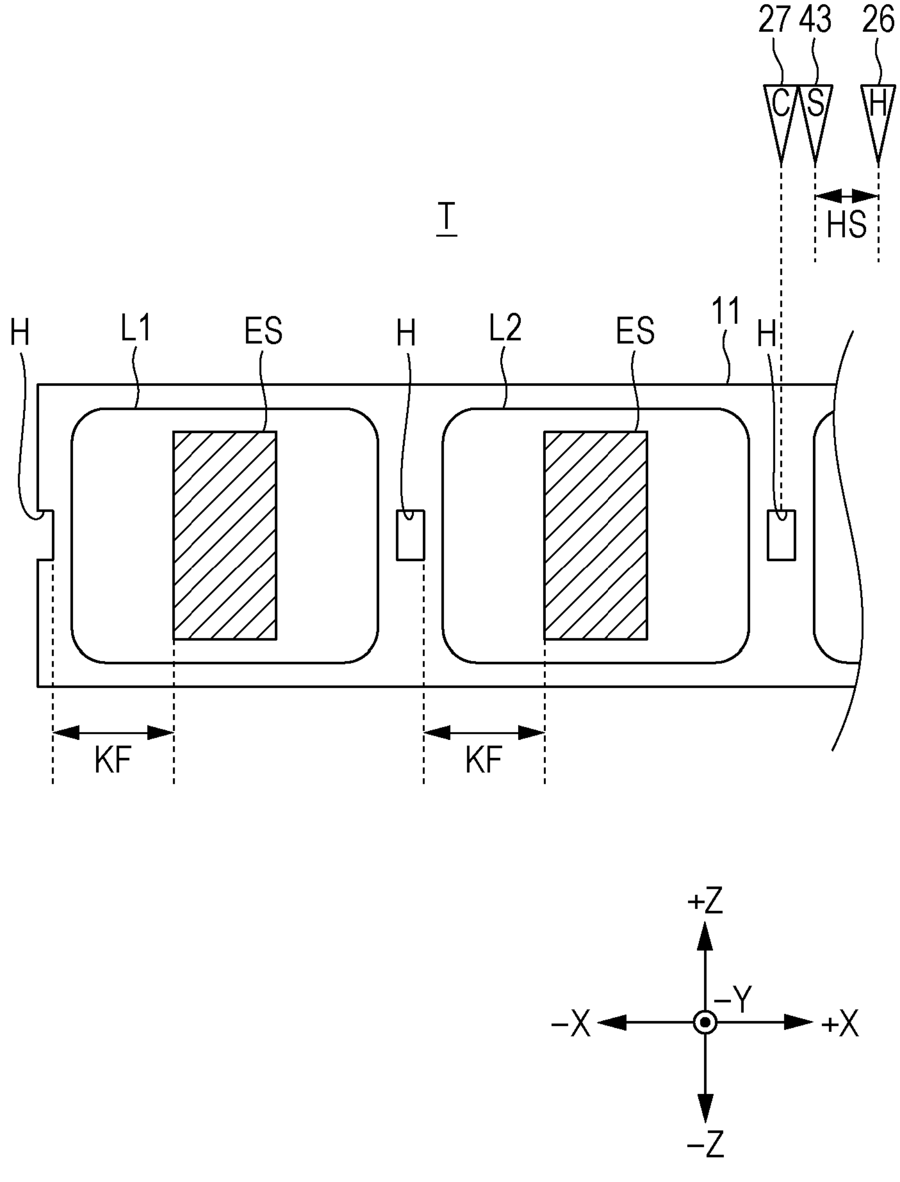
FIG. 16 is a diagram illustrating a position when the label tape is cut after the printing of the second label is terminated in the first printing process.

In step S24, the tape printing apparatus 1 feeds the label tape T until the detection hole central position of the next label L comes to the cutter position, as illustrated in FIG. 16. In FIG. 16, the tape printing apparatus 1 feeds the label tape T until the detection hole central position of the third label L3 comes to the cutter position. The tape printing apparatus 1 feeds the label tape T by a length obtained by subtracting ½ of the length of the detection hole H in the X axis direction from the distance between the sensor 43 and the cutter 27 in the X axis direction, after detecting the detection hole H of the next label L, thereby aligning the detection hole central position with the cutter position.

In step S25, the tape printing apparatus 1 cuts the label tape T by using the cutter 27, as illustrated in FIG. 16.

In step S26, the tape printing apparatus 1 resets the feeding correction value. After step S26, the tape printing apparatus 1 terminates the first printing process. It should be noted that the reset of the feeding correction value may be performed after it is discriminated that there is no label L to be printed next in step S21 and before the label tape T is cut.

Figure 17:
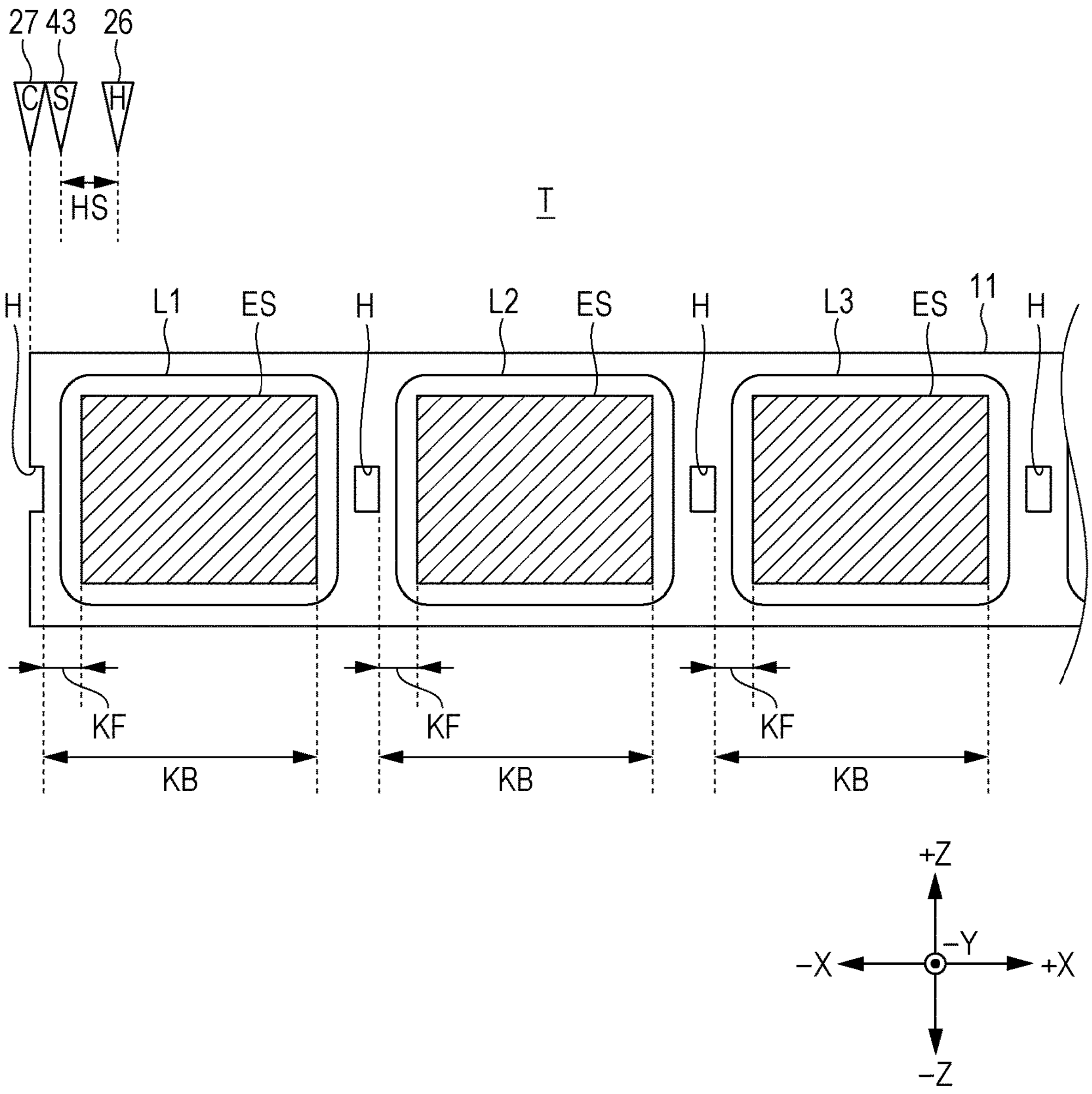
FIG. 17 is a diagram illustrating a position of the label tape when the second A printing process is started.

The second A printing process of the tape printing apparatus 1 will be described with reference to the flowcharts of FIGS. 8 and 9. The second A printing process will be described with reference to FIGS. 17 to 23. The second A printing process is a process performed when it is discriminated that the first distance KF is equal to or shorter than the second distance HS and the third distance KB is longer than the second distance HS, as illustrated in FIG. 17. FIG. 17 is a diagram illustrating a position of the label tape T when the second A printing process is started.

In step S31 in FIG. 8, the tape printing apparatus 1 discriminates whether or not to print three or more sheets, based on the printed data. When the tape printing apparatus 1 discriminates to print three or more sheets, the tape printing apparatus 1 proceeds to step S33. In addition, when the tape printing apparatus 1 discriminates not to print three or more sheets, that is, to print only two or less sheets, the tape printing apparatus 1 proceeds to step S32.

In step S32, the tape printing apparatus 1 performs the normal printing process. After step S32, the tape printing apparatus 1 terminates the second A printing process.

Figure 18:
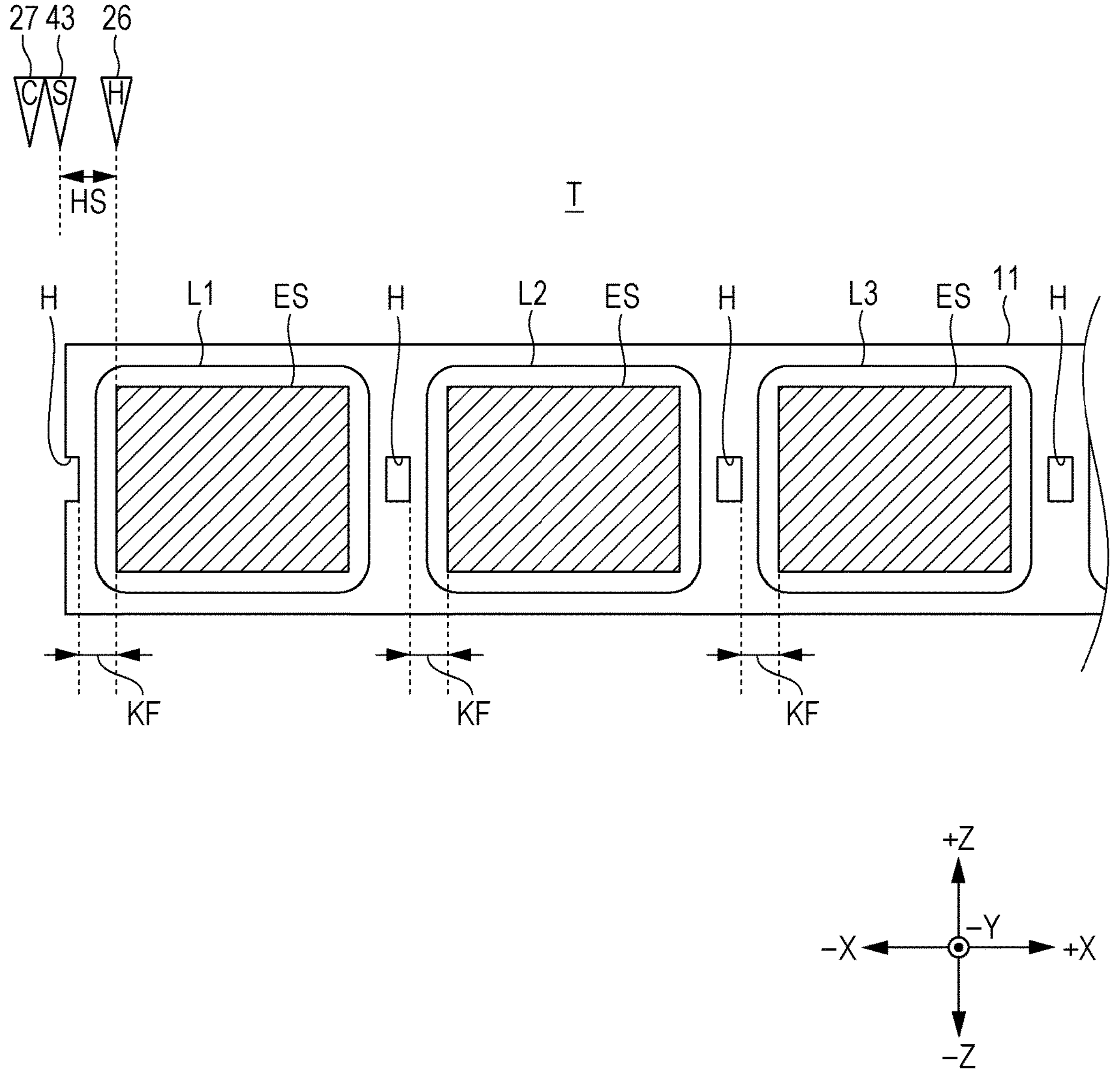
FIG. 18 is a diagram illustrating a position of the label tape when printing of the first label is started in the second A printing process.

In step S33, the tape printing apparatus 1 feeds the label tape T until the printing start position of the first label L1 comes to the head position, as illustrated in FIG. 18. In the example of FIG. 18, the tape printing apparatus 1 feeds the label tape T in the +X direction, thereby aligning the printing start position of the first label L1 with the head position. It should be noted that, before executing step S33, as illustrated in FIG. 19, the tape printing apparatus 1 may execute step S33 feeding the label tape T in the +X direction until the detection hole H of the first label L1 is detected by the sensor 43 and then further feeding the label tape T in the +X direction by a length obtained by subtracting the first distance KF from the second distance HS from the state in FIG. 17.

In step S34, the tape printing apparatus 1 starts the printing of the first label L1, as illustrated in FIG. 18.

Figure 19:
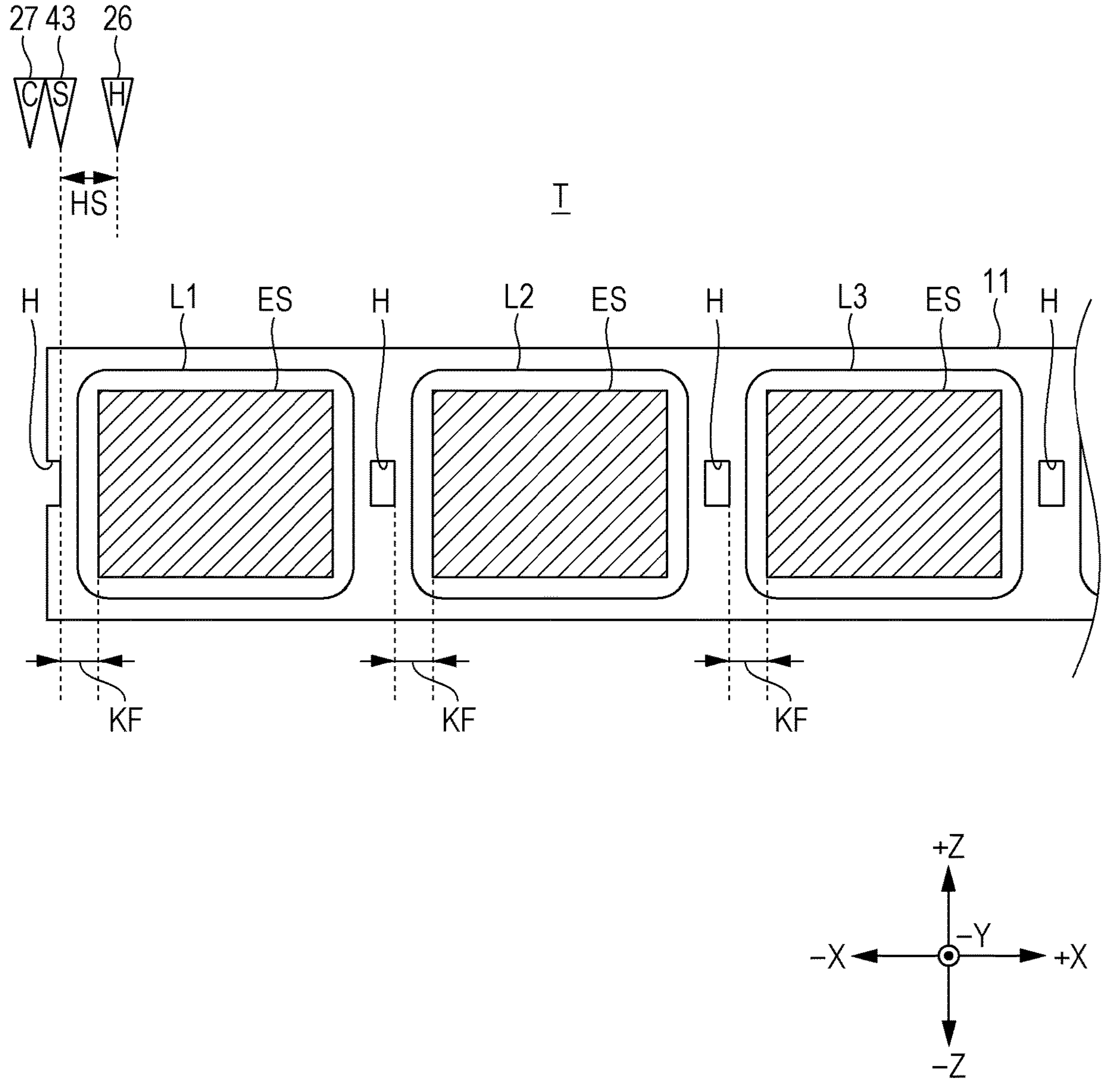
FIG. 19 is a diagram illustrating a position of the label tape when the correction count of the first label is started in the second A printing process.

In step S35, the tape printing apparatus 1 feeds the label tape T until the detection hole H of the first label L1 is detected by the sensor 43, as illustrated in FIG. 19.

In step S36, the tape printing apparatus 1 starts the correction count, as illustrated in FIG. 19.

In step S37, the tape printing apparatus 1 terminates the printing of the first label L1.

In step S38, the tape printing apparatus 1 feeds the label tape T until the printing start position of the second label L2 comes to the head position.

In step S39, the tape printing apparatus 1 starts the printing of the second label L2.

Figure 20:
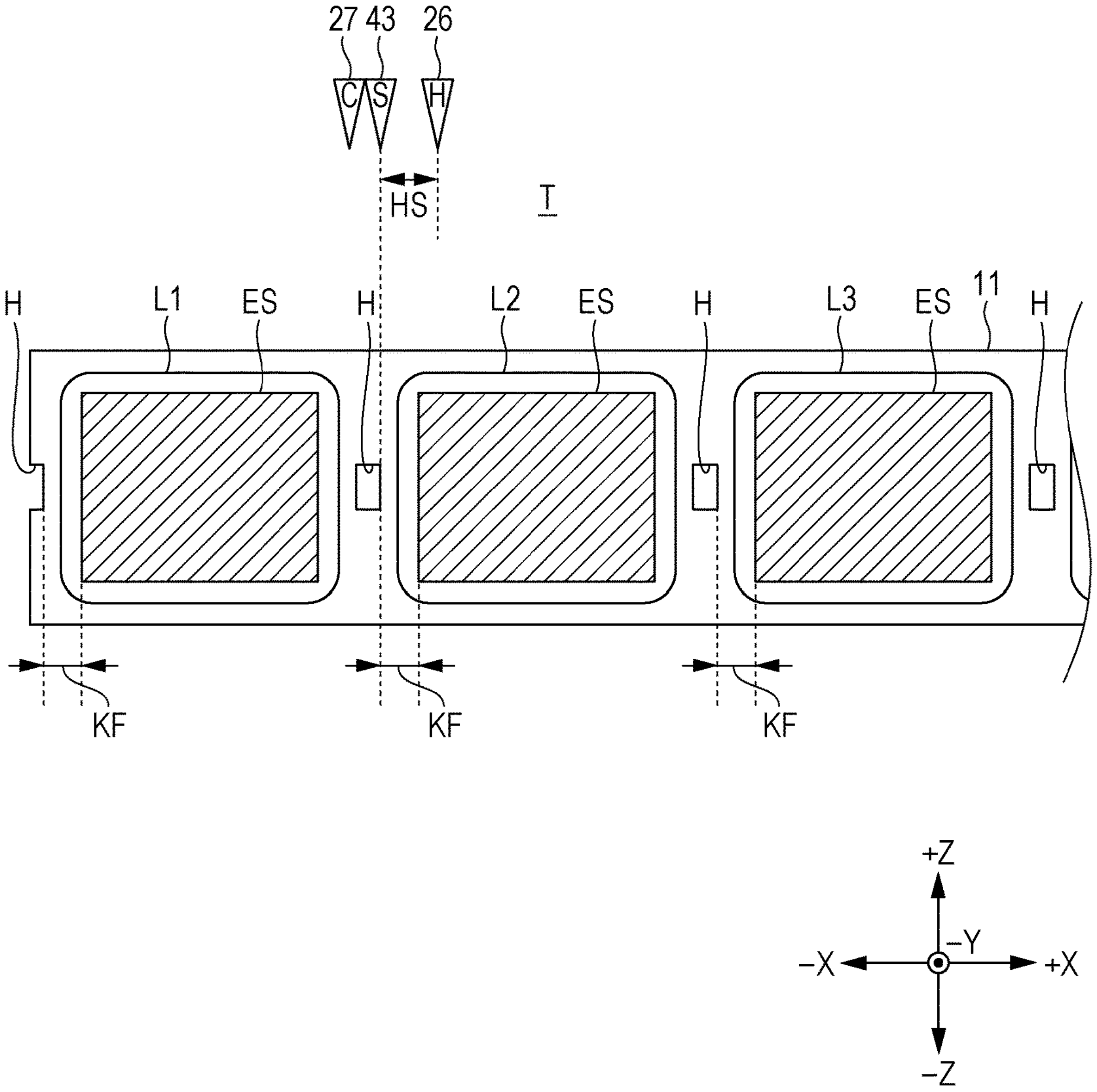
FIG. 20 is a diagram illustrating a position of the label tape when the correction count of the second label is started in the second A printing process.

In step S40, the tape printing apparatus 1 feeds the label tape T until the detection hole H of the second label L2 is detected by the sensor 43, as illustrated in FIG. 20.

In step S41, the tape printing apparatus 1 terminates the correction count, as illustrated in FIG. 20.

In step S42, the tape printing apparatus 1 calculates the feeding correction value. The tape printing apparatus 1 calculates the feeding correction value based on the calculation expression indicated by [Math. 1].

In step S43 in FIG. 9, the tape printing apparatus 1 starts the correction count, as illustrated in FIG. 20.

Figure 21:
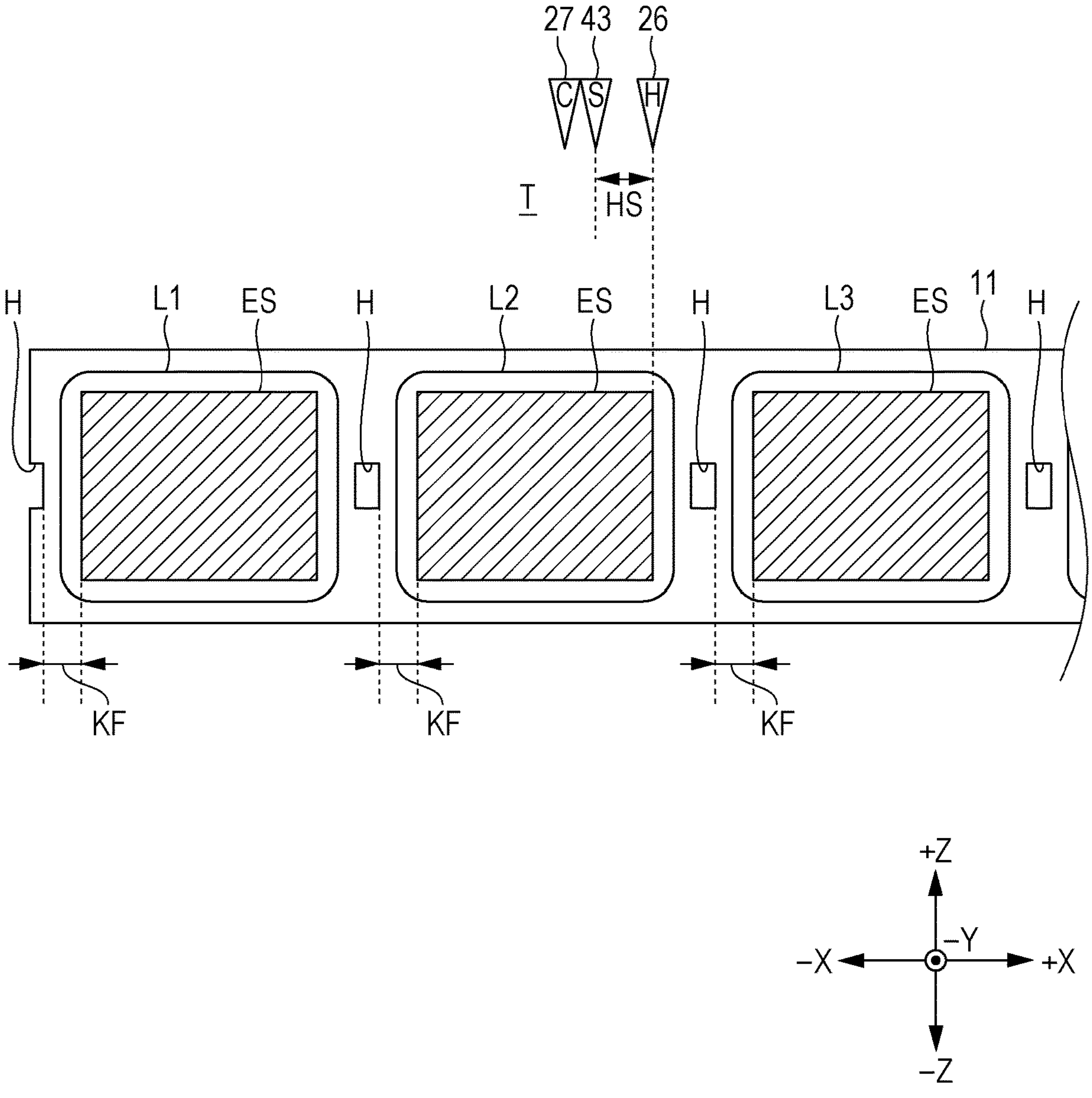
FIG. 21 is a diagram illustrating a position of the label tape when the printing of the second label is terminated in the second A printing process.

In step S44, the tape printing apparatus 1 terminates the printing of the label L, as illustrated in FIG. 21. In FIG. 21, the tape printing apparatus 1 terminates the printing of the second label L2.

Figure 22:
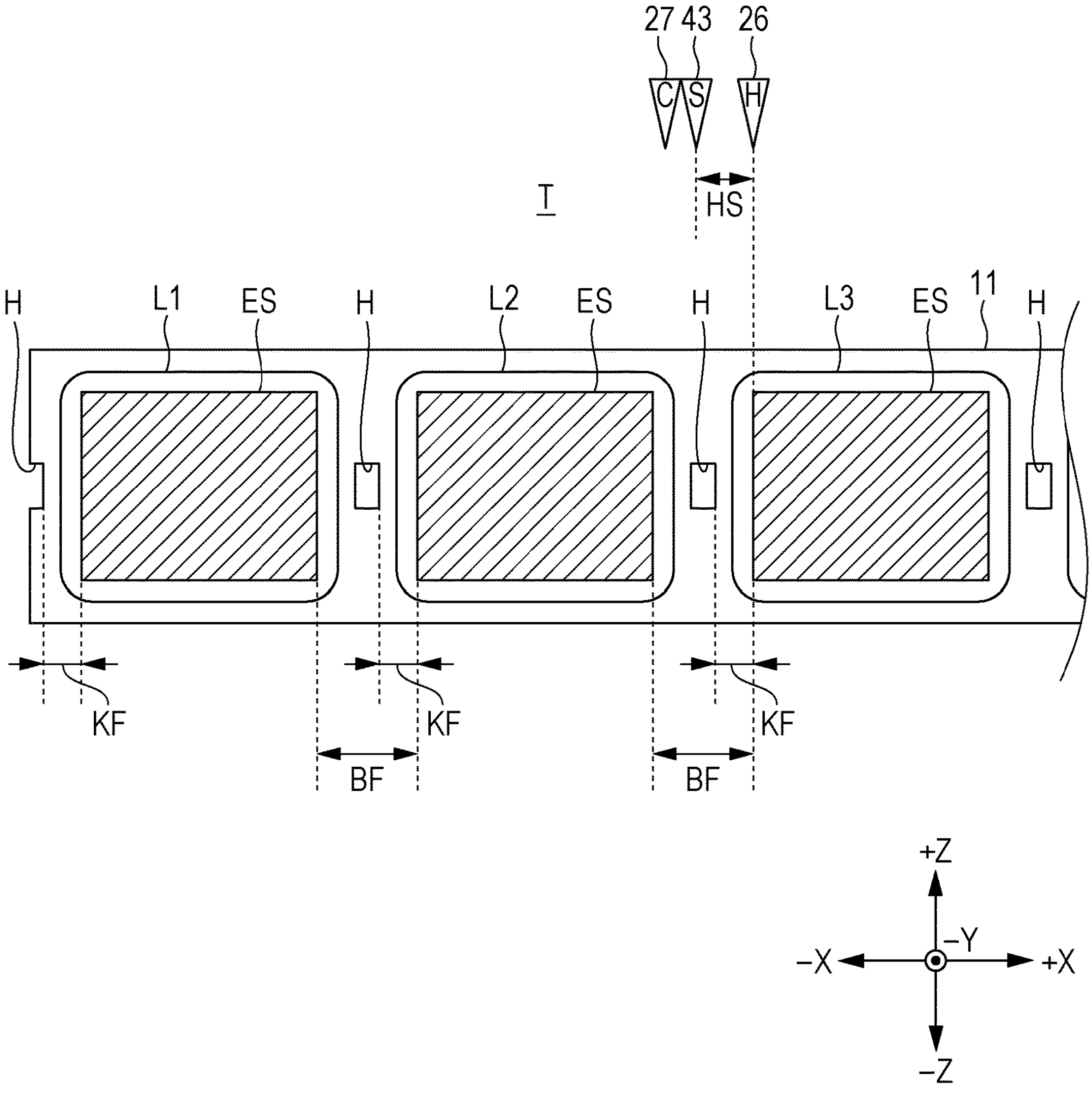
FIG. 22 is a diagram illustrating a position of the label tape when printing of a third label is started in the second A printing process.

In step S45, the tape printing apparatus 1 feeds the label tape T until the printing start position of the next label L comes to the head position, as illustrated in FIG. 22. In FIG. 22, the tape printing apparatus 1 feeds the label tape T until the printing start position of the third label L3 comes to the head position. In this case, the tape printing apparatus 1 starts the printing of the next third label L3 after feeding the label tape T by a length indicated by [Math. 3] from the position of the label tape T when the printing of the second label L2 is terminated, as illustrated in FIG. 21. In [Math. 3], "BF" indicates a fourth distance BF which is a theoretical distance from the printing termination position of the label L to the printing start position of the label L to be printed next, as illustrated in FIG. 22. In other words, the fourth distance BF is a distance obtained by adding up a theoretical distance from the printing termination position of the label L to the detection hole H of the label L to be printed next, and a theoretical distance from the detection hole H of the label L to the printing start position of the label L. As described above, the tape printing apparatus 1 feeds the label tape T by the fourth distance BF in the normal printing process, but the tape printing apparatus 1 corrects the feeding amount of the label tape T by feeding the label tape T by the length indicated by [Math. 3] in the second A printing process. It should be noted that the fourth distance BF is a distance calculated based on the printed data.

$$BF[\text{mm}] + BF[\text{mm}] \times CC \qquad \text{[Math. 3]}$$

In step S46, the tape printing apparatus 1 starts the printing of the label L, as illustrated in FIG. 22. In FIG. 22, the tape printing apparatus 1 starts the printing of the third label L3.

In step S47, the tape printing apparatus 1 feeds the label tape T until the detection hole H of the next label L is detected by the sensor 43.

In step S48, the tape printing apparatus 1 terminates the correction count.

In step S49, the tape printing apparatus 1 calculates the feeding correction value. The tape printing apparatus 1 calculates the feeding correction value by using the count result of the correction count from step S43 to step S48, based on the calculation expression indicated by [Math. 1]. For example, when the correction count for measuring the measurement feeding pitch of the second label L2 is terminated in step S48, the tape printing apparatus 1 calculates the feeding correction value for suppressing a shift of the printing position to a fourth label L4.

In step S50, the tape printing apparatus 1 discriminates whether or not there is the label L to be printed next, based on the printed data. When the tape printing apparatus 1 discriminates that there is the label L to be printed next, the tape printing apparatus 1 returns to step S43. When the tape printing apparatus 1 discriminates that there is no label L to be printed next, that is, discriminates that the printing of all the labels L is terminated, the tape printing apparatus 1 proceeds to step S51.

In step S51, the tape printing apparatus 1 terminates the printing of the label L.

Figure 23:
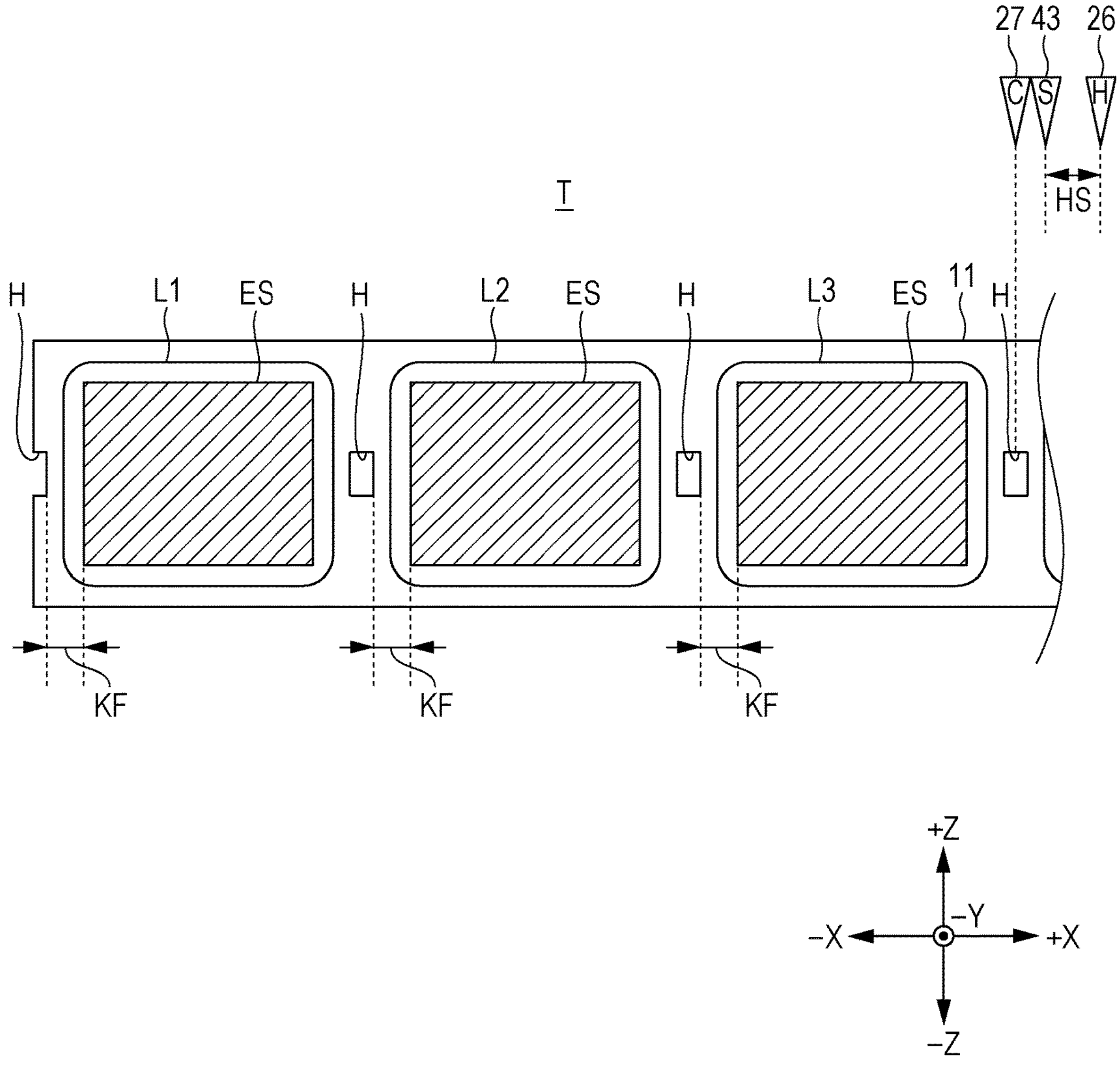
FIG. 23 is a diagram illustrating a position of the label tape when the label tape is cut after the printing of the third label is terminated in the second A printing process.

In step S52, the tape printing apparatus 1 feeds the label tape T until the detection hole central position of the next label L comes to the cutter position, as illustrated in FIG. 23. In FIG. 23, the tape printing apparatus 1 feeds the label tape T until the detection hole central position of the fourth label (not illustrated) next to the third label L3 comes to the cutter position. The tape printing apparatus 1 feeds the label tape T by a length obtained by subtracting ½ of the length of the detection hole H in the X axis direction from the distance between the sensor 43 and the cutter 27 in the X axis direction, after detecting the detection hole H of the next label L, thereby aligning the detection hole central position with the cutter position.

In step S53, the tape printing apparatus 1 cuts the label tape T by using the cutter 27, as illustrated in FIG. 23.

In step S54, the tape printing apparatus 1 resets the feeding correction value. After step S54, the tape printing apparatus 1 terminates the second A printing process.

Figure 24:
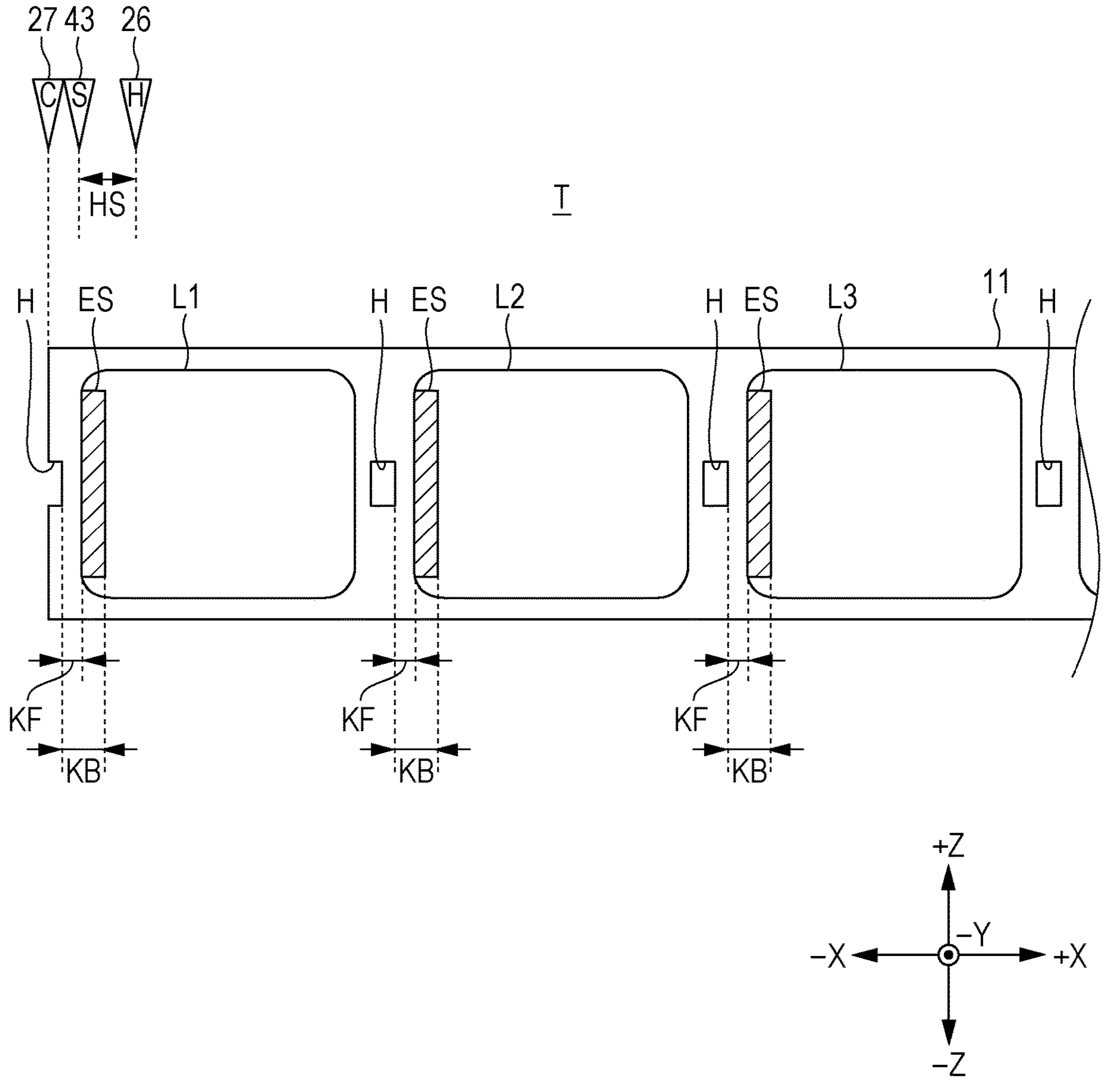
FIG. 24 is a diagram illustrating a position of the label tape when the second B printing process is started.

The second B printing process of the tape printing apparatus 1 will be described with reference to the flowcharts of FIGS. 10 and 11. The second B printing process will be described with reference to FIGS. 24 to 26, and a difference from the second A printing process will be mainly described. As illustrated in FIG. 24, the second B printing process is a process performed when it is discriminated that both the first distance KF and the third distance KB are equal to or shorter than the second distance HS. FIG. 24 is a view illustrating a position of the label tape T when the second B printing process is started.

In step S61 in FIG. 10, the tape printing apparatus 1 discriminates whether or not to print three or more sheets, based on the printed data. When the tape printing apparatus 1 discriminates to print three or more sheets, the tape printing apparatus 1 proceeds to step S63. In addition, when the tape printing apparatus 1 discriminates not to print three or more sheets, that is, to print only two or less sheets, the tape printing apparatus 1 proceeds to step S62.

In step S62, the tape printing apparatus 1 performs the normal printing process. After step S62, the tape printing apparatus 1 terminates the second B printing process.

In step S63, the tape printing apparatus 1 feeds the label tape T until the printing start position of the first label L1 comes to the head position. The tape printing apparatus 1 feeds the label tape T in the +X direction, thereby aligning the printing start position of the first label L1 with the head position.

In step S64, the tape printing apparatus 1 starts the printing of the first label L1.

In step S65, the tape printing apparatus 1 terminates the printing of the first label L1.

In step S66, the tape printing apparatus 1 feeds the label tape T until the detection hole H of the first label L1 is detected by the sensor 43.

In step S67, the tape printing apparatus 1 starts the correction count.

In step S68, the tape printing apparatus 1 feeds the label tape T until the printing start position of the second label L2 comes to the head position.

In step S69, the tape printing apparatus 1 starts the printing of the second label L2.

In step S70, the tape printing apparatus 1 terminates the printing of the second label L2.

Figure 25:
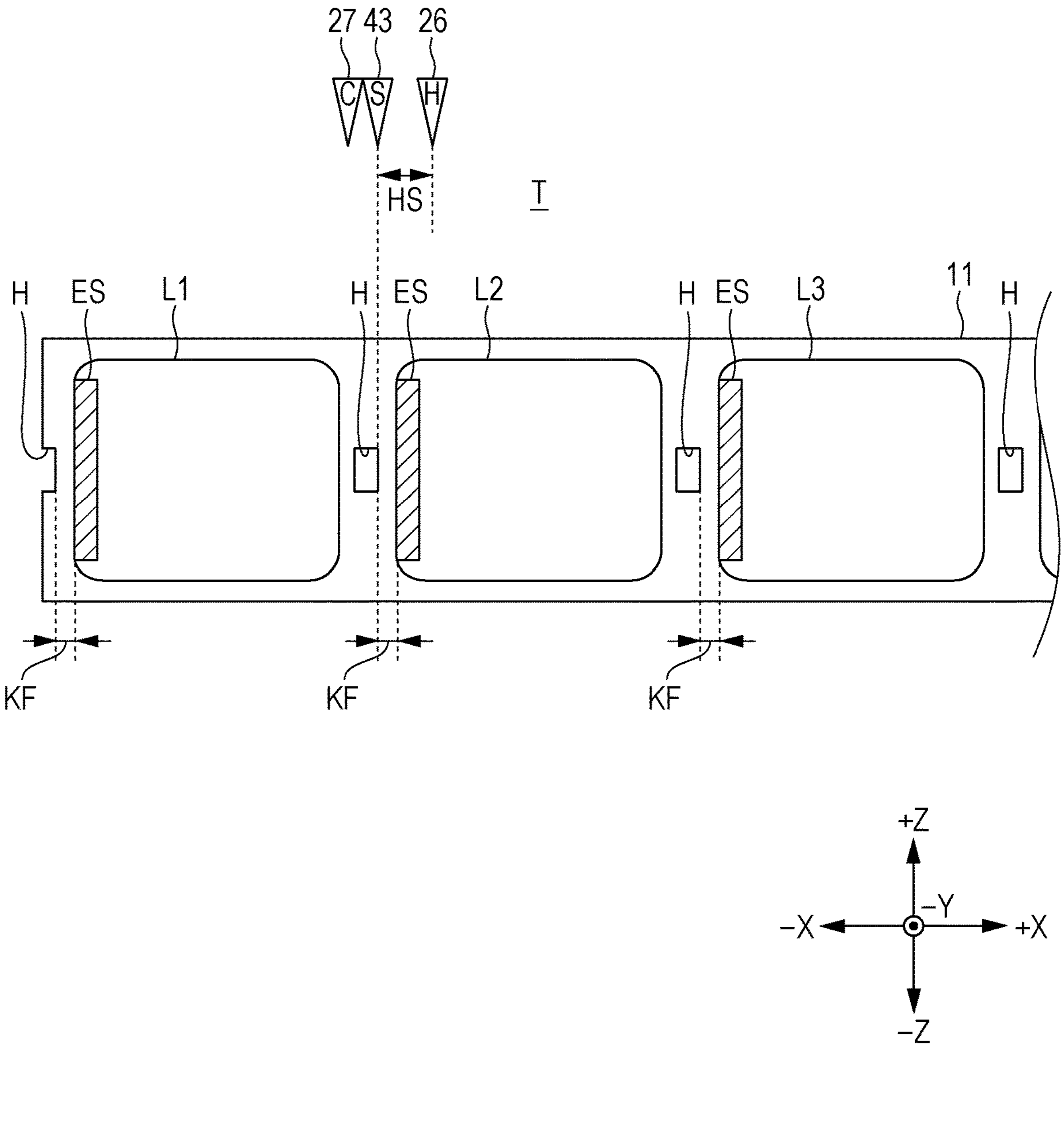
FIG. 25 is a diagram illustrating a position of the label tape when the correction count of the second label is started in the second B printing process.

In step S71, the tape printing apparatus 1 feeds the label tape T until the detection hole H of the second label L2 is detected by the sensor 43, as illustrated in FIG. 25.

In step S72, the tape printing apparatus 1 terminates the correction count, as illustrated in FIG. 25.

In step S73, the tape printing apparatus 1 calculates the feeding correction value. The tape printing apparatus 1 calculates the feeding correction value based on the calculation expression indicated by [Math. 1].

In step S74 in FIG. 11, the tape printing apparatus 1 starts the correction count, as illustrated in FIG. 25.

Figure 26:
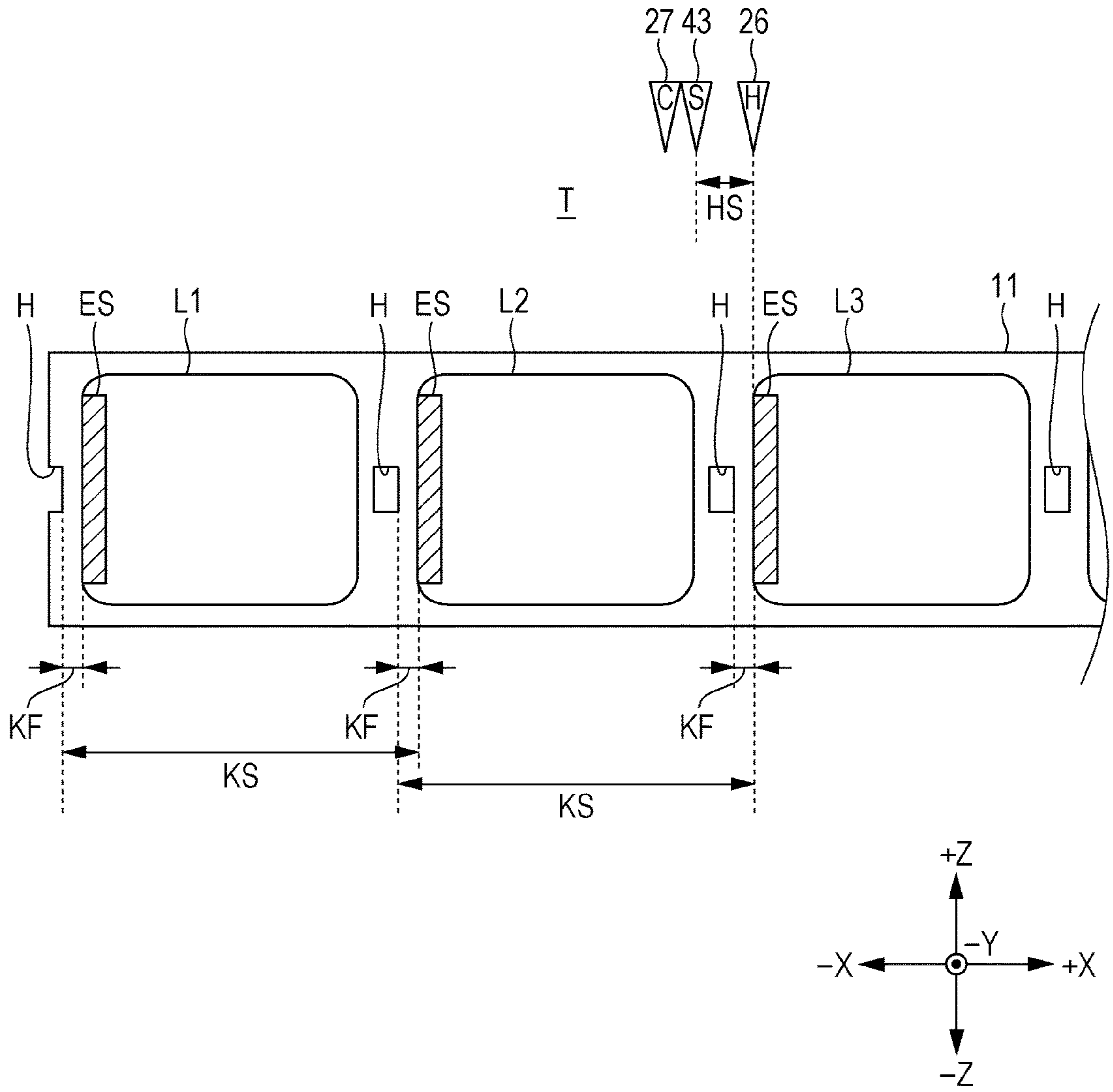
FIG. 26 is a diagram illustrating a position of the label tape when the printing of the third label is started in the second B printing process.

In step S75, the tape printing apparatus 1 feeds the label tape T until the printing start position of the next label L comes to the head position, as illustrated in FIG. 26. In FIG. 26, the tape printing apparatus 1 feeds the label tape T until the printing start position of the third label L3 comes to the head position. In this case, the tape printing apparatus 1 starts the printing of the next third label L3 after feeding the label tape T by a length indicated by [Math. 4] from the position of the label tape T when the sensor 43 detects the detection hole H of the second label L2 illustrated in FIG. 25. In [Math. 4], "KS" indicates a fifth distance KS which is a theoretical distance from the detection hole H of the label L to the printing start position of the label L to be printed next, which is illustrated in FIG. 26. As described above, the tape printing apparatus 1 feeds the label tape T by a length obtained by subtracting the second distance HS from the fifth distance KS in the normal printing process, but the tape printing apparatus 1 corrects the feeding amount of the label tape T by feeding the label tape T by the length indicated by [Math. 4] in the second B printing process. It should be noted that the fifth distance KS is a distance calculated based on the printed data.

$$(KS[\mathrm{mm}] - HS[\mathrm{mm}]) + (KS[\mathrm{mm}] - HS[\mathrm{mm}]) \times CC \qquad \text{[Math. 4]}$$

In step S76, the tape printing apparatus 1 starts the printing of the label L, as illustrated in FIG. 26. In FIG. 26, the tape printing apparatus 1 starts the printing of the third label L3.

In step S77, the tape printing apparatus 1 terminates the printing of the label L. When the tape printing apparatus 1 starts the printing of the third label L3 in step S76, the tape printing apparatus 1 terminates the printing of the third label L3 in step S77.

In step S78, the tape printing apparatus 1 feeds the label tape T until the detection hole H of the next label L is detected by the sensor 43.

In step S79, the tape printing apparatus 1 terminates the correction count.

In step S80, the tape printing apparatus 1 calculates the feeding correction value. The tape printing apparatus 1 calculates the feeding correction value by using the count result of the correction count from step S74 to step S79, based on the calculation expression indicated by [Math. 1]. For example, when the correction count for measuring the measurement feeding pitch of the second label L2 is terminated in step S79, the tape printing apparatus 1 calculates the feeding correction value for suppressing a shift of the printing position to a fourth label L4.

In step S81, the tape printing apparatus 1 discriminates whether or not there is the label L to be printed next, based on the printed data. When the tape printing apparatus 1 discriminates that there is the label L to be printed next, the tape printing apparatus 1 returns to step S74. When the tape printing apparatus 1 discriminates that there is no label L to be printed next, that is, discriminates that the printing of all the labels L is terminated, the tape printing apparatus 1 proceeds to step S82.

In step S82, the tape printing apparatus 1 feeds the label tape T until the detection hole central position of the next label L comes to the cutter position.

In step S83, the tape printing apparatus 1 cuts the label tape T by using the cutter 27.

In step S84, the tape printing apparatus 1 resets the feeding correction value. After step S84, the tape printing apparatus 1 terminates the second B printing process.

As described above, when the printing is performed on the plurality of labels L, the tape printing apparatus 1 according to the present embodiment calculates the feeding correction value based on the measurement feeding pitch and the standard feeding pitch SP, and corrects the feeding amount of the label tape T after the detection hole H of the second label L2 is detected, based on the calculated feeding correction value. In this configuration, even when the feeding amount of the label tape T in a predetermined time differs from a theoretical feeding amount for some reason, the shift of the printing position to the label L can be suppressed.

For example, the tape printing apparatus 1 according to the present embodiment is configured such that the tape cartridge C is detachably mounted. In this case, it is conceivable that a difference in the feeding amount of the label tape T occurs due to a variation in a diameter of the platen roller 17 accommodated in the tape cartridge C. However, even in such a case, the tape printing apparatus 1 can suppress the shift of the printing position to the label L.

In addition, the tape printing apparatus 1 is configured such that the label tape T is fed out from the tape roll 15 accommodated in the tape cartridge C. In this case, it is considered that a feeding-out torque is changed as the diameter of the tape roll 15 is changed. Even in such a case, since the tape printing apparatus 1 repeats the calculation control and the correction control for each label L, the shift of the printing position to the label L can be more reliably suppressed.

In addition, when the first distance KF is longer than the second distance HS, in the first printing process, the tape printing apparatus 1 corrects the feeding amount of the label tape T in a period after the detection hole H of the second label L2 is detected until the printing of the second label L2 is started. In addition, when the first distance KF is equal to or shorter than the second distance HS, in the second printing process, the tape printing apparatus 1 corrects the feeding amount of the label tape T in a period after the detection hole H of the second label L2 is detected until the printing of the third label L3 is started. As described above, the tape printing apparatus 1 can suppress the shift of the printing position to the label L as quickly as possible. In addition, the tape printing apparatus 1 corrects the feeding amount of the label tape T in a period in which the printing is not performed, so that the influence of the correction of the feeding amount on the printing result can be suppressed.

A flow of the process of the tape printing apparatus 1 will be described with reference to flowcharts of FIGS. 27 to 30. The process of the tape printing apparatus 1 illustrated in these flowcharts is an example of a "control method of a tape printing apparatus".

Figure 27:
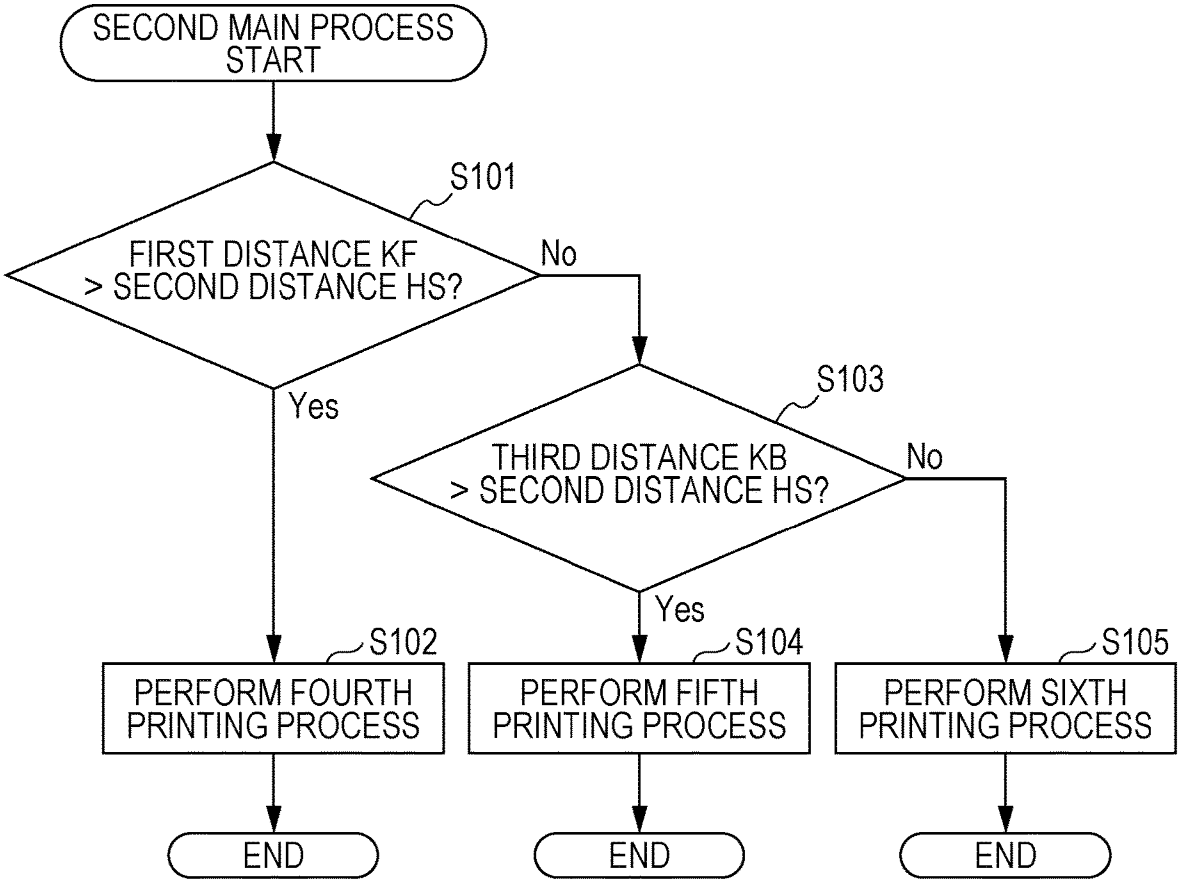
FIG. 27 is a flowchart illustrating a second main process.

First, a second main process of the tape printing apparatus 1 will be described with reference to the flowchart of FIG. 27. The second main process is a process executed by using the printing instruction as a trigger. The tape printing apparatus 1 generates the printed data in response to the printing instruction. The printing process illustrated in FIGS. 27 to 30 is executed based on this printed data.

In step S101, the tape printing apparatus 1 discriminates whether or not the first distance KF is longer than the second distance HS. The first distance KF is the distance calculated based on the printed data. When the tape printing apparatus 1 discriminates that the first distance KF is longer than the second distance HS, the tape printing apparatus 1 proceeds to step S102. In addition, when the tape printing apparatus 1 discriminates that the first distance KF is not longer than the second distance HS, that is, the first distance KF is equal to or shorter than the second distance HS, the tape printing apparatus 1 proceeds to step S103.

Figure 28:
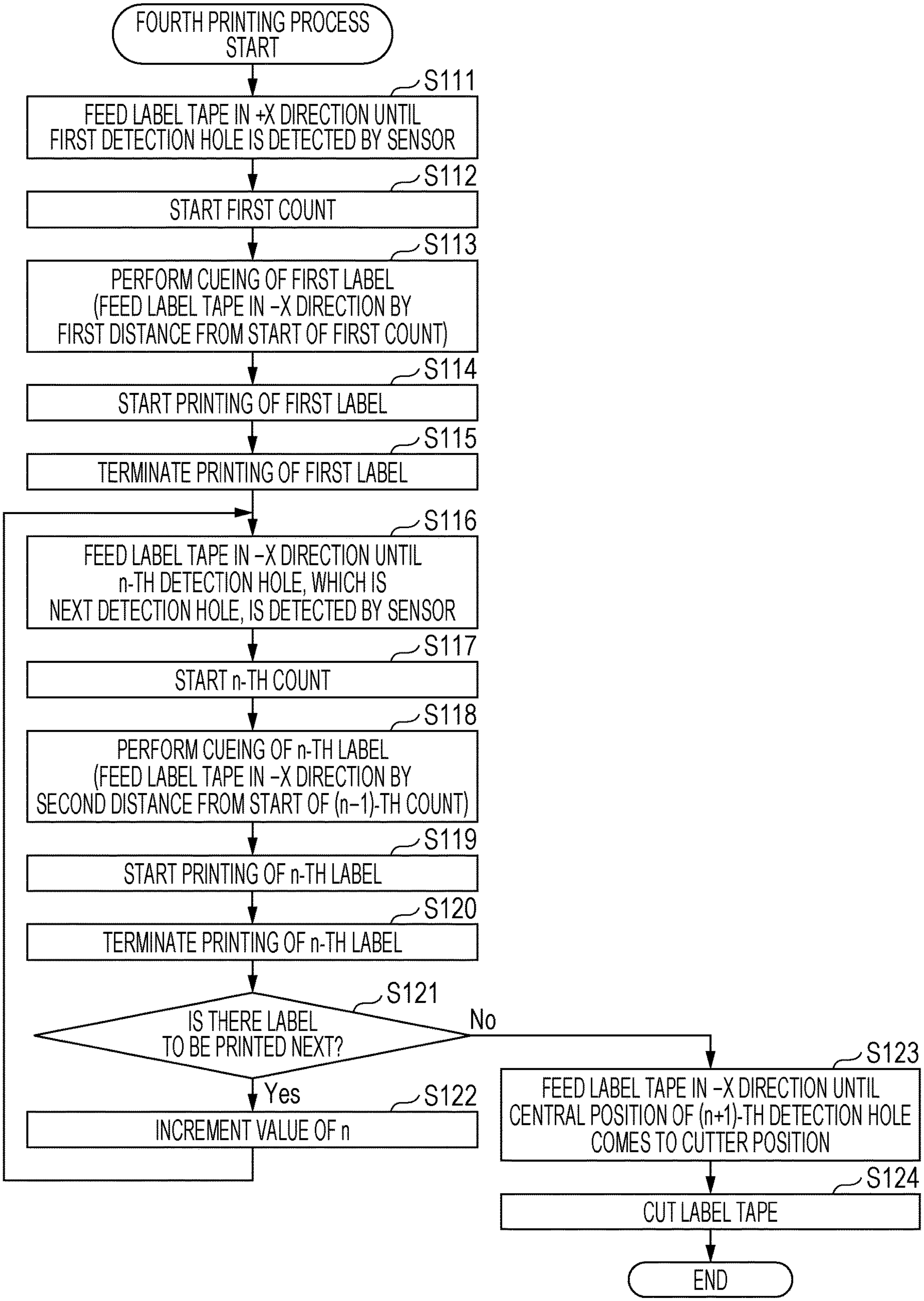
FIG. 28 is a flowchart illustrating a fourth printing process.

In step S102, the tape printing apparatus 1 performs a fourth printing process illustrated in FIG. 28.

In step S103, the tape printing apparatus 1 discriminates whether or not the third distance KB illustrated in FIG. 2 is longer than the second distance HS. The third distance KB is the distance calculated based on the printed data. When the tape printing apparatus 1 discriminates that the third distance KB is longer than the second distance HS, the tape printing apparatus 1 proceeds to step S104. In addition, when the tape printing apparatus 1 discriminates that the third distance KB is not longer than the second distance HS, that is, the third distance KB is equal to or shorter than the second distance HS, the tape printing apparatus 1 proceeds to step S105.

Figure 29:
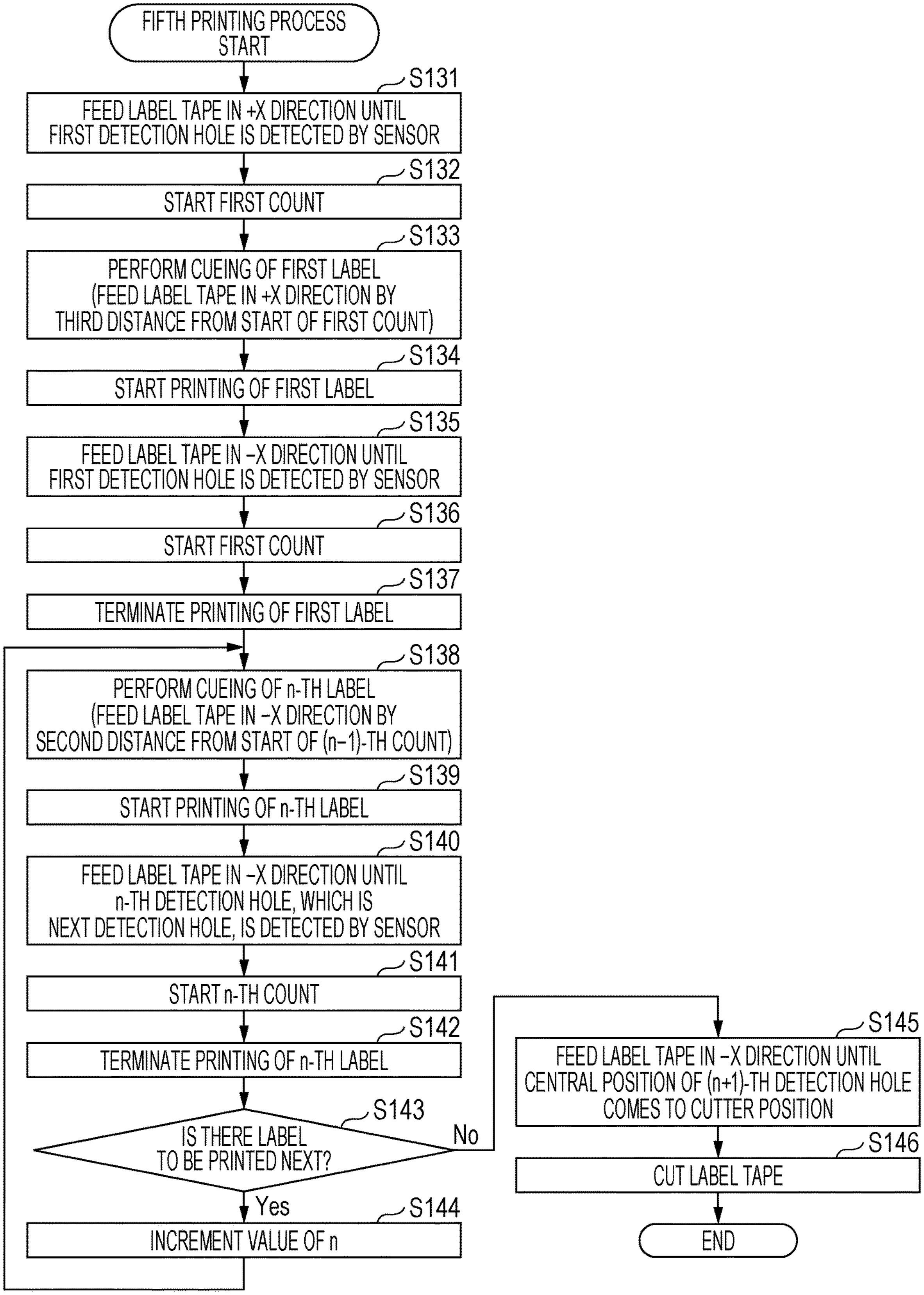
FIG. 29 is a flowchart illustrating a fifth printing process.

In step S104, the tape printing apparatus 1 performs a fifth printing process illustrated in FIG. 29.

Figure 30:
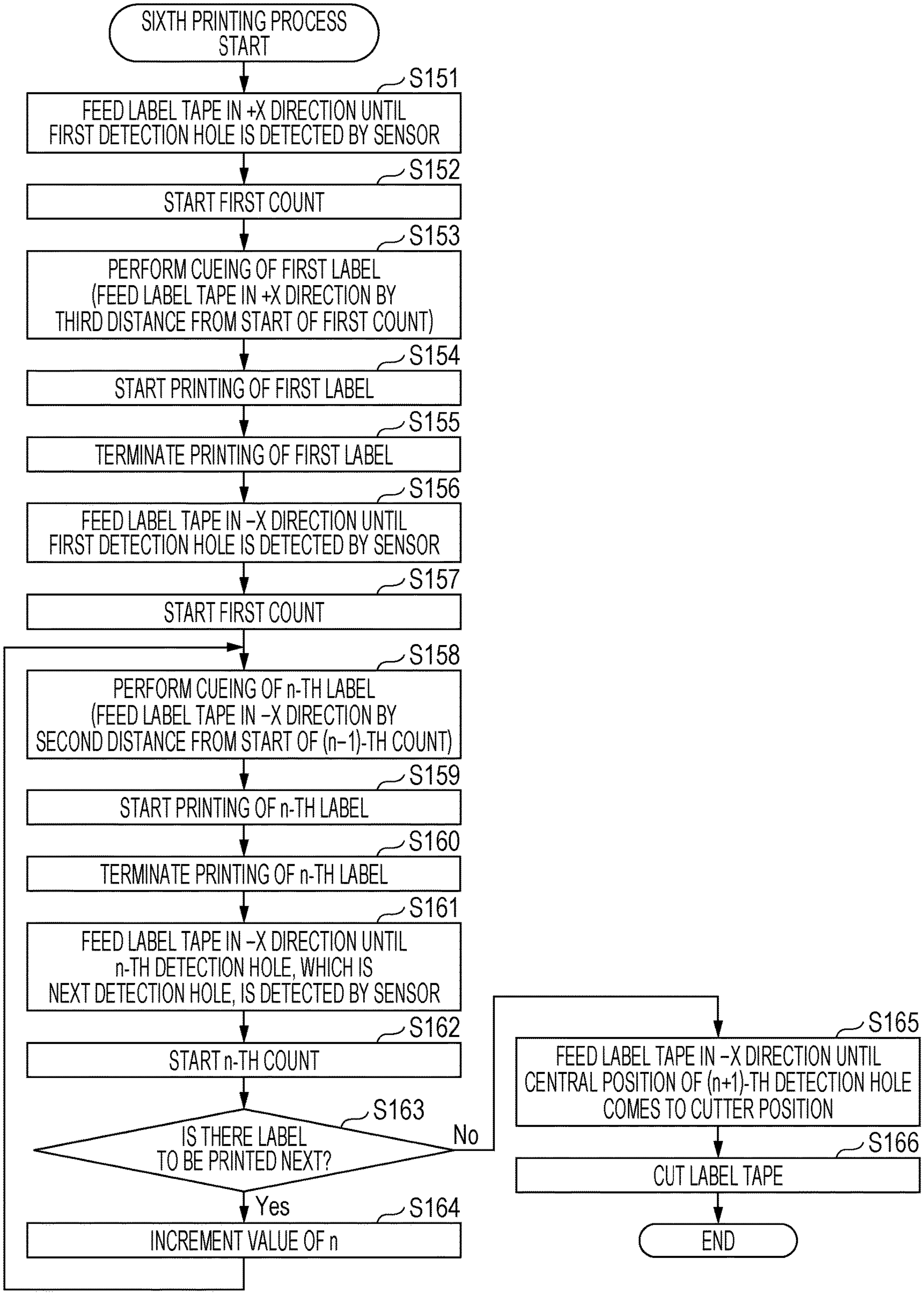
FIG. 30 is a flowchart illustrating a sixth printing process.

In step S105, the tape printing apparatus 1 performs a sixth printing process illustrated in FIG. 30.

The fourth printing process of the tape printing apparatus 1 will be described with reference to the flowchart of FIG. 28. The fourth printing process will be described with reference to FIGS. 31 to 36. It should be noted that, in the drawings of FIG. 31 and subsequent drawings, as in FIG. 12 and the like, a downward triangular mark including a character "C" indicates the cutting position of the cutter 27 in the X axis direction. A downward triangular mark including a character "S" indicates the detection position of the sensor 43 in the X axis direction. In addition, a downward triangular mark including a character "H" indicates the printing position of the printing head 26 in the X axis direction. Hereinafter, the position of the cutter 27 in the X axis direction will be referred to as a "cutter position", and the position of the printing head 26 in the X axis direction will be referred to as a "head position". In addition, in the fourth printing process to the sixth printing process, the printing is performed on the plurality of labels L.

Figure 31:
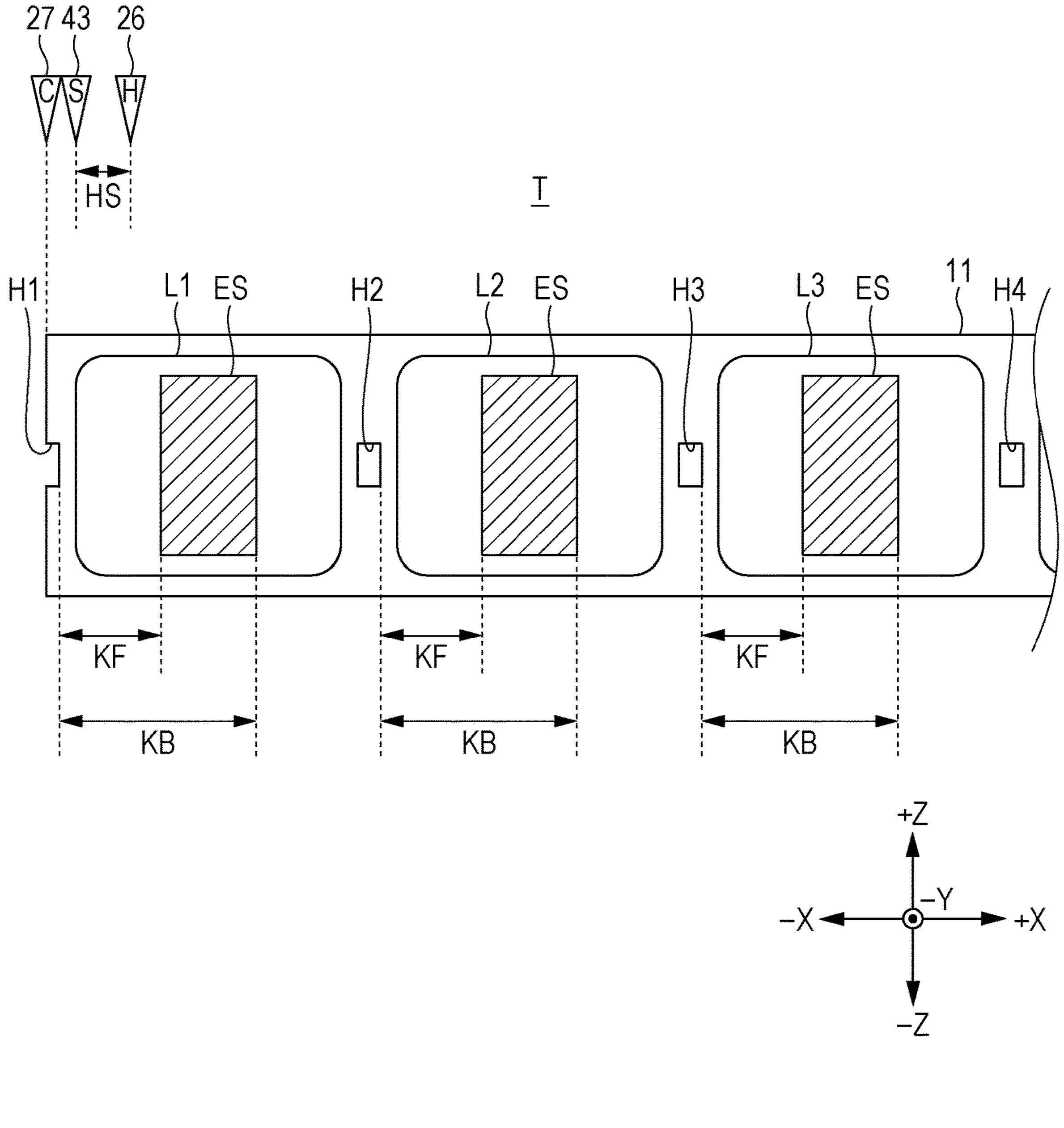
FIG. 31 is a diagram illustrating a position of the label tape when the fourth printing process is started.

The fourth printing process is a process performed when it is discriminated that the first distance KF is longer than the second distance HS, as illustrated in FIG. 31. FIG. 31 is a diagram illustrating a position of the label tape T when the fourth printing process is started. When the fourth printing process is started, the central position of the detection hole H in the X axis direction is located at the cutter position.

Figure 32:
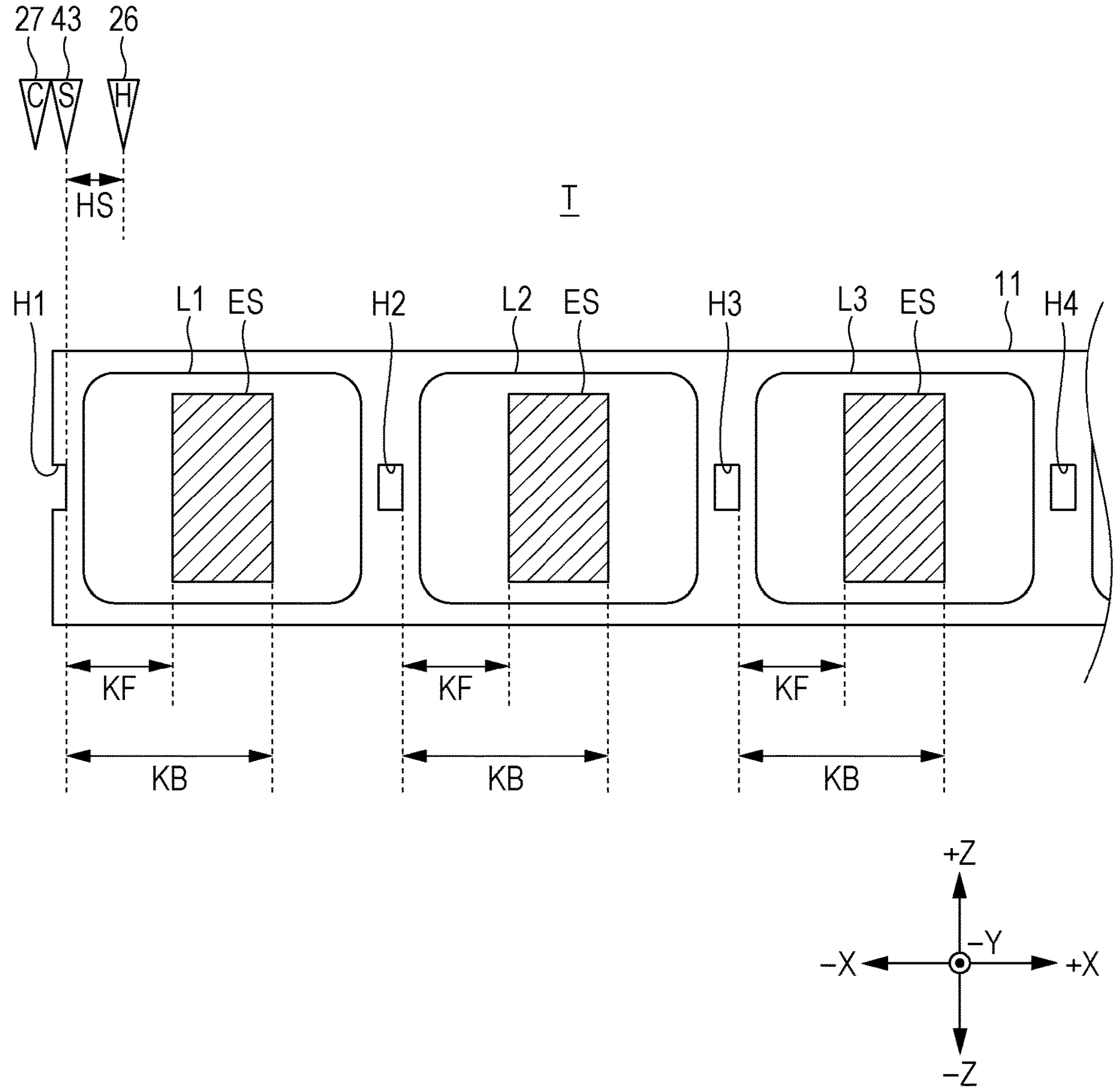
FIG. 32 is a diagram illustrating a position of the label tape when first count is started in the fourth printing process.

In step S111, the tape printing apparatus 1 feeds the label tape T in the +X direction until the first detection hole H1 is detected by the sensor 43, as illustrated in FIG. 32.

In step S112, the tape printing apparatus 1 starts a first count, as illustrated in FIG. 32. It should be noted that the first count is a count of the number of steps for rotating the feeding motor 45*a* after the sensor 43 detects the first detection hole H1. Hereinafter, the count after the detection of the n-th detection hole Hn will be referred to as an "n-th count". A count value of the n-th count is reset when an (n+1)-th count is started or the printing on the n-th label Ln is started.

Figure 33:
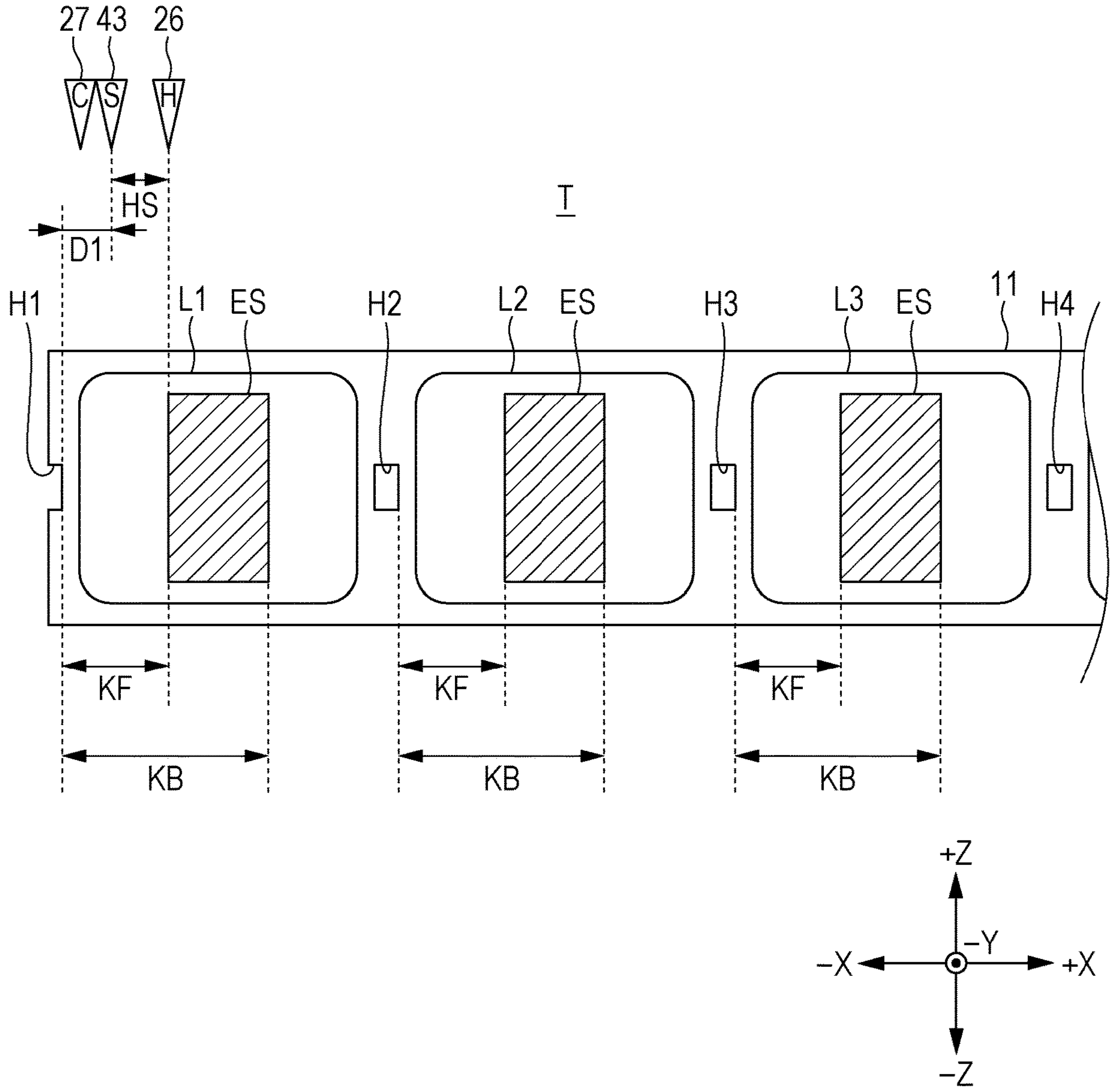
FIG. 33 is a diagram illustrating a position of the label tape when the printing of the first label is started in the fourth printing process.

In step S113, the tape printing apparatus 1 performs the cueing of the first label L1, as illustrated in FIG. 33. The tape printing apparatus 1 performs the cueing of the first label L1 by feeding the label tape T in the −X direction by a first distance D1 after the start of the first count. The first distance D1 is a distance obtained by subtracting the second distance HS from the first distance KF. When the feeding amount per step of the feeding motor 45*a* is X and the count value of the first count reaches a value obtained by dividing the first distance D1 by X, it is presumed that the tape printing apparatus 1 performs the cueing of the first label L1.

In step S114, the tape printing apparatus 1 starts the printing of the first label L1, as illustrated in FIG. 33. The tape printing apparatus 1 performs the printing on the label L by driving the printing head 26 while feeding the label tape T in the −X direction.

In step S115, the tape printing apparatus 1 terminates the printing of the first label L1.

Figure 34:
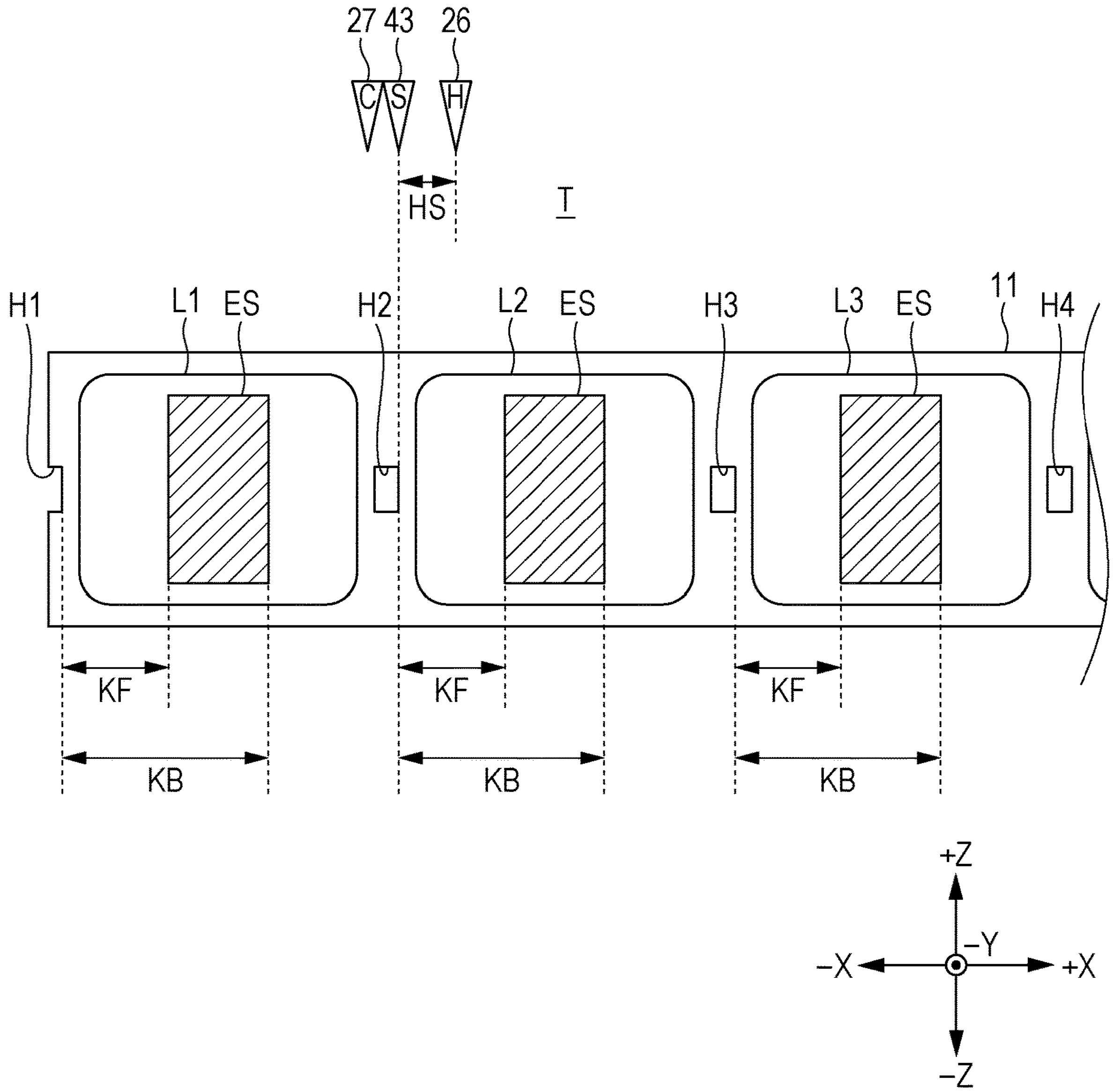
FIG. 34 is a diagram illustrating a position of the label tape when second count is started in the fourth printing process.

In step S116, the tape printing apparatus 1 feeds the label tape T in the −X direction until the n-th detection hole Hn, which is the next detection hole H, is detected by the sensor 43, as illustrated in FIG. 34. An initial value of n is "2". In FIG. 34, the tape printing apparatus 1 feeds the label tape T until the second detection hole H2 is detected.

In step S117, the tape printing apparatus 1 starts the n-th count, as illustrated in FIG. 34. In FIG. 34, the tape printing apparatus 1 starts a second count. At this point in time, the tape printing apparatus 1 resets the first count.

Figure 35:
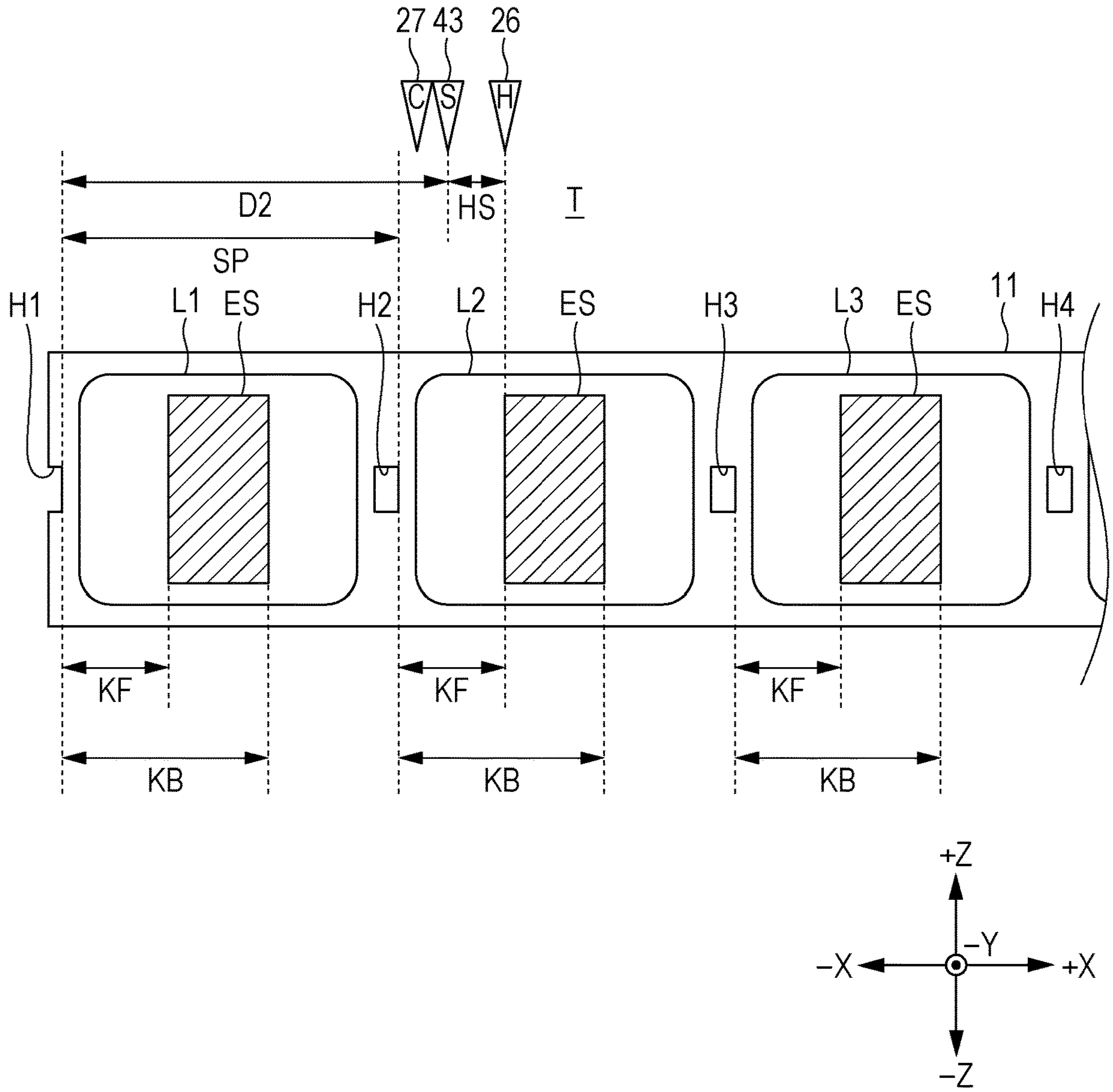
FIG. 35 is a diagram illustrating a position of the label tape when the printing of the second label is started in the fourth printing process.

In step S118, the tape printing apparatus 1 performs the cueing of the n-th label Ln, as illustrated in FIG. 35. In FIG. 35, the tape printing apparatus 1 performs the cueing of the second label L2. The tape printing apparatus 1 performs the cueing of the n-th label Ln by feeding the label tape T in the −X direction by a second distance D2 after the start of a (n−1)-th count. The second distance D2 is a distance obtained by subtracting the second distance HS from a distance obtained by adding up the first distance KF and the standard feeding pitch SP.

In step S119, the tape printing apparatus 1 starts the printing of the n-th label Ln, as illustrated in FIG. 35. In FIG. 35, the tape printing apparatus 1 starts the printing of the second label L2.

In step S120, the tape printing apparatus 1 terminates the printing of the n-th label Ln.

In step S121, the tape printing apparatus 1 discriminates whether or not there is the label L to be printed next, based on the printed data. When the tape printing apparatus 1 discriminates that there is the label L to be printed next, the tape printing apparatus 1 proceeds to step S122. When the tape printing apparatus 1 discriminates that there is no label L to be printed next, that is, discriminates that the printing of all the labels L is terminated, the tape printing apparatus 1 proceeds to step S123.

In step S122, the tape printing apparatus 1 increments a value of n. After step S122, the tape printing apparatus 1 returns to step S116.

Figure 36:
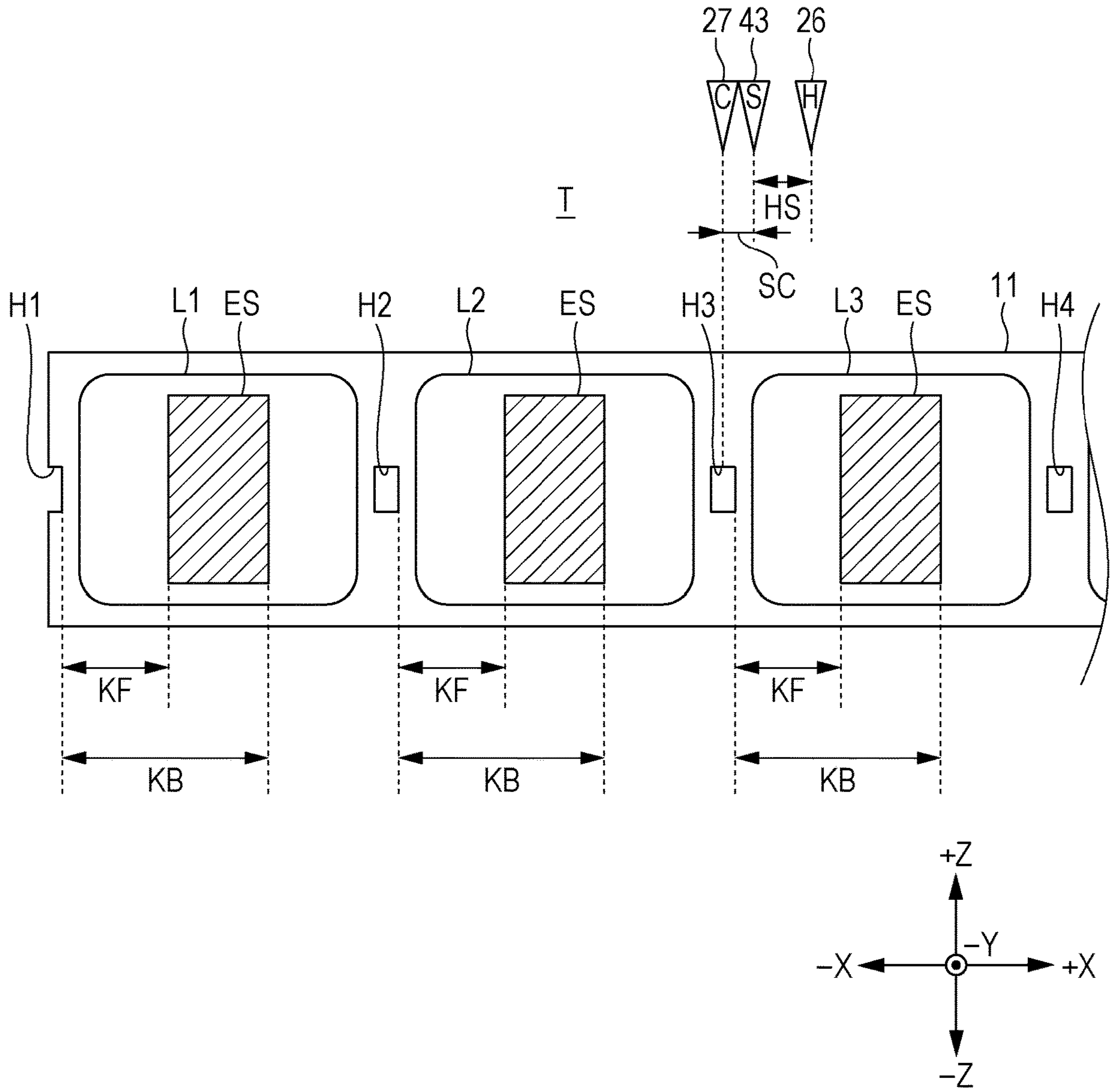
FIG. 36 is a diagram illustrating a position of the label tape when the label tape is cut after the printing of the second label is terminated in the fourth printing process.

In step S123, the tape printing apparatus 1 feeds the label tape T until a central position of an (n+1)-th detection hole H(n+1) comes to the cutter position, as illustrated in FIG. 36. In FIG. 36, the tape printing apparatus 1 feeds the label tape T until a central position of a third detection hole H3 comes to the cutter position. The tape printing apparatus 1 feeds the label tape T by a length obtained by subtracting ½ of the length of the detection hole H in the X axis direction from the sensor-cutter distance SC, after detecting the (n+1)-th detection hole H(n+1), thereby aligning the central position of the (n+1)-th detection hole H(n+1) with the cutter position. The "sensor-cutter distance SC" refers to the distance between the detection position of the sensor 43 and the cutting position by the cutter 27 in the X axis direction.

In step S124, the tape printing apparatus 1 cuts the label tape T by using the cutter 27, as illustrated in FIG. 36.

Figure 37:
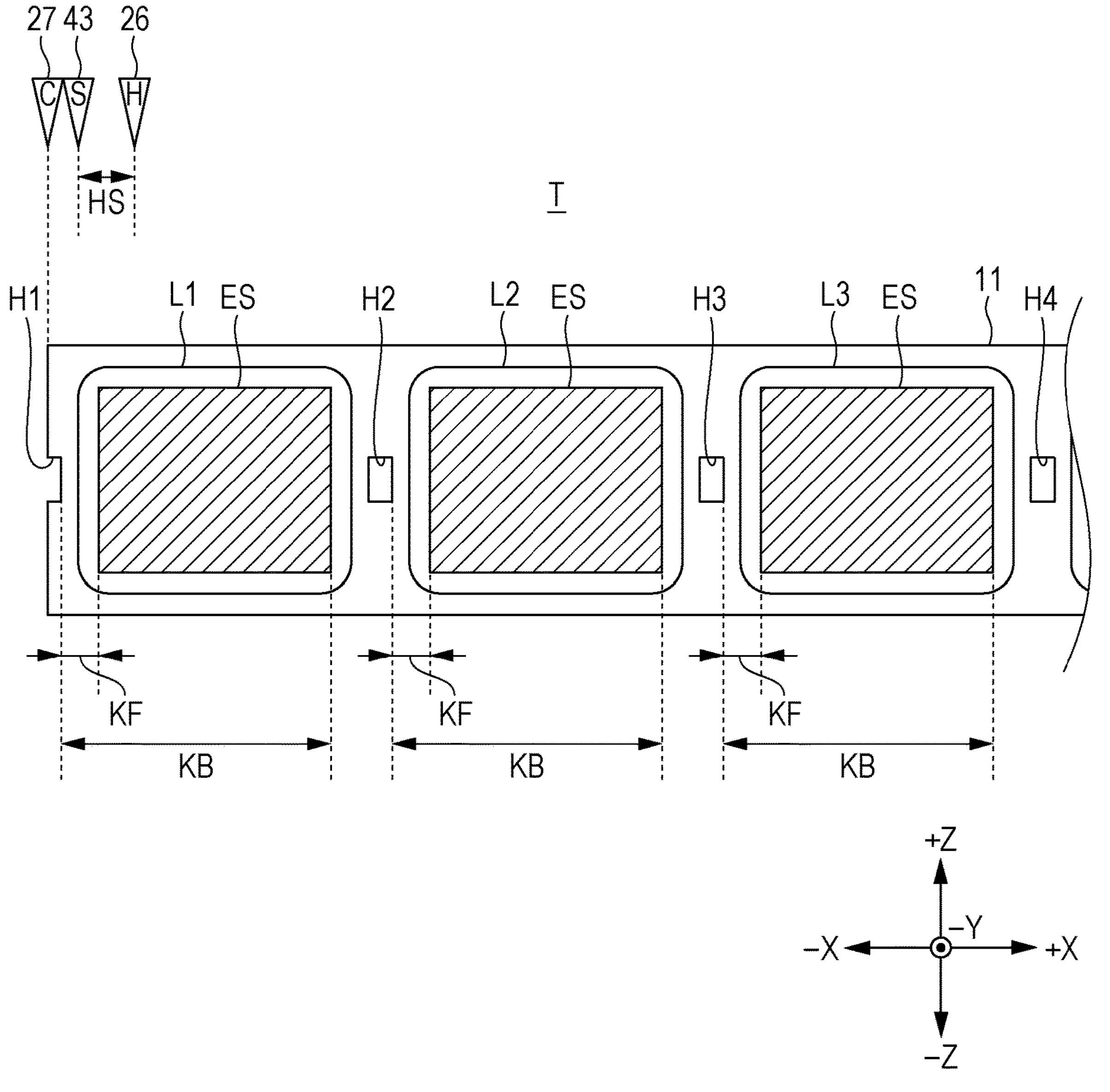
FIG. 37 is a diagram illustrating a position of the label tape when the fifth printing process is started.

The fifth printing process of the tape printing apparatus 1 will be described with reference to the flowchart of FIG. 29. The fifth printing process will be described with reference to FIGS. 37 to 42. The fifth printing process is a process performed when it is discriminated that the first distance KF is equal to or shorter than the second distance HS and the third distance KB is longer than the second distance HS, as illustrated in FIG. 37. FIG. 37 is a diagram illustrating a position of the label tape T when the fifth printing process is started.

Figure 38:
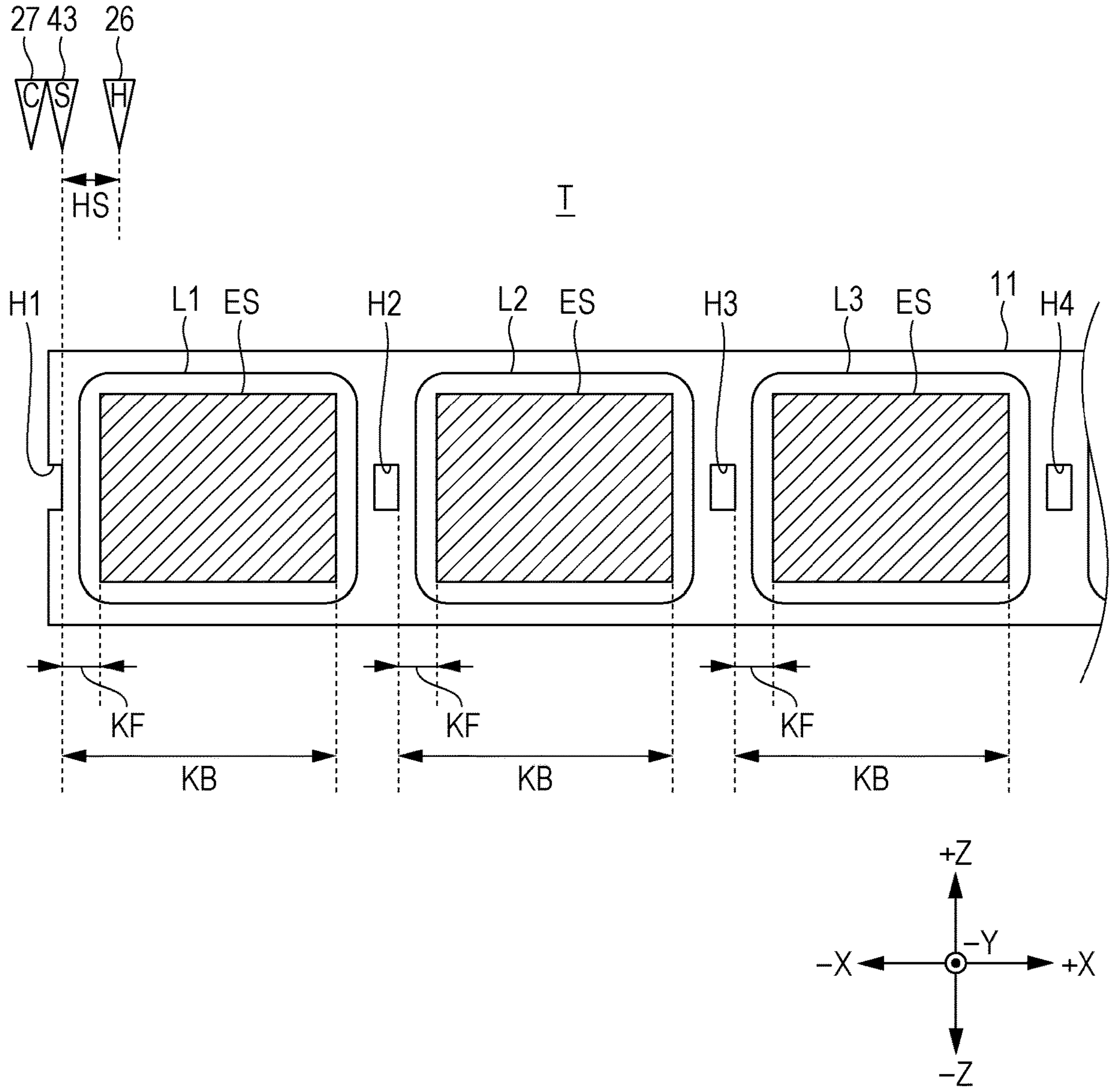
FIG. 38 is a diagram illustrating a position of the label tape when the first count is started in the fifth printing process.

In step S131, the tape printing apparatus 1 feeds the label tape T in the +X direction until the first detection hole H1 is detected by the sensor 43, as illustrated in FIG. 38.

In step S132, the tape printing apparatus 1 starts the first count, as illustrated in FIG. 38.

Figure 39:
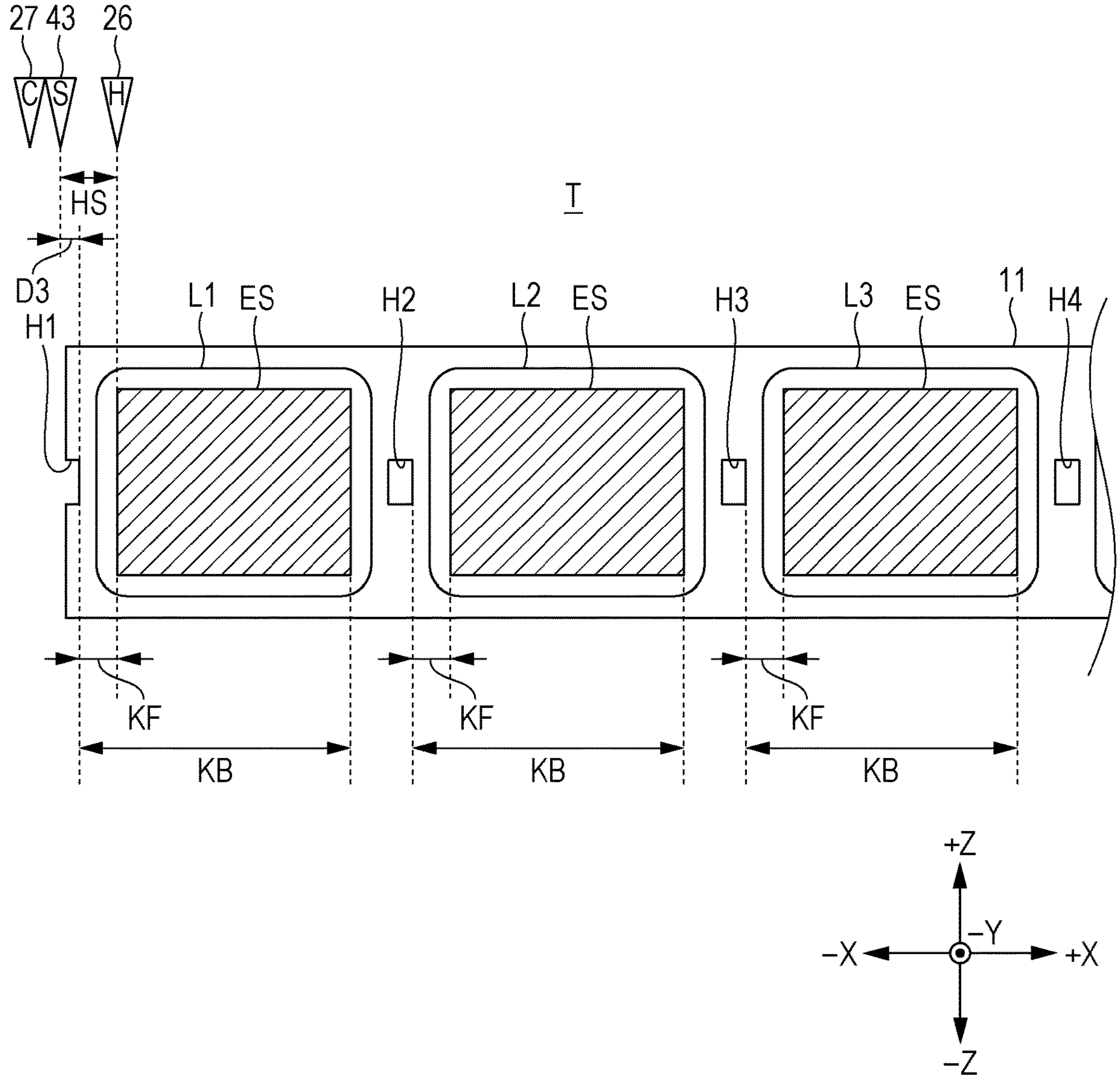
FIG. 39 is a diagram illustrating a position of the label tape when the printing of the first label is started in the fifth printing process.

In step S133, the tape printing apparatus 1 performs the cueing of the first label L1, as illustrated in FIG. 39. The tape printing apparatus 1 performs the cueing of the first label L1 by feeding the label tape T in the +X direction by a third distance D3 after the start of the first count. The third distance D3 is a distance obtained by subtracting the first distance KF from the second distance HS. When the feeding amount per step of the feeding motor 45*a* is X, the tape printing apparatus 1 performs the cueing of the first label L1 by rotating the feeding motor 45*a* in the second rotation direction until the count value of the first count reaches "third distance D3/X".

In step S134, the tape printing apparatus 1 starts the printing of the first label L1, as illustrated in FIG. 39. At this point in time, the tape printing apparatus 1 resets the first count.

Figure 40:
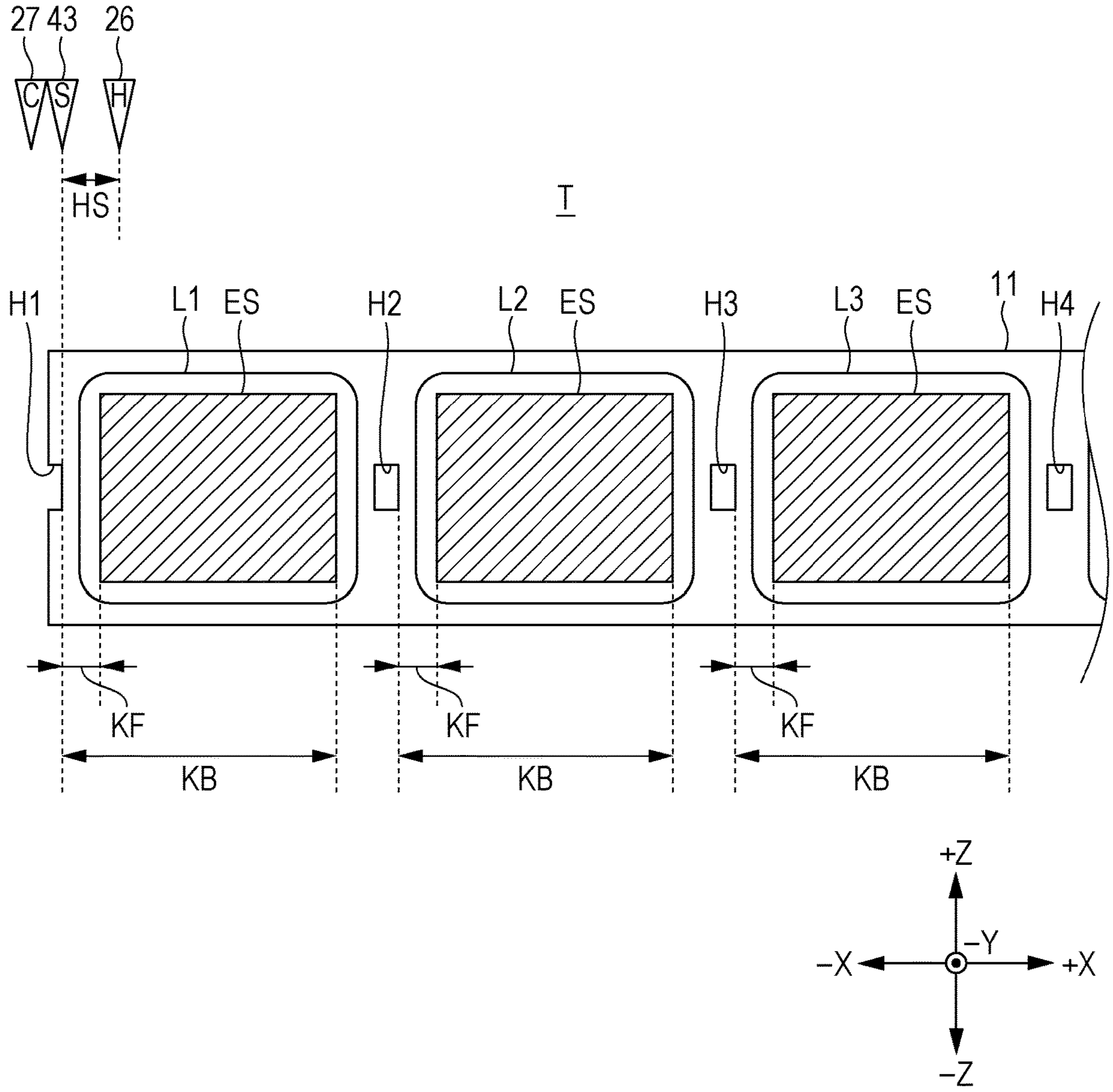
FIG. 40 is a diagram illustrating a position of the label tape when the second count is started in the fifth printing process.

In step S135, the tape printing apparatus 1 feeds the label tape T in the −X direction until the first detection hole H1 is detected by the sensor 43, as illustrated in FIG. 40.

In step S136, the tape printing apparatus 1 starts the first count, as illustrated in FIG. 40.

In step S137, the tape printing apparatus 1 terminates the printing of the first label L1.

Figure 41:
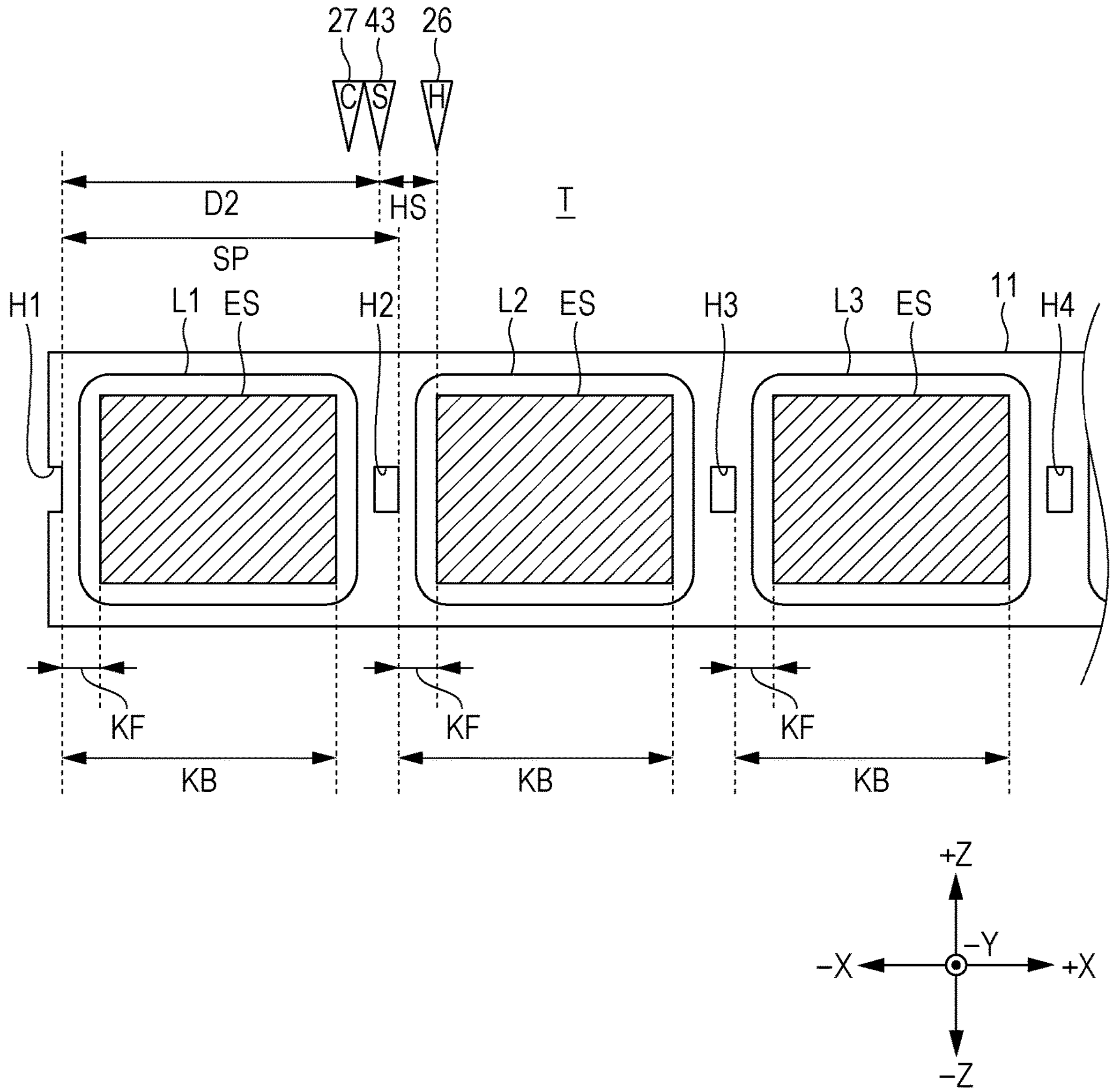
FIG. 41 is a diagram illustrating a position of the label tape when the printing of the second label is started in the fifth printing process.

In step S138, the tape printing apparatus 1 performs the cueing of the n-th label Ln, as illustrated in FIG. 41. In FIG. 41, the tape printing apparatus 1 performs the cueing of the second label L2. The tape printing apparatus 1 performs the cueing of the n-th label Ln by feeding the label tape T in the −X direction by a second distance D2 after the start of a (n−1)-th count. The second distance D2 is a distance obtained by subtracting the second distance HS from a distance obtained by adding up the first distance KF and the standard feeding pitch SP.

In step S139, the tape printing apparatus 1 starts the printing of the n-th label Ln, as illustrated in FIG. 41. In FIG. 41, the tape printing apparatus 1 starts the printing of the second label L2.

In step S140, the tape printing apparatus 1 feeds the label tape T in the −X direction until the n-th detection hole Hn, which is the next detection hole H, is detected by the sensor 43.

In step S141, the tape printing apparatus 1 starts the n-th count. At this point in time, the tape printing apparatus 1 resets the (n−1)-th count.

In step S142, the tape printing apparatus 1 terminates the printing of the n-th label Ln.

In step S143, the tape printing apparatus 1 discriminates whether or not there is the label L to be printed next, based on the printed data. When the tape printing apparatus 1 discriminates that there is the label L to be printed next, the tape printing apparatus 1 proceeds to step S144. When the tape printing apparatus 1 discriminates that there is no label L to be printed next, that is, discriminates that the printing of all the labels L is terminated, the tape printing apparatus 1 proceeds to step S145.

In step S144, the tape printing apparatus 1 increments the value of n. After step S144, the tape printing apparatus 1 returns to step S138.

Figure 42:
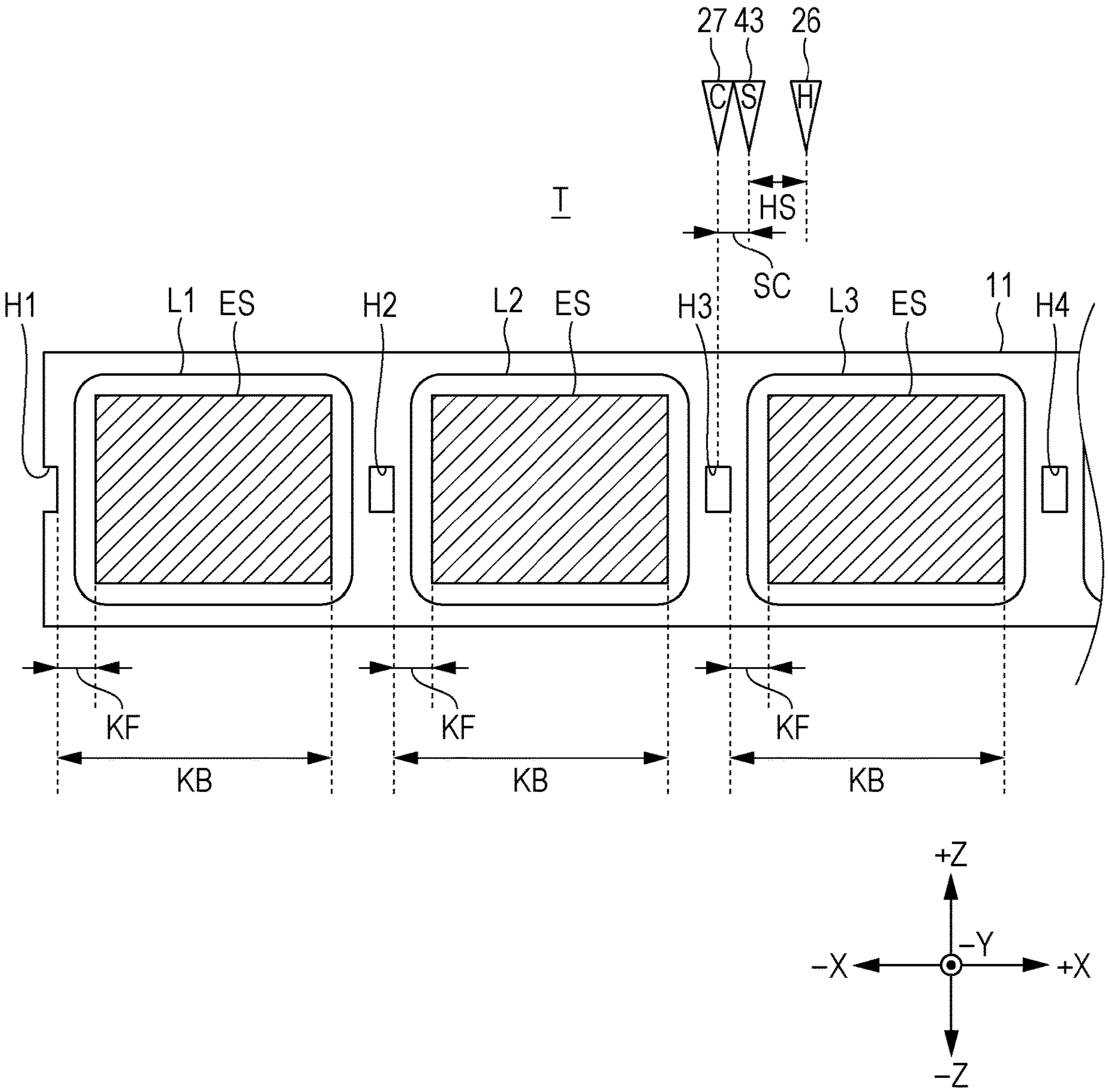
FIG. 42 is a diagram illustrating a position of the label tape when the label tape is cut after the printing of the second label is terminated in the fifth printing process.

In step S145, the tape printing apparatus 1 feeds the label tape T until the central position of the (n+1)-th detection hole H(n+1) comes to the cutter position, as illustrated in FIG. 42. In FIG. 42, the tape printing apparatus 1 feeds the label tape T until a central position of a third detection hole H3 comes to the cutter position. The tape printing apparatus 1 feeds the label tape T by a length obtained by subtracting ½ of the length of the detection hole H in the X axis direction from the sensor-cutter distance SC, after detecting the (n+1)-th detection hole H(n+1), thereby aligning the central position of the (n+1)-th detection hole H(n+1) with the cutter position.

In step S146, the tape printing apparatus 1 cuts the label tape T by using the cutter 27, as illustrated in FIG. 42.

Figure 43:
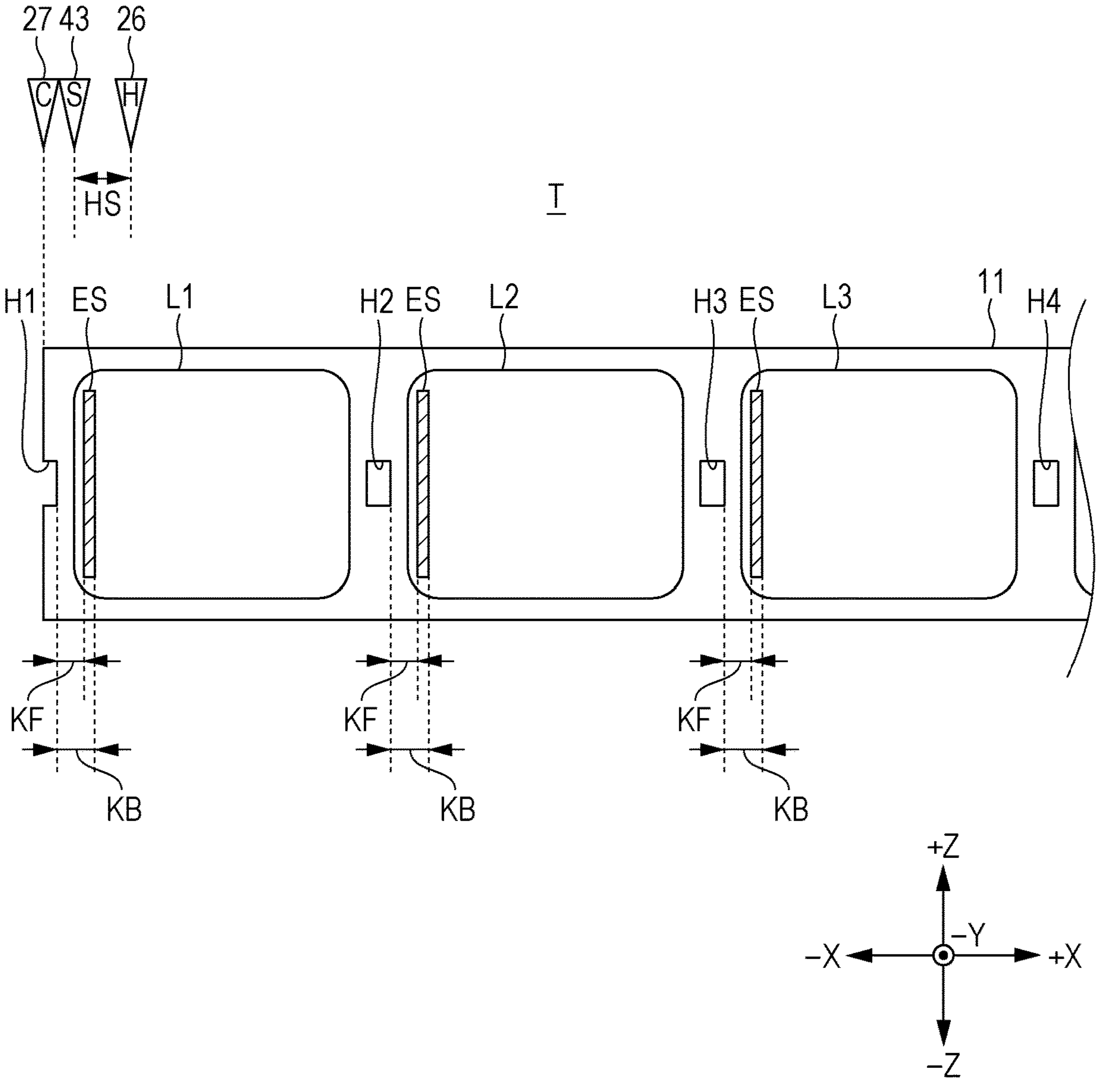
FIG. 43 is a diagram illustrating a position of the label tape when the sixth printing process is started.

The sixth printing process of the tape printing apparatus 1 will be described with reference to the flowchart of FIG. 30. FIG. 43 is a diagram illustrating a position of the label tape T when the sixth printing process is started. As illustrated in FIG. 43, the sixth printing process is a process performed when it is discriminated that both the first distance KF and the third distance KB are equal to or shorter than the second distance HS. Therefore, in the sixth printing process, the detection hole H of the label L is detected after the printing of the label L is terminated. Since the sixth printing process is the same as the fifth printing process except for this point, the position of the label tape T is not illustrated, and only the flow of the process will be described.

In step S151, the tape printing apparatus 1 feeds the label tape T in the +X direction until the first detection hole H1 is detected by the sensor 43.

In step S152, the tape printing apparatus 1 starts the first count.

In step S153, the tape printing apparatus 1 performs the cueing of the first label L1. The tape printing apparatus 1 performs the cueing of the first label L1 by feeding the label tape T in the +X direction by a third distance D3 after the start of the first count.

In step S154, the tape printing apparatus 1 starts the printing of the first label L1. At this point in time, the tape printing apparatus 1 resets the first count.

In step S155, the tape printing apparatus 1 terminates the printing of the first label L1.

In step S156, the tape printing apparatus 1 feeds the label tape T in the −X direction until the first detection hole H1 is detected by the sensor 43.

In step S157, the tape printing apparatus 1 starts the first count.

In step S158, the tape printing apparatus 1 performs the cueing of the n-th label Ln. The tape printing apparatus 1 performs the cueing of the n-th label Ln by feeding the label tape T in the −X direction by a second distance D2 after the start of a (n−1)-th count.

In step S159, the tape printing apparatus 1 starts the printing of the n-th label Ln.

In step S160, the tape printing apparatus 1 terminates the printing of the n-th label Ln.

In step S161, the tape printing apparatus 1 feeds the label tape T in the −X direction until the n-th detection hole Hn, which is the next detection hole H, is detected by the sensor 43.

In step S162, the tape printing apparatus 1 starts the n-th count. At this point in time, the tape printing apparatus 1 resets the (n−1)-th count.

In step S163, the tape printing apparatus 1 discriminates whether or not there is the label L to be printed next, based on the printed data. When the tape printing apparatus 1 discriminates that there is the label L to be printed next, the tape printing apparatus 1 proceeds to step S164. When the tape printing apparatus 1 discriminates that there is no label L to be printed next, that is, discriminates that the printing of all the labels L is terminated, the tape printing apparatus 1 proceeds to step S165.

In step S164, the tape printing apparatus 1 increments the value of n. After step S164, the tape printing apparatus 1 returns to step S158.

In step S165, the tape printing apparatus 1 feeds the label tape T until the central position of the (n+1)-th detection hole H(n+1) comes to the cutter position.

In step S166, the tape printing apparatus 1 cuts the label tape T by using the cutter 27.

As described above, when the printing is performed on the plurality of labels L, the tape printing apparatus 1 according to the present embodiment performs the cueing of the n-th label Ln based on the detection of the detection hole H provided in the −X direction with respect to the (n−1)-th label L(n−1). Accordingly, even when the first distance KF is shorter than the second distance HS, the tape printing apparatus 1 can perform the cueing of the n-th label Ln without feeding the label tape T in the +X direction, so that the increase in the printing process time can be suppressed.

In addition, when the tape printing apparatus 1 adopts the present configuration, the first distance KF of the label tape T can be set to be short. That is, in the tape printing apparatus 1, even when the label tape T is used in which the first distance KF tends to be short and the distance between the detection hole H and the label L in the X axis direction is short, the printing process time is not increased. Accordingly, the number of labels L that can be disposed per unit length of the label tape T can be increased, and the cost of the unit of the label L can be reduced.

In addition, the tape printing apparatus 1 performs the cueing of the n-th label Ln based on the detection of the (n−1)-th detection hole H(n−1), instead of an (n−2)-th detection hole H(n−2) or an (n−3)-th detection hole H(n−3), so that the cueing of the n-th label Ln can be accurately performed.

In addition, the tape printing apparatus 1 can accurately perform the cueing of the n-th label Ln by feeding the label tape T by the second distance D2 from the point in time when the (n−1)-th detection hole H(n−1) is detected by the sensor 43.

In addition, when the printing is performed on three or more sheets of the labels L, the tape printing apparatus 1 performs, for each label L, the cueing on second and subsequent labels L from the beginning of the label tape T. Accordingly, even when the first distance KF is shorter than the second distance HS, the tape printing apparatus 1 does not have to start the printing after feeding the label tape T in the +X direction for each label L, so that the increase in the printing process time can be further suppressed.

In addition, when the first distance KF is shorter than the second distance HS, the tape printing apparatus 1 performs the cueing of the first label L1 by feeding the label tape T in the +X direction. Accordingly, the tape printing apparatus 1 can start the printing on the first label L1 from the printing start position desired by the user.

In addition, since the tape printing apparatus 1 detects the type of the label tape T by using the tape type detection section 41 and reads out the standard feeding pitch SP corresponding to the detected type of the label tape T from the ROM 44*b*, a plurality of types of label tapes T can be used.

The following modification examples can be adopted regardless of the embodiment described above.

Modification Example 1

Figure 44:
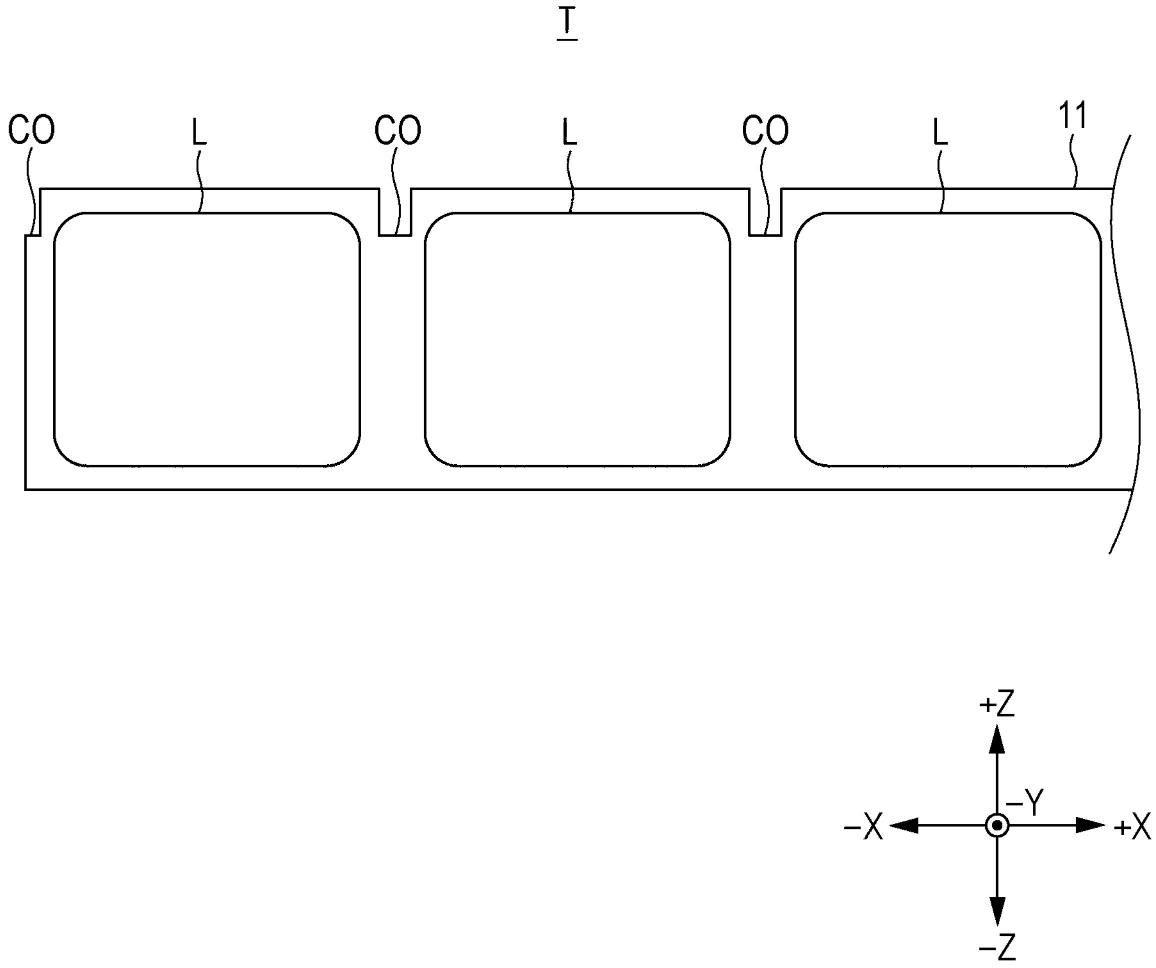
FIG. 44 is a diagram illustrating another example of the label tape.

The "detected portion" detected by the sensor 43 may be a recess portion CO obtained by cutting out an end portion of the mount tape 11 in the +Z direction in a recess shape, as illustrated in FIG. 44, instead of the detection hole H obtained by cutting out the central portion of the mount tape 11 in the Z axis direction. In addition, the "detected portion" may be a protrusion portion in which the end portion of the mount tape 11 in the +Z direction protrudes in a protruding shape. In addition, the "detected portion" may be formed at the end portion of the mount tape 11 in the −Z direction. It should be noted that, in any case, it is preferable that the detection hole H is provided in the −X direction with respect to the end portion of each label L in the −X direction.

Modification Example 2

In addition, the "detected portion" may be a label for detection attached to the position of the detection hole H. In addition, when the label tape T has a label member attached to substantially the entire surface of the mount tape 11 and the label L is a die cut label, that is, stripping is not performed on the label tape T, a portion obtained by cutting out the label member by the position of the detection hole H may be used as the "detected portion".

In addition, a mark printed on the mount tape 11 of the label tape T may be used as the "detected portion".

Also, the label L itself may be used as the "detected portion". In this case, the sensor 43 need only detect the position of the end portion of the label L in the −X direction. In addition, in this case, the mount tape 11 may be a transparent tape.

Modification Example 3

In addition, the tape printing apparatus 1 does not have to be configured such that the tape cartridge C can be mounted. For example, the tape printing apparatus 1 may include a platen roller and perform the printing on the label tape T supplied from an outside of the tape printing apparatus 1.

Modification Example 4

In addition, the tape printing apparatus 1 may correct the feeding amount of the label tape T in a period after the detection hole H of the second label L2 is detected until the printing of the label L to be printed after the third label L3 is started, based on the measurement result of the measurement feeding pitch of the first label L1.

Modification Example 5

In addition, the tape printing apparatus 1 may correct the feeding amount of the label tape T in a period the printing is not performed in a period after the detection hole H of the second label L2 is detected until the printing of the third label L3 is started, regardless of whether or not the first distance KF is longer than the second distance HS.

Modification Example 6

In addition, the correspondence table in which the type of the label tape T and the standard feeding pitch SP are associated with each other may be located outside the tape printing apparatus 1. The correspondence table may be stored in, for example, a server that can communicate with the tape printing apparatus 1. In this case, the server is an example of a "storage section".

In addition, the readout section 110 may read out the standard feeding pitch SP from the circuit substrate or the RFID tag (none illustrated) provided on the tape cartridge C. In this case, the circuit substrate or the RFID tag is an example of a "storage section".

In addition, the readout section 110 may read out the standard feeding pitch SP from the code image provided on the outer surface of the tape cartridge C.

Modification Example 7

In addition, the tape printing apparatus 1 may be configured to store the feeding correction value in a storage area, such as the RAM 44*c*, without resetting the feeding correction value at the termination of the printing process. In this case, the tape printing apparatus 1 may use the stored feeding correction value to perform the correction control of suppressing the shift of the printing position to the label L to be printed first in the next printing process.

It should be noted that, even in this case, when it is detected that the tape cartridge C mounted on the cartridge mounting section 23 is replaced, it is preferable that the tape printing apparatus 1 resets the feeding correction value. When it is detected, for example, that a cover of the cartridge mounting section 23 is opened, the tape printing apparatus 1 may determine that the tape cartridge C is replaced. Alternatively, when the type of the tape detected by the tape type detection section 41 is different from the type of the tape detected previously, the tape printing apparatus 1 may determine that the tape cartridge C is replaced.

Modification Example 8

In addition, the firmware of the tape printing apparatus 1 may be provided to a customer as a program. In addition, a storage medium in which the firmware of the tape printing apparatus 1 is recorded may be provided to the customer. In addition, the tape printing apparatus 1 may use another printing method, such as an ink jet method, in addition to a thermal transfer method. Other configurations can be changed as appropriate without departing from the gist of the present disclosure.

Modification Example 9

The "detected portion" detected by the sensor 43 may be the recess portion CO obtained by cutting out an end portion of the mount tape 11 in the +Z direction in a recess shape, as illustrated in FIG. 44, instead of the detection hole H obtained by cutting out the central portion of the mount tape 11 in the Z axis direction. In addition, the "detected portion" may be a protrusion portion in which the end portion of the mount tape 11 in the +Z direction protrudes in a protruding shape. In addition, the "detected portion" may be formed at the end portion of the mount tape 11 in the −Z direction. It should be noted that, in any case, the "detected portion" is provided between the labels L in the X axis direction. Also, in these cases, the sensor 43 is provided at a position corresponding to the "detected portion" in the Z axis direction. That is, the sensor 43 is not limited to being provided at substantially the center of the mount tape 11 in the Z direction.

Modification Example 10

In addition, the tape printing apparatus 1 may perform the cueing of the n-th label Ln based on the detection of the (n−2)-th detection hole H(n−2) or the (n−3)-th detection hole H(n−3), instead of the (n−1)-th detection hole H(n−1). That is, based on the detection of the first detection hole H1, the cueing of the third label L3 or the fourth label L4 may be performed, in addition to the cueing of the second label L2.

Modification Example 11

The correspondence table in which the type of the label tape T and the standard feeding pitch SP are associated with each other may be located outside the tape printing apparatus 1. The correspondence table may be stored in, for example, a server that can communicate with the tape printing apparatus 1. In this case, the server is an example of a "storage section".

In addition, the readout section 110 may read out the standard feeding pitch SP from the circuit substrate or the RFID tag (none illustrated) provided on the tape cartridge C. In this case, the circuit substrate or the RFID tag is an example of a "storage section".

In addition, the readout section 110 may read out the standard feeding pitch SP from the code image provided on the outer surface of the tape cartridge C.

Modification Example 12

The embodiment described above can also be applied when the first distance KF is changed depending on the label L. In this case, the first distance D1 is a distance obtained by subtracting the second distance HS from the first distance KF of the first label L1. In addition, the second distance D2 is a distance obtained by subtracting the second distance HS from a distance obtained by adding up the first distance KF of the label L for which the cueing is performed, and the standard feeding pitch SP. In addition, the third distance D3 is a distance obtained by subtracting the first distance KF of the first label L1 from the second distance HS.

Modification Example 13

The present modification example will be described as a more functional embodiment that includes the content overlapping with the embodiment described above. When the first distance KF is not changed depending on to the label L, the tape printing apparatus 1 may perform the cueing of the label L with the following case classification. The tape printing apparatus 1 may perform the cueing of the n-th label Ln based on the detection of the n-th detection hole Hn when the first distance KF is longer than the second distance HS, and perform the cueing of the n-th label Ln based on the detection of the (n−1)-th detection hole H(n−1) when the first distance KF is equal to or shorter than the second distance HS.

In addition, when the first distance KF is changed depending on the label L, the tape printing apparatus 1 may perform the class classification described above for each label L. For example, a case is assumed in which the first distance KF of the second label L2 is shorter than the second distance HS and the first distance KF of the third label L3 is longer than the second distance HS. In this case, the tape printing apparatus 1 may perform the cueing of the second label L2 based on the detection of the first detection hole H1, and perform the cueing of the third label L3 based on the detection of the third detection hole H3.

ADDITIONAL NOTE

Hereinafter, the tape printing apparatus and the control method of the tape printing apparatus will be additionally noted.

Provided is a tape printing apparatus 1 including: a feeding mechanism 45 that feeds, in a −X direction, a label tape T in which a plurality of labels L are disposed at equal intervals on a mount tape 11 and a detection hole H is provided at a position corresponding to each of the labels L; a printing head 26 that performs printing on the labels L of the label tape T fed by the feeding mechanism 45; a sensor 43 that detects the detection holes H in a period in which the label tape T is fed by the feeding mechanism 45; a readout section 110 that reads out a standard feeding pitch SP, which is a distance between the detection holes H in a specification of the label tape T, from a ROM 44*b*; and a feeding control section 120 that controls the feeding mechanism 45, in which when printing is performed on the plurality of labels L, the feeding control section 120 measures a measurement feeding pitch, which is a distance between the detection hole H of a first label L1 that is any one of the plurality of labels L and the detection hole H of a second label L2 to be printed after the first label L1, based on a detection result of the sensor 43, and corrects a feeding amount of the label tape T after the detection hole H of the second label L2 is detected, based on the measured measurement feeding pitch and the standard feeding pitch SP.

Provided is a control method of a tape printing apparatus 1 including: a feeding mechanism 45 that feeds, in a −X direction, a label tape T in which a plurality of labels L are disposed at equal intervals on a mount tape 11 and a detection hole H is provided at a position corresponding to each of the labels L; a printing head 26 that performs printing on the labels L of the label tape T fed by the feeding mechanism 45; a sensor 43 that detects the detection holes H in a period in which the label tape T is fed by the feeding mechanism 45; and a readout section 110 that reads out a standard feeding pitch SP, which is a distance between the detection holes H in a specification of the label tape T, from a ROM 44*b*, the control method including: causing the tape printing apparatus 1 to, when printing is performed on the plurality of labels L, measure a measurement feeding pitch, which is a distance between the detection hole H of a first label L1 that is any one of the plurality of labels L and the detection hole H of a second label L2 to be printed after the first label L1, based on a detection result of the sensor 43, and correct a feeding amount of the label tape T after the detection hole H of the second label L2 is detected, based on the measured measurement feeding pitch and the standard feeding pitch SP.

In this configuration, even when the feeding amount of the label tape T in a predetermined time differs from a theoretical feeding amount for some reason, the feeding amount of the label tape T is corrected based on the measurement feeding pitch and the standard feeding pitch SP, so that the shift of the printing position to the label L can be suppressed.

In the tape printing apparatus 1, it is preferable that the sensor 43 is provided in the −X direction with respect to the printing head 26, the detection holes H corresponding to the labels L are provided on the label tape T in the −X direction with respect to positions of end portions of the labels L in the −X direction, and the feeding control section 120 repeats, for each label L, calculation control of calculating a feeding correction value based on the measurement feeding pitch and the standard feeding pitch SP, and correction control of correcting the feeding amount of the label tape T in at least a part of a period after the detection hole H of the second label L2 is detected until printing of the second label L2 or a third label L3 to be printed after the second label L2 is started, by using the calculated feeding correction value.

In this configuration, even when the force of feeding the label tape T is gradually changed, such as when the label tape T is fed out from the tape roll 15 and a feeding-out torque is changed due to a change in the diameter of the tape roll 15, the calculation control and the correction control are performed for each label L, so that the shift of the printing position to the label L can be reliably suppressed.

It is preferable that the tape printing apparatus 1 further includes a printing control section 130 that controls the printing head 26 to perform printing in the same printing target area ES in each of the labels L when printing is performed on the plurality of labels L, in which in the correction control, the feeding control section 120 corrects the feeding amount of the label tape T in a period after the detection hole H of the second label L2 is detected until printing of the second label L2 is started, when a first distance KF, which is a distance between the detection hole H on the label tape T and a printing start position that is an end portion of the printing target area ES of the label L in the −X direction, is longer than a second distance HS, which is a distance between the sensor 43 and the printing head 26, and corrects the feeding amount of the label tape T in a period in which printing is not performed in a period after the detection hole H of the second label L2 is detected until printing of the third label L3 is started, when the first distance KF is equal to or shorter than the second distance HS.

In this configuration, the feeding amount of the label tape T is corrected until the printing of the second label L2 is started when the first distance KF is longer than the second distance HS, and the feeding amount of the label tape T is corrected until the printing of the third label L3 is started when the first distance KF is equal to or shorter than the second distance HS, so that the shift of the printing position to the label L can be suppressed as quickly as possible. In addition, the feeding amount of the label tape T in a period in which the printing is not performed is corrected, so that the influence of the correction of the feeding amount on the printing result can be suppressed.

It is preferable that the tape printing apparatus 1 further includes a cutting mechanism 46 that cuts the mount tape 11 of the label tape T in a tape width direction, in which the sensor 43 is provided between the printing head 26 and the cutting mechanism 46.

In this configuration, the printed portion of the label tape T can be cut by the cutting mechanism 46. In addition, the sensor 43 can be provided between the printing head 26 and the cutting mechanism 46.

It is preferable that the tape printing apparatus 1 further includes a cartridge mounting section 23 on which a tape cartridge C that accommodates a tape roll 15 around which the label tape T is wound and a platen roller 17 that feeds the label tape T is detachably mounted, in which the feeding mechanism 45 includes a platen drive shaft 25 with which the platen roller 17 is engaged.

In this configuration, the label tape T can be easily replaced by attaching and detaching the tape cartridge C to and from the cartridge mounting section 23. In addition, when the tape cartridge C is detachable, an error occurs in the feeding amount of the label tape T due to a variation in a diameter of the platen roller 17, but the shift of the printing position to the label L can be suppressed by correcting the feeding amount of the label tape T using the feeding correction value.

In the tape printing apparatus 1, it is preferable that a tape type detection section 41 that detects a type of the label tape T, and a ROM 44*b* that stores the type of the label tape T and the standard feeding pitch SP in association with each other are provided, and the readout section 110 reads out the standard feeding pitch SP corresponding to the type of the label tape T detected by the tape type detection section 41 from the ROM 44*b*.

In this configuration, the corresponding standard feeding pitch SP can be read out from the ROM 44*b* by detecting the type of the label tape T.

Provided is a tape printing apparatus 1 including: a feeding mechanism 45 that feeds, in a −X direction, a label tape T in which a plurality of labels L are disposed at equal intervals on a mount tape 11 in a length direction of the mount tape 11 and a detection hole H is provided between the labels L; a printing head 26 that performs printing on the labels L of the label tape T fed by the feeding mechanism 45; a sensor 43 that has a detection position located in the −X direction with respect to a printing position by the printing head 26 and detects the detection hole H in a period in which the label tape T is fed by the feeding mechanism 45; and a printing control section 130 that controls the feeding mechanism 45 and the printing head 26, in which when printing is performed on the plurality of labels L, the printing control section 130 performs cueing for locating, at the printing position, a printing start position of an n-th label Ln, which is the label L disposed at an n-th position, n being an integer of $n \geq 2$, from a beginning of the label tape T among the labels L disposed on the label tape T, based on detection of the detection hole H provided in the −X direction with respect to an (n−1)-th label L(n−1).

Provided is a control method of a tape printing apparatus 1 including: a feeding mechanism 45 that feeds, in a −X direction, a label tape T in which a plurality of labels L are disposed at equal intervals on a mount tape 11 in a length direction of the mount tape 11 and a detection hole H is provided between the labels L; a printing head 26 that performs printing on the labels L of the label tape T fed by the feeding mechanism 45; and a sensor 43 that has a detection position located in the −X direction with respect to a printing position by the printing head 26 and detects the detection hole H in a period in which the label tape T is fed by the feeding mechanism 45, the control method including: causing the tape printing apparatus 1 to, when printing is performed on the plurality of labels L, cueing for locating, at the printing position, a printing start position of an n-th label Ln, which is the label L disposed at an n-th position, n being an integer of n≥2, from a beginning of the label tape T among the labels L disposed on the label tape T, based on detection of the detection hole H provided in the −X direction with respect to an (n−1)-th label L(n−1).

In this configuration, when the printing is performed on the plurality of labels L, the tape printing apparatus 1 performs the cueing of the n-th label Ln based on the detection of the detection hole H provided in the −X direction with respect to the (n−1)-th label L(n−1). Accordingly, even when the distance between the detection hole H and the printing start position of the label L on the label tape T is shorter than the distance between the detection position of the sensor 43 and the printing position by the printing head 26, the tape printing apparatus 1 can perform the cueing of the n-th label Ln without feeding the label tape T in the +X direction, so that the increase in the printing process time can be suppressed.

In the tape printing apparatus 1, it is preferable that the printing control section 130 performs cueing of the n-th label Ln based on detection of an (n−1)-th detection hole H(n−1), which is the detection hole H closest to the (n−1)-th label L(n−1) among the detection holes H provided in the −X direction with respect to the (n−1)-th label L(n−1).

In this configuration, the tape printing apparatus 1 performs the cueing of the n-th label Ln based on the detection of the (n−1)-th detection hole H(n−1), so that the cueing of the n-th label Ln can be accurately performed.

It is preferable that the tape printing apparatus 1 further includes a readout section 110 that reads out a standard feeding pitch SP, which is a distance between the detection holes H in a specification of the label tape T, from a ROM 44*b*, in which the printing control section 130 performs cueing of the n-th label Ln by feeding the label tape T by a distance obtained by subtracting a distance between the detection position of the sensor 43 and the printing position by the printing head 26 from a distance obtained by adding up a distance between an n-th detection hole Hn, which is the detection hole H closest to the n-th label Ln among the detection holes H provided in the −X direction with respect to the n-th label Ln and the printing start position of the n-th label Ln, and the standard feeding pitch SP, from a point in time when the sensor 43 detects the (n−1)-th detection hole H(n−1).

In this configuration, the tape printing apparatus 1 can calculate a distance by which the label tape T is fed from the point in time when the (n−1)-th detection hole H(n−1) is detected by the sensor 43 until the cueing of the n-th label Ln is performed.

In the tape printing apparatus 1, it is preferable that, when printing is performed on three or more sheets of the labels L, the printing control section 130 performs, for each label L, the cueing on second and subsequent labels L from the beginning of the label tape T.

In this configuration, for three or more sheets of the labels L, even when the first distance KF is shorter than the second distance HS, the tape printing apparatus 1 does not have to start the printing after temporarily feeding the label tape T in the +X direction for each label L, so that the increase in the printing process time can be suppressed.

In the tape printing apparatus 1, it is preferable that, when a distance between a first detection hole H1, which is the detection hole H provided in the −X direction with respect to a first label L1 that is the label L disposed at the beginning of the label tape T, and a printing start position of the first label L1 is shorter than a distance between the detection position of the sensor 43 and the printing position by the printing head 26, the printing control section 130 performs cueing of the first label L1 by feeding the label tape T in a +X direction opposite to the −X direction.

In this configuration, when the first distance KF of the first label L1 is shorter than the second distance HS, the tape printing apparatus 1 performs the cueing of the first label L1 by feeding the label tape T in the +X direction. Accordingly, the tape printing apparatus 1 can start the printing on the first label L1 from the printing start position desired by the user.

In the tape printing apparatus 1, it is preferable that a tape type detection section 41 that detects a type of the label tape T, and a ROM 44*b* that stores the type of the label tape T and the standard feeding pitch SP in association with each other are provided, and the readout section 110 reads out the standard feeding pitch SP corresponding to the type of the label tape T detected by the tape type detection section 41 from the ROM 44*b*.

In this configuration, the tape printing apparatus 1 can read out the corresponding standard feeding pitch SP from the ROM 44*b* by detecting the type of the label tape T.

What is claimed is:

1. A tape printing apparatus comprising:

a feeding mechanism that feeds, in a first direction, a label tape in which a plurality of labels are disposed at equal intervals on a mount tape and a detected portion is provided at a position corresponding to each of the labels;

a printing head that performs printing on the labels of the label tape fed by the feeding mechanism;

a sensor that detects the detected portions in a period in which the label tape is fed by the feeding mechanism;

a readout section that reads out a standard feeding pitch, which is a distance between the detected portions in a specification of the label tape, from a storage section; and a feeding control section that controls the feeding mechanism, wherein when printing is performed on the plurality of labels, the feeding control section measures a measurement feeding pitch, which is a distance between the detected portion of a first label that is any one of the plurality of labels and the detected portion of a second label to be printed after the first label, based on a detection result of the sensor, and corrects a feeding amount of the label tape after the detected portion of the second label is detected, based on the measured measurement feeding pitch and the standard feeding pitch.

2. The tape printing apparatus according to claim 1, wherein the sensor is provided in the first direction with respect to the printing head, the detected portions corresponding to the labels are provided on the label tape in the first direction with respect to positions of end portions of the labels in the first direction, and the feeding control section repeats, for each label, calculation control of calculating a feeding correction value based on the measurement feeding pitch and the standard feeding pitch, and correction control of correcting the feeding amount of the label tape in at least a part of a period after the detected portion of the second label is detected until printing of the second label or a third label to be printed after the second label is started, by using the calculated feeding correction value.

3. The tape printing apparatus according to claim 2, further comprising:

a printing control section that controls the printing head to perform printing in the same printing target area in each of the labels when printing is performed on the plurality of labels, wherein in the correction control, the feeding control section corrects the feeding amount of the label tape in a period after the detected portion of the second label is detected until printing of the second label is started, when a first distance, which is a distance between the detected portion on the label tape and a printing start position that is an end portion of the printing target area of the label in the first direction, is longer than a second distance, which is a distance between the sensor and the printing head, and corrects the feeding amount of the label tape in a period in which printing is not performed in a period after the detected portion of the second label is detected until printing of the third label is started, when the first distance is equal to or shorter than the second distance.

4. The tape printing apparatus according to claim 2, further comprising:

a cutting mechanism that cuts the mount tape of the label tape in a tape width direction, wherein the sensor is provided between the printing head and the cutting mechanism.

5. The tape printing apparatus according to claim 1, further comprising:

a cartridge mounting section on which a tape cartridge that accommodates a tape roll around which the label tape is wound and a platen roller that feeds the label tape is detachably mounted, wherein the feeding mechanism includes a platen drive shaft with which the platen roller is engaged.

6. The tape printing apparatus according to claim 1, wherein a tape type detection section that detects a type of the label tape, and the storage section that stores the type of the label tape and the standard feeding pitch in association with each other are provided, and the readout section reads out the standard feeding pitch corresponding to the type of the label tape detected by the tape type detection section from the storage section.

7. A control method of a tape printing apparatus including:

a feeding mechanism that feeds, in a first direction, a label tape in which a plurality of labels are disposed at equal intervals on a mount tape and a detected portion is provided at a position corresponding to each of the labels;

a printing head that performs printing on the labels of the label tape fed by the feeding mechanism;

a sensor that detects the detected portions in a period in which the label tape is fed by the feeding mechanism; and a readout section that reads out a standard feeding pitch, which is a distance between the detected portions in a design of the label tape, from a storage section, the control method comprising:

causing the tape printing apparatus to, when printing is performed on the plurality of labels, measure a measurement feeding pitch, which is a distance between the detected portion of a first label that is any one of the plurality of labels and the detected portion of a second label to be printed after the first label, based on a detection result of the sensor, and correct a feeding amount of the label tape after the detected portion of the second label is detected, based on the measured measurement feeding pitch and the standard feeding pitch.

* * * * *